US010615989B2

(12) United States Patent
Kreft

(10) Patent No.: US 10,615,989 B2
(45) Date of Patent: *Apr. 7, 2020

(54) TAMPER-PROTECTED HARDWARE AND METHOD FOR USING SAME

(71) Applicant: Emsycon GmbH, Bad Bramstedt (DE)

(72) Inventor: Heinz Kreft, Kiel (DE)

(73) Assignee: Emsycon GmbH, Bad Bramstedt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/233,985

(22) Filed: Dec. 27, 2018

(65) Prior Publication Data

US 2019/0140852 A1 May 9, 2019

Related U.S. Application Data

(63) Continuation of application No. 15/241,360, filed on Aug. 19, 2016, now Pat. No. 10,171,251, which is a (Continued)

(30) Foreign Application Priority Data

Mar. 11, 2011 (WO) ................. PCT/EP2011/001219

(51) Int. Cl.
*H04L 9/32* (2006.01)
*G09C 1/00* (2006.01)
(Continued)

(52) U.S. Cl.
CPC .......... *H04L 9/3278* (2013.01); *G06F 21/335* (2013.01); *G06F 21/45* (2013.01);
(Continued)

(58) Field of Classification Search
CPC ....... G06F 21/00; G06F 21/32; H04L 9/0866; H04L 9/3231; H04L 63/0861; H04L 9/00;
(Continued)

(56) References Cited

U.S. PATENT DOCUMENTS 8,868,923 B1 * 10/2014 Hamlet ................... G06F 21/00
326/8
2006/0039643 A1 2/2006 Saaski
(Continued)

FOREIGN PATENT DOCUMENTS

| WO | 0049538 A1 | 8/2000 |
|----|----|----|
| WO | 2004104899 A2 | 12/2004 |
| WO | 2009156904 A1 | 12/2009 |

OTHER PUBLICATIONS

Kreft H., "fairCASH based on loss resistant teleportation" Oct. 28, 2010, p. FP-233, XP002659411, http://faircash.org/fileadmin/dateien/fairCASH_Dissertation.pdf.

*Primary Examiner* — Abu S Sholeman
(74) *Attorney, Agent, or Firm* — Wood, Phillips, Katz, Clark & Mortimer

(57) ABSTRACT

One of the various aspects of the invention is related to suggesting various techniques for improving the tamper-resistibility of hardware. The tamper-resistant hardware may be advantageously used in a transaction system that provides the off-line transaction protocol. Amongst these techniques for improving the tamper-resistibility are trusted bootstrapping by means of secure software entity modules, a new use of hardware providing a Physical Unclonable Function, and the use of a configuration fingerprint of a FPGA used within the tamper-resistant hardware.

14 Claims, 13 Drawing Sheets

Block Diagram of a CASTOR.

Related U.S. Application Data continuation of application No. 14/624,180, filed on Feb. 17, 2015, now Pat. No. 9,461,826, which is a continuation of application No. 14/004,651, filed as application No. PCT/EP2012/054248 on Mar. 12, 2012, now Pat. No. 9,071,446.

(51) Int. Cl.

| | | |
|---|---|---|
| *G06F 21/73* | (2013.01) | |
| *G06Q 20/22* | (2012.01) | |
| *G06Q 20/38* | (2012.01) | |
| *H04L 29/06* | (2006.01) | |
| *G06F 21/57* | (2013.01) | |
| *G06F 21/33* | (2013.01) | |
| *G06F 21/45* | (2013.01) | |
| *G06F 21/71* | (2013.01) | |
| *H04L 9/08* | (2006.01) | |
| *H04L 9/06* | (2006.01) | |
| *H04L 9/14* | (2006.01) | |
| *H04L 9/30* | (2006.01) | |

(52) U.S. Cl.
CPC ............ *G06F 21/57* (2013.01); *G06F 21/71* (2013.01); *G06F 21/73* (2013.01); *G06Q 20/223* (2013.01); *G06Q 20/3821* (2013.01); *G06Q 20/3825* (2013.01); *G09C 1/00* (2013.01); *H04L 9/0643* (2013.01); *H04L 9/0861* (2013.01); *H04L 9/14* (2013.01); *H04L 9/30* (2013.01); *H04L 9/3239* (2013.01); *H04L 9/3247* (2013.01); *H04L 9/3263* (2013.01); *H04L 9/3268* (2013.01); *H04L 63/0428* (2013.01); *H04L 63/0442* (2013.01); *H04L 63/0823* (2013.01); *H04L 2209/56* (2013.01)

(58) Field of Classification Search
CPC ............ H04L 9/3278; H04L 29/06809; H03K 19/003; H04N 1/442; H04N 21/4415; G05B 19/00; H04W 12/06
USPC ......................................................... 713/194
See application file for complete search history.

(56) References Cited

U.S. PATENT DOCUMENTS

| | | | |
|---|---|---|---|
| 2006/0101288 A1* | 5/2006 | Smeets | G06F 21/602 713/194 |
| 2006/0209584 A1* | 9/2006 | Devadas | G06F 21/31 365/52 |
| 2007/0125857 A1* | 6/2007 | Tuyls | G06K 7/10 235/454 |
| 2010/0238442 A1 | 9/2010 | Heng et al. | |

* cited by examiner

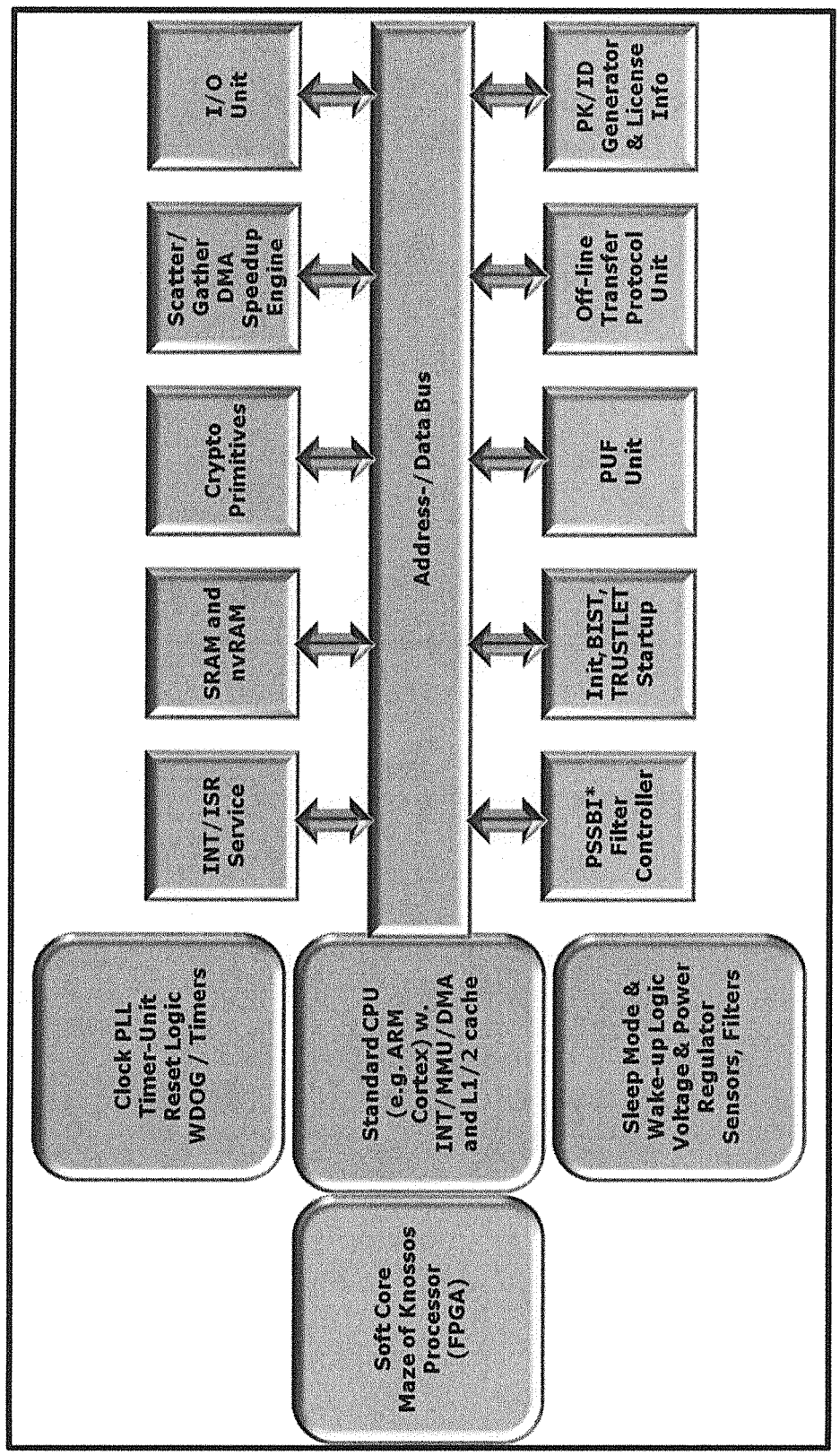
Figure 1: Block diagram of the CASTOR HSM.

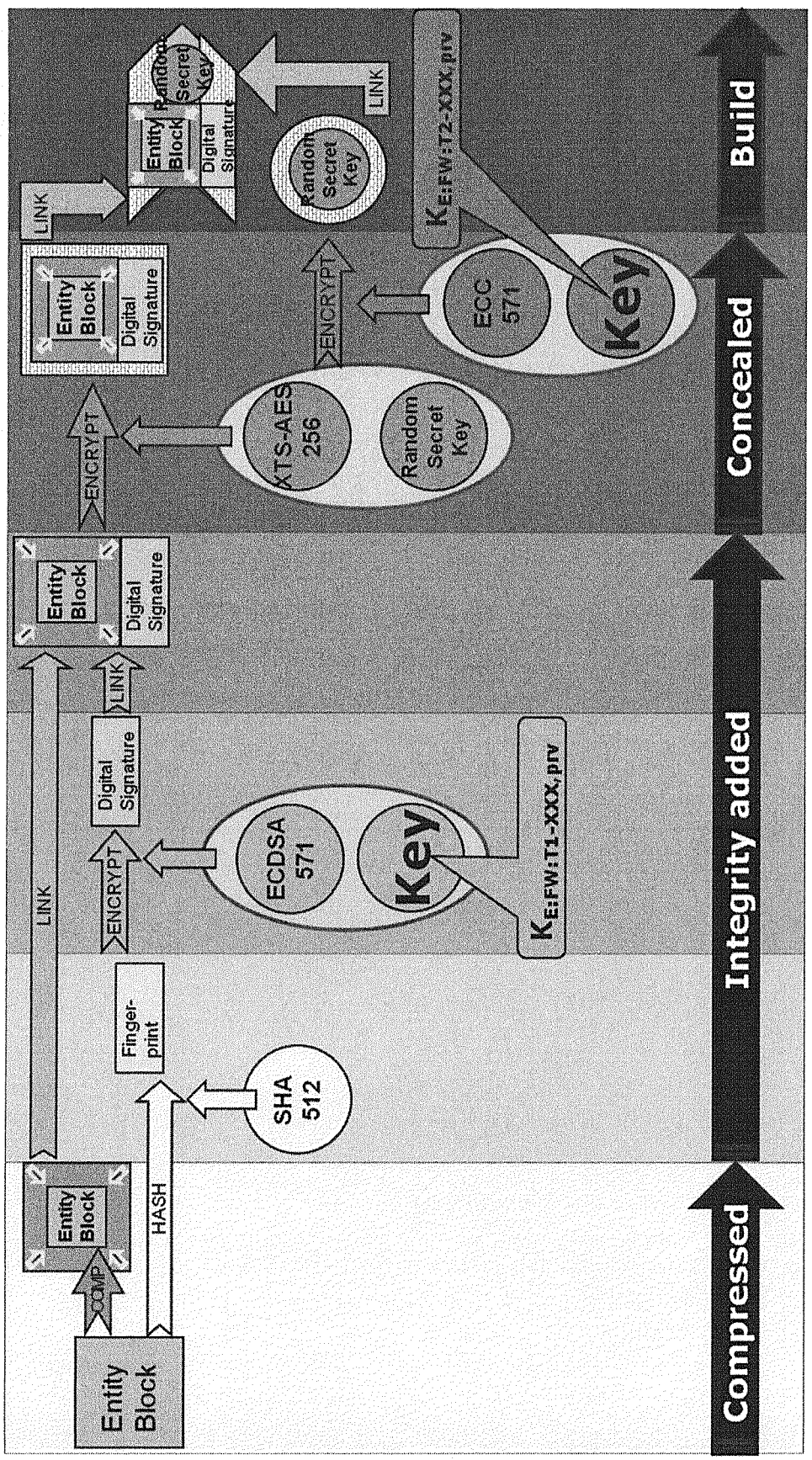
Figure 2: Fabrication of encrypted and digitally signed entity (code and data) blocks (TRUSTLETs).

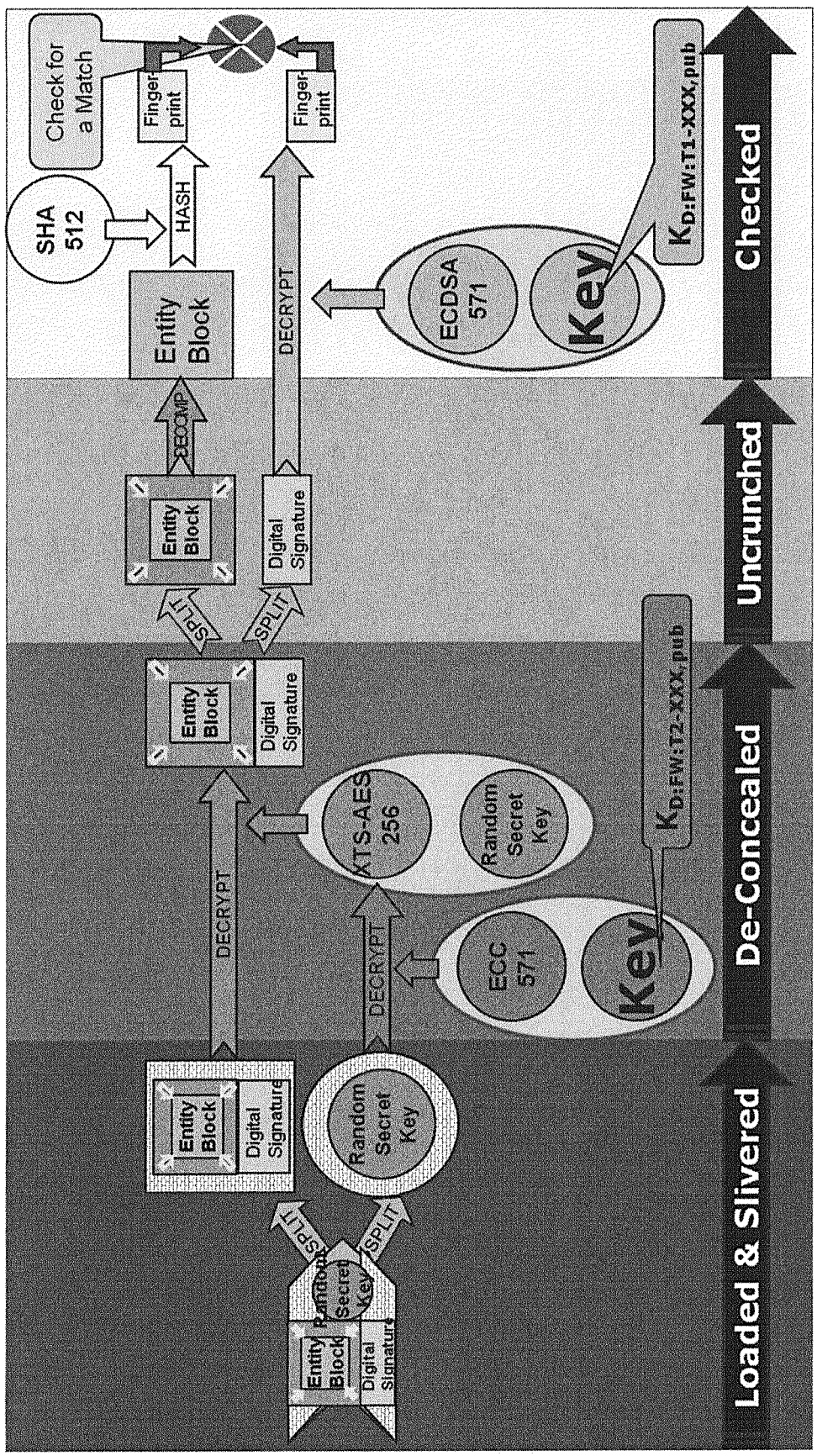
Figure 3: Verification of encrypted and digitally signed entity (code and data) blocks (TRUSTLETs).

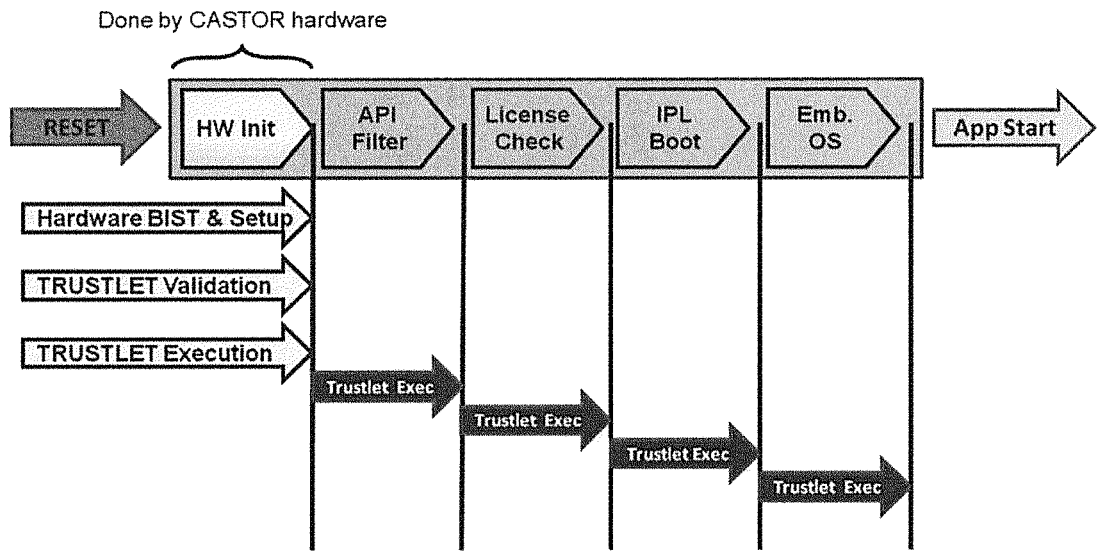
Figure 4: Timeline flow chain of transitive integrity measurement/validation through TRUSTLETs.
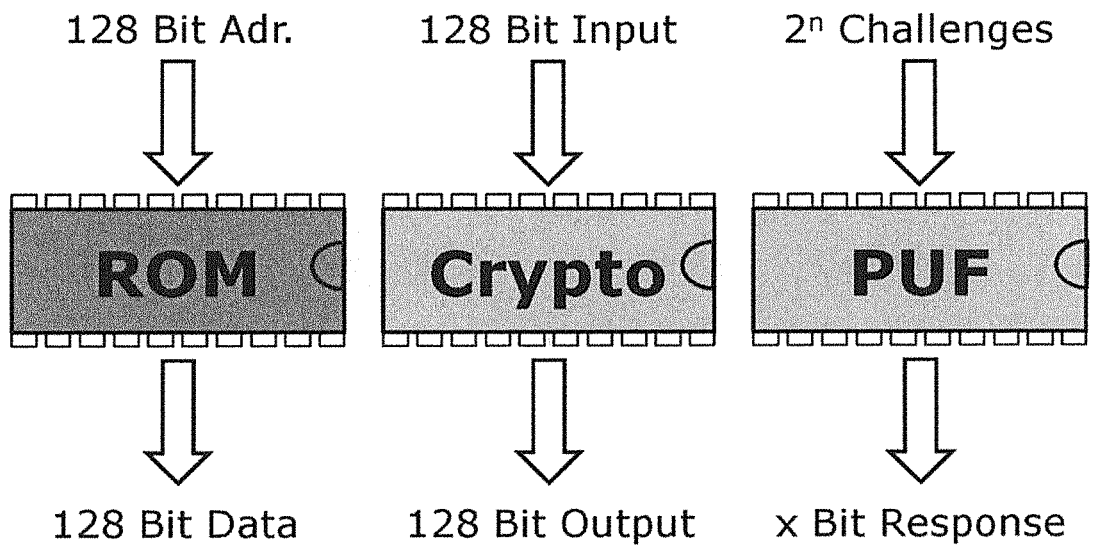
Figure 5: The PUF in a comparison to a ROM and a Crypto function.

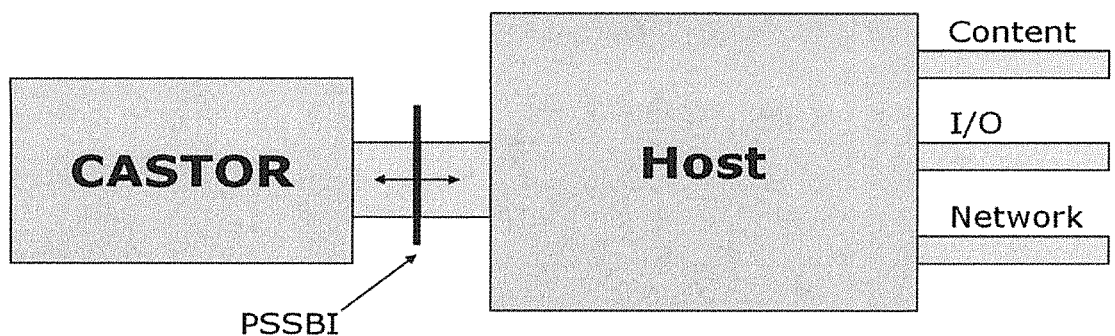
Figure 6: The PSSBI approach as API-filter.
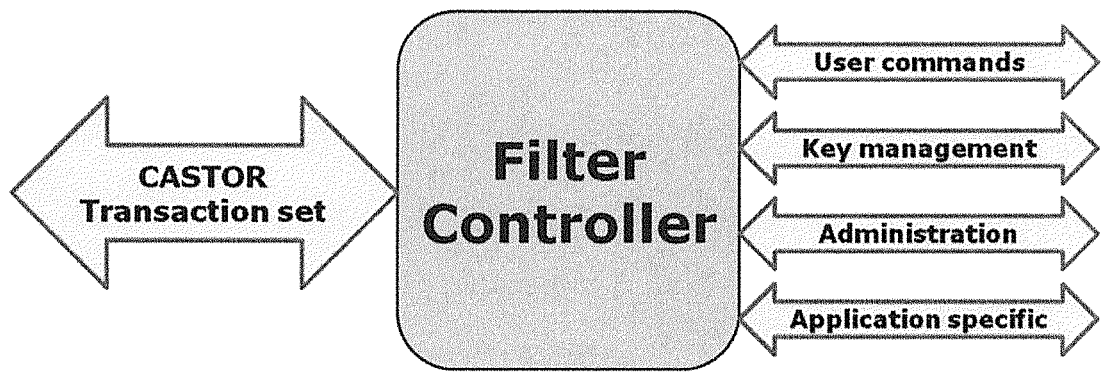
Figure 7: Logical PSSBI filter interface functionality.
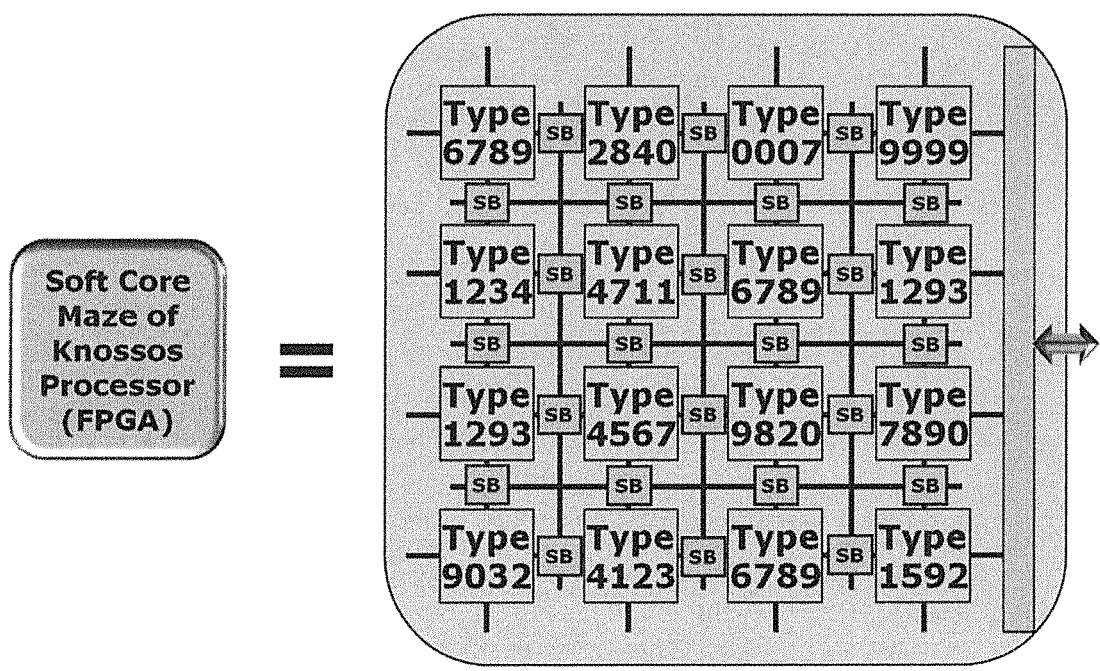
Figure 8: The Maze of Knossos as a reconfigurable array of Processing-Elements (PEs).

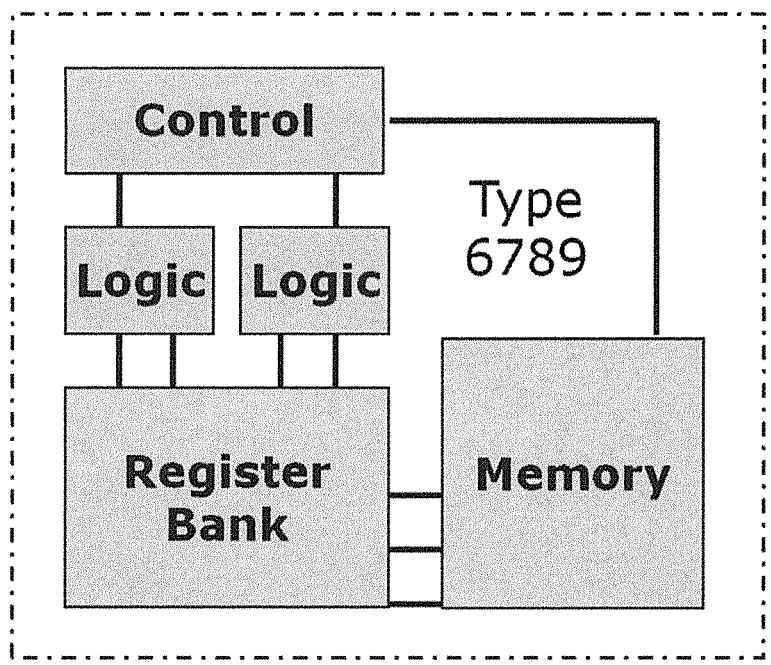
Figure 9: A single Processing Element (PE).
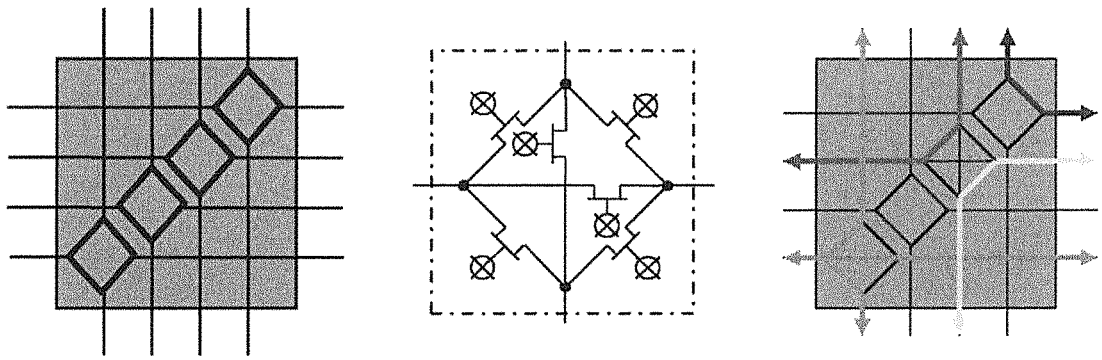
Figure 10: Switchboxes are sitting between the PEs and are responsible for their interconnection.
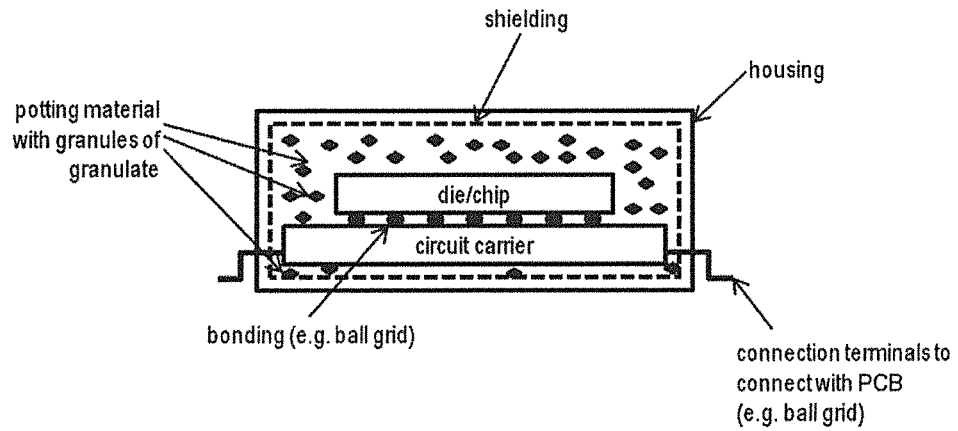
Figure 11: Tamper-protected semiconductor module provided with a cocoon PUF.

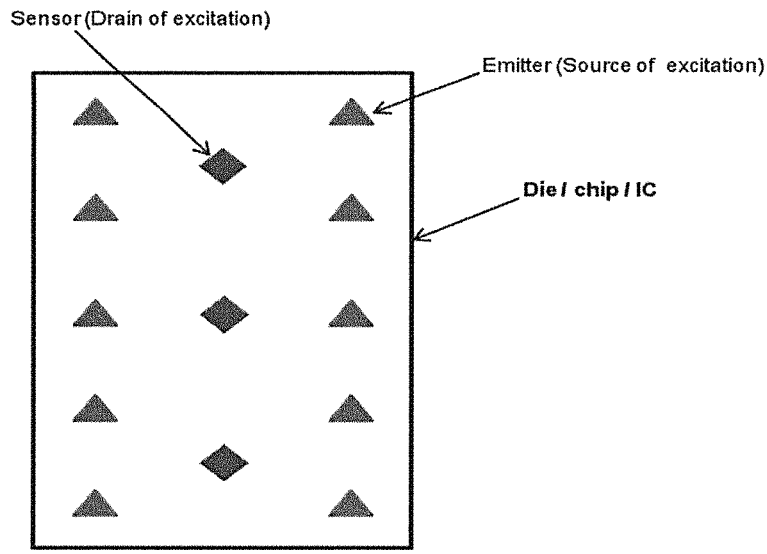
Figure 12: Hardware module containing elements of sensors and emitters for an excitation.
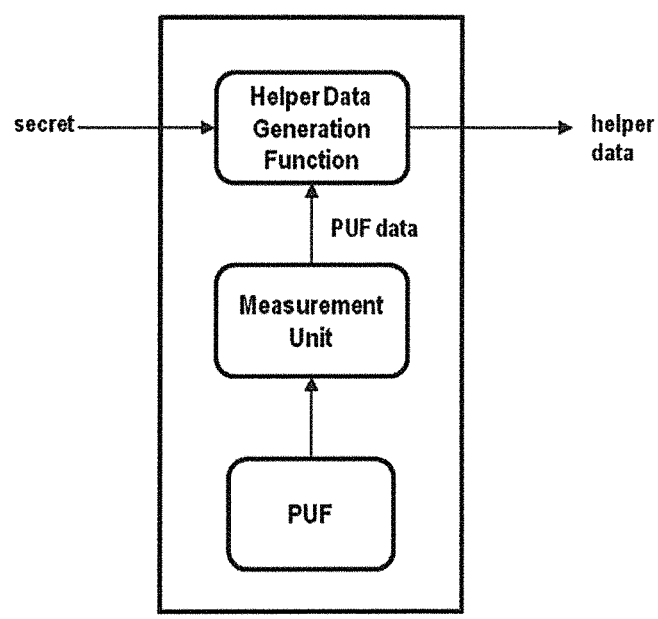
Figure 13: Process of splitting a secret into data provided by a PUF and Helper-Data.

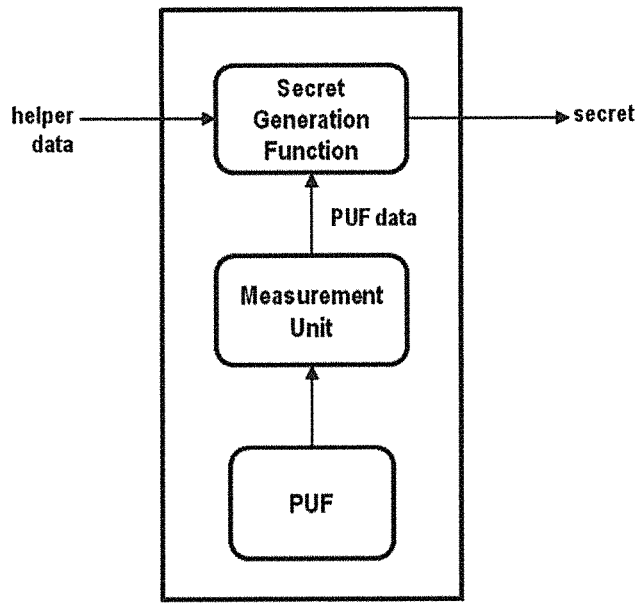
Figure 14: Process of recombining Helper-Data and data provided by a PUF into a secret.
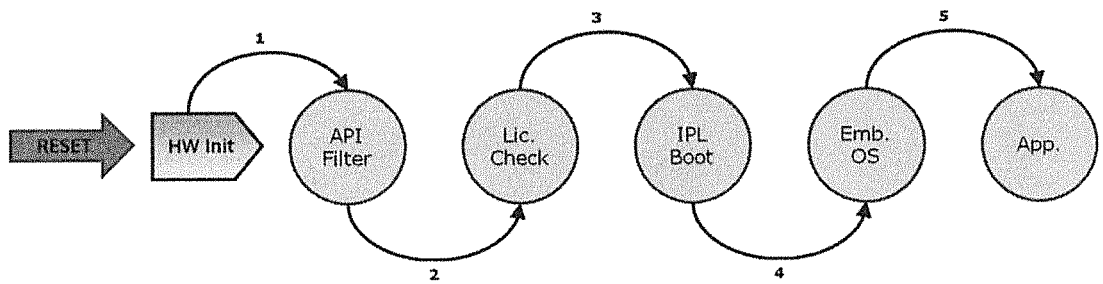
Figure 15: TRUSTLET bootstrapping model covering the serial chain strategy.

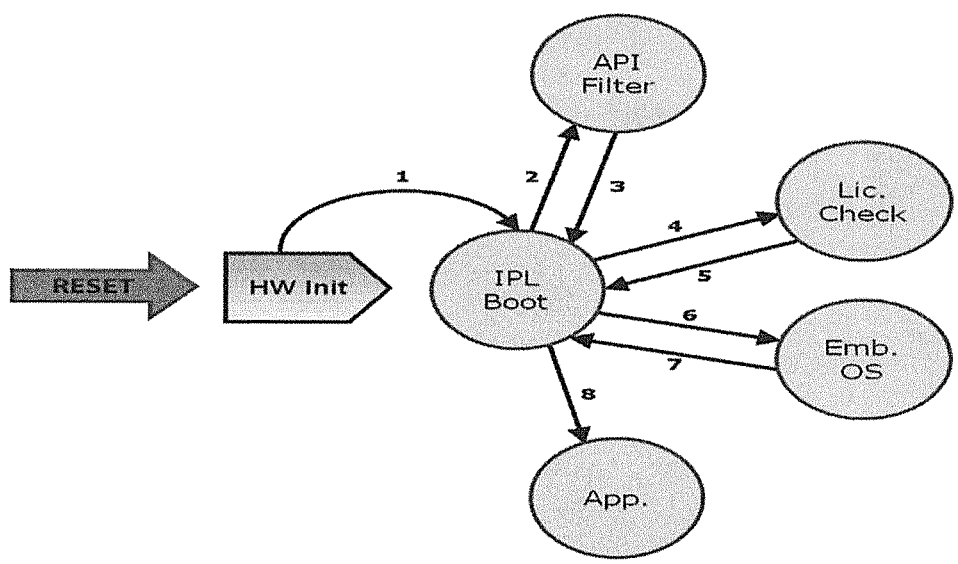
Figure 16: TRUSTLET bootstrapping model covering the central chain strategy.
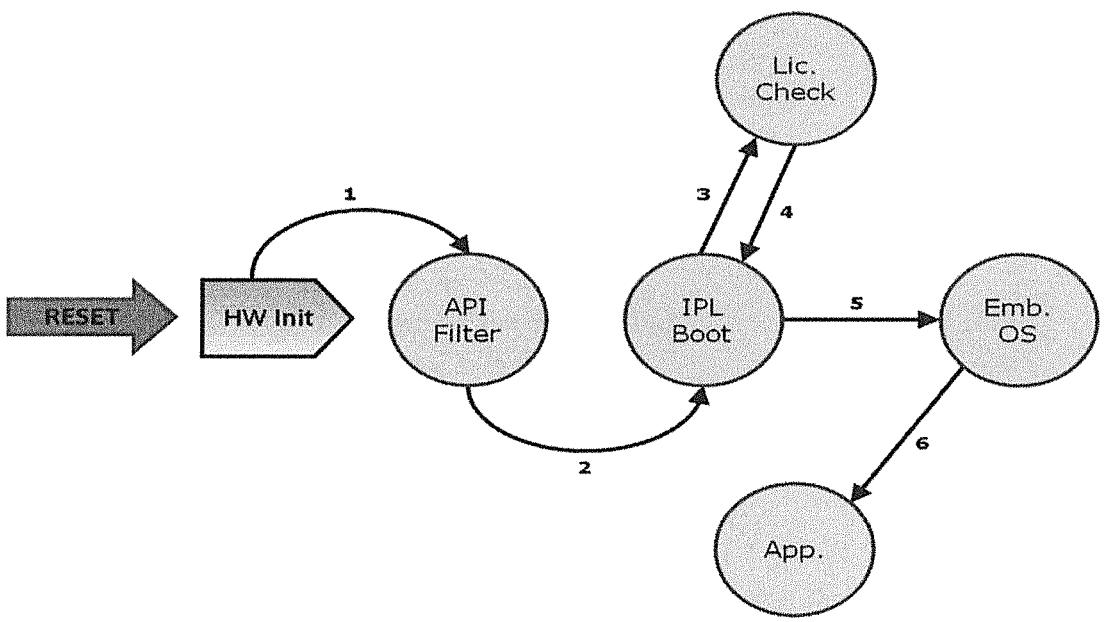
Figure 17: TRUSTLET bootstrapping model covering a hybrid form variation strategy.

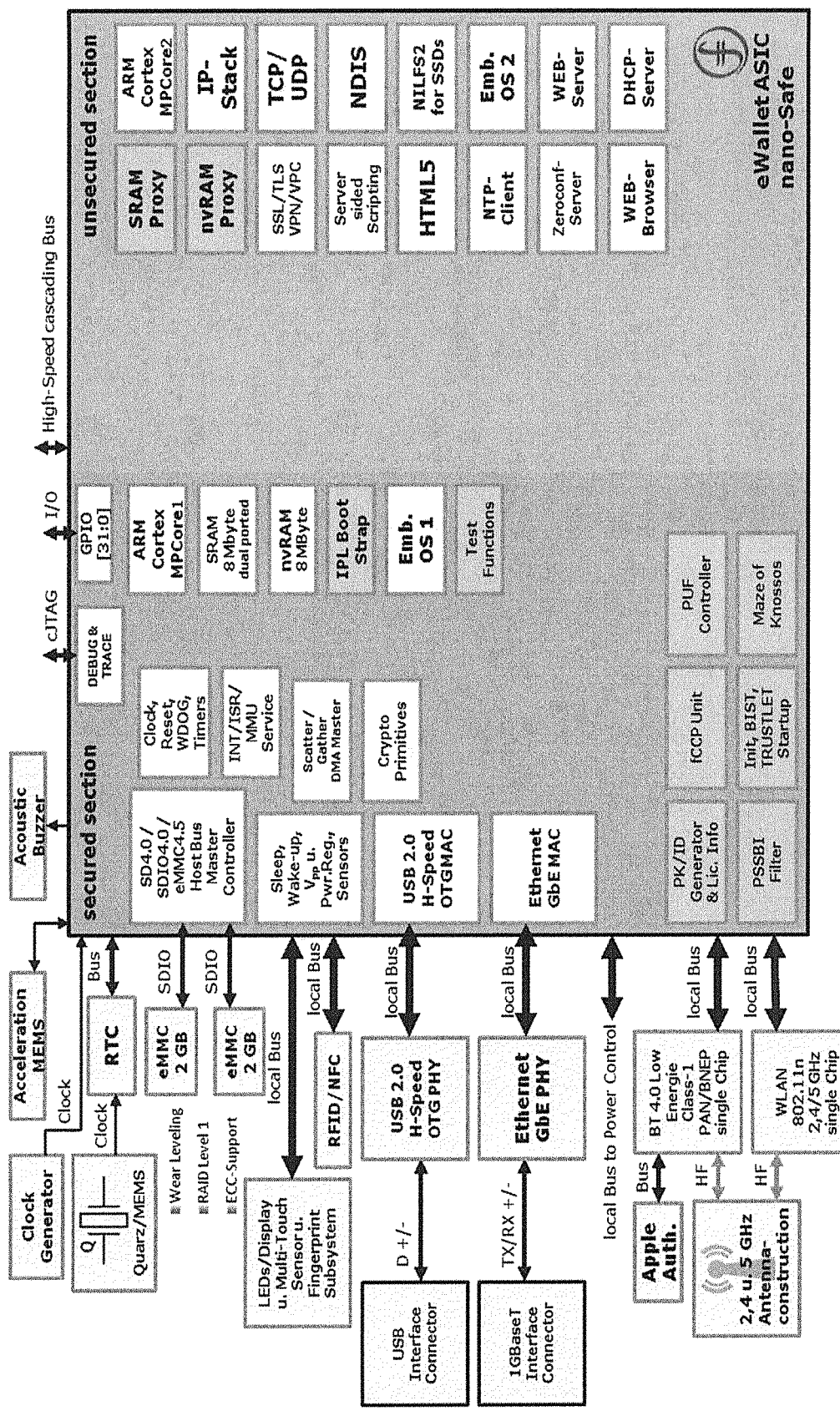
Figure 18: eWallet Control Block Diagram (marked boxes are new in relation to this application).

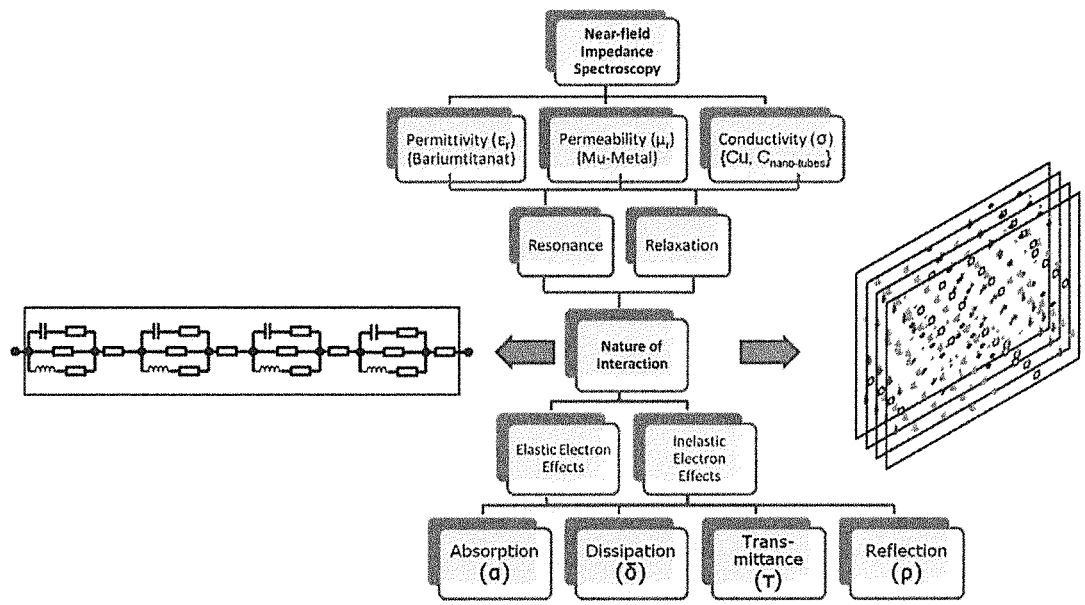
Figure 19: Measuring Effects.
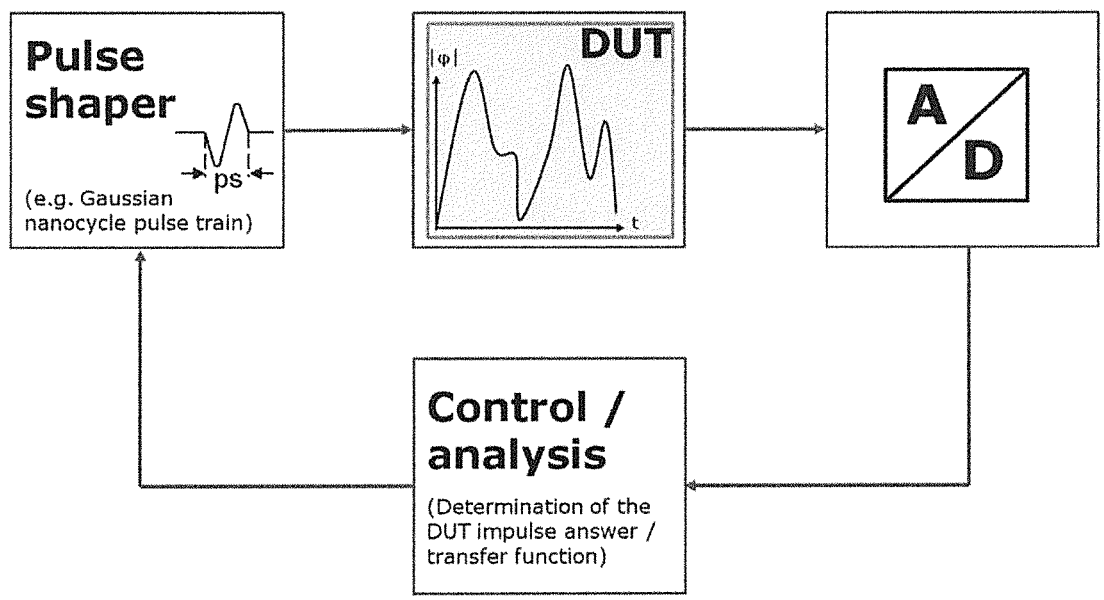
Figure 20: An exemplary measurement principle of measurands in the time domain using RF pulses.

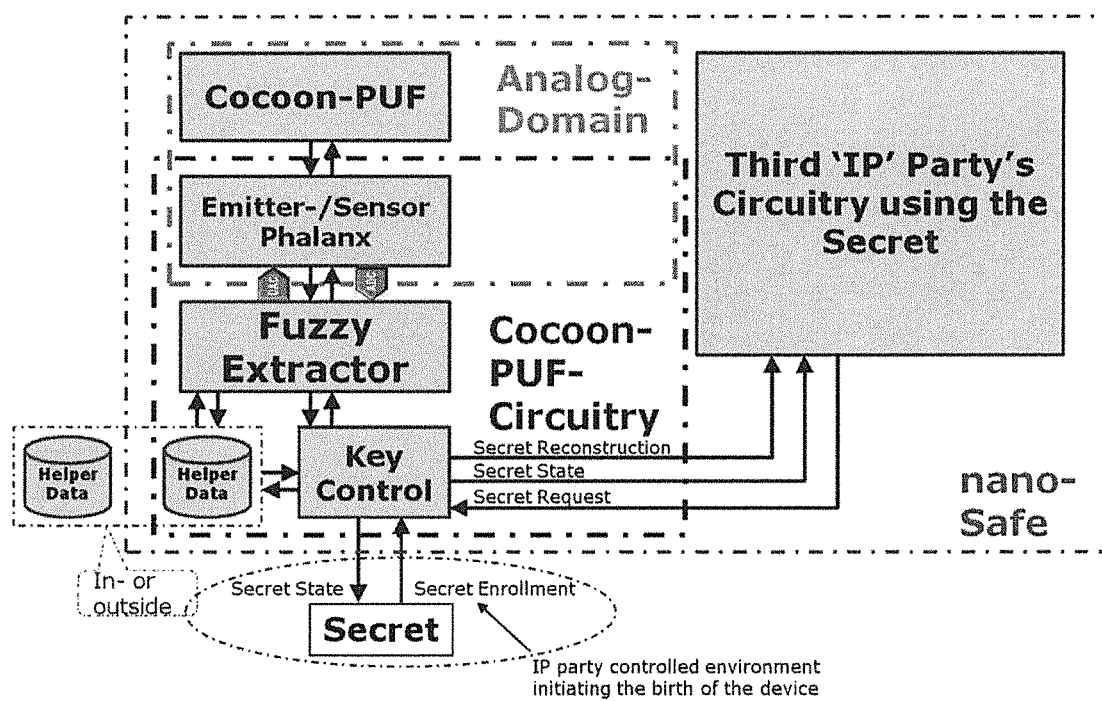
Figure 21: Block Diagram of a CASTOR.

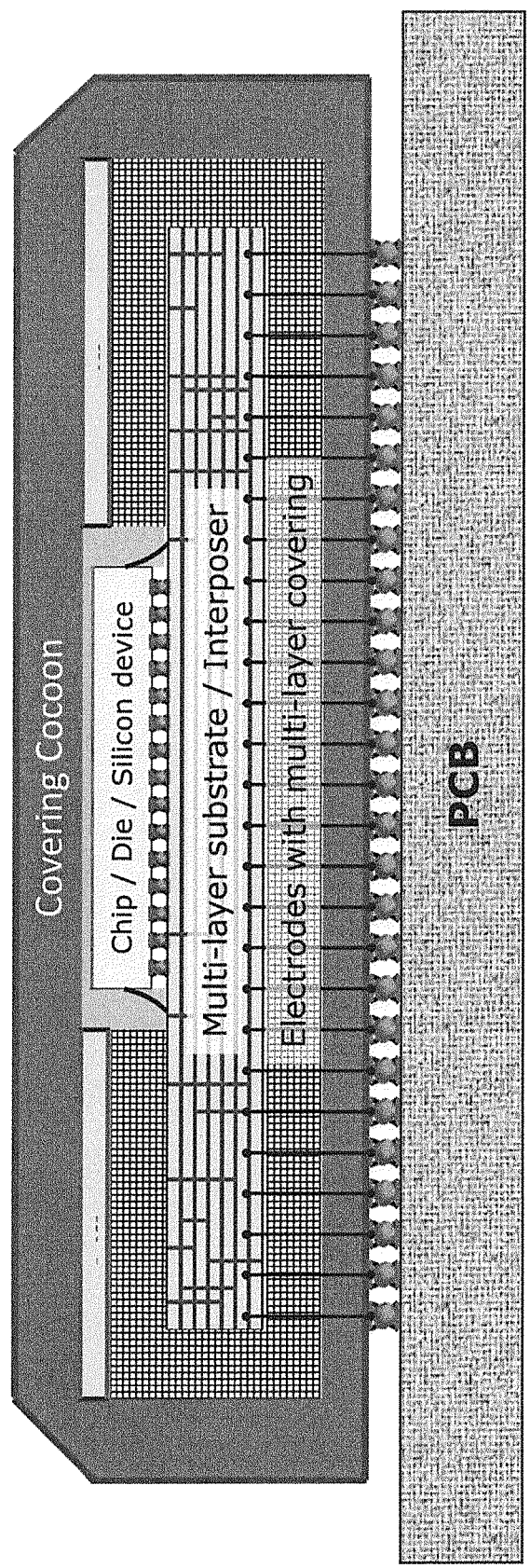
Figure 22: Cross-sectional view of a protected CASTOR chip based on a BGA packaging.

TAMPER-PROTECTED HARDWARE AND METHOD FOR USING SAME

FIELD OF THE INVENTION

The invention relates to various techniques for improving the tamper-resistibility of hardware. The tamper-resistant hardware may be advantageously used in a transaction system that provides the off-line transaction protocol as described in the priority application PCT/EP2011/001219 of the same applicant. Amongst these techniques for improving the tamper-resistibility is trusted bootstrapping by means of secure software entity modules, a new use of hardware providing a Physical Unclonable Function (PUF), and the use of a configuration fingerprint of a FPGA used within the tamper-resistant hardware.

BACKGROUND OF THE INVENTION

Security is nowadays globally known of being in the need to get enforced by measures of authentication and change-protection incorporated and embedded into chips by fitting to physical and individual descriptors and characteristics not able to get copied. Such a mechanism is provided by a PUF (Physical Unclonable Function). This feature is called a (physical) fingerprint (FP) based on different physical effects and variables.

But even in case of this kind of protection, such a system is not in principle offering protection against an individual attack: Through (unrecognized) intercepting of data lines, a PUF-based secret (the fingerprint) can be disclosed and reconstructed on the digital layer. If this is successful, than the PUF can—depending on the implementation—be bypassed, if necessary with the help of a separate digital storage. Such an attack could be the more successful; the more the (IC) application developers are building their systems on the merits of being technically and functionally in a good shape but not taking notice of guidelines for criteria of security and cryptographic integrity.

Today most (software) security mechanisms are found in hardened (embedded) systems based on hardware security functions. Processing elementary units like microprocessors and controllers are responsible for performing safety-critical tasks on digital networks, in PCs, mobile phones, and other handheld (wireless) devices, Internet-based TVs or cars. Any failure of these systems could have an immediate impact on the real life.

State-of-the-art standards covering physical security requirements for cryptographic modules can be found in the highest level of security defined in the US standard NIST FIPS POB 140-2 Level 4 (available at http://www.nist.gov/manuscript-publication-search.cfm?pub_id=902003, page 3): "At this security level, the physical security mechanisms provide a complete envelope of protection around the cryptographic module with the intent of detecting and responding to all unauthorized attempts at physical access".

Due to the high number of security problems it can be assumed that the existing applied solutions are not as good as they should. Their state of security seems not sufficient for a suitable protection; the current approaches suffer either from the non-existence of on-a-big-scale "secure-enough" usable architectures or from difficulties in their reliable protection against ((semi-) invasive) attacks intending counterfeit (e.g. plagiarism) chips. But not only the protection of applications is an issue, there is also the wish to make malicious (e.g. Trojan horse with backdoors) of well-known leader-referenced (and all others too) chip art impossible. IC metering (midnight overproduction) is another revenue cutting aspect resulting into massive losses of jobs.

Jarrod A. Roy et al. introduced a way for IC protection (J. A. Roy, et al., "EPIC: Ending Piracy of Integrated Circuits", Design, Automation and Test in Europe, 2008. DATE '08, pp. 1069-1074, 2008) requiring that every chip be activated with an external key, which can only be generated by the holder of the IP rights, combining automatically-generated chip IDs with public-key cryptography. Stating and rating potential attacks and countermeasures they state: " . . . the pirates must modify chips or masks . . . ". Such a modification has than to bypass the security logic in the chip. They conclude: "However, this scenario is unlikely because, at 45 nm and below, masks are much harder to read than the actual shapes on the chip, due to Resolution Enhancement Techniques (RET). Scanning the actual shapes in silico is even harder, and the investment required for this may not pay off because pirated chips sell at a lower cost, often at low volumes". This could be a deceptive cadence.

Traditional physical security coded in transistors, gates, memory cells, or conducting paths gets more and more devaluated due to the availability of de-capsulation and de-processing knowledge (e.g. etching layers away), tools, and services (e.g. drilling holes or micro-probing using FIBs). Today even 3D-shaped, multilayered SoCs are de-layered, imaged, and de-layouted on a professional way. With that in hand, a transistor level netlist, gate netlist, and at least the complete hierarchal schematics are (cheap) reverse engineered. This put heavy pressure on the demand for a security technology not susceptible to such attacks. With this in mind, the scientific community searches for ways to achieve that.

First publications about the usage of physical properties gained from disordered systems for cryptographic applications could be traced back to Bauder (D. W. Bauder, "An anti-counterfeiting concept for currency systems," Sandia National Labs. Albuquerque, N. Mex. 1983) and Simmons (G Simmons, "A system for verifying user identity and authorization at the point-of sale or access," presented at the Advances in Cryptology—EUROCRYPT'88, 1984). The word POWF (Physical One-Way Function) and PUF (Physical Unclonable Function) were coined by Pappu Srinivasa Ravikanth (S. R. Pappu, "Physical one-way functions," Massachusetts Institute of Technology, 2001 and S. Devadas, et al., "Design and Implementation of 'Unclonable' RFID ICs for Anti-Counterfeiting and Security Applications," RFID World 2008, 2008). PUFs do not embody a direct accessible memory, they implement challenge-response authentication: A physical stimulus (called challenge) is applied to the PUF, resulting into a reaction (called response). A specific challenge and its corresponding response together form a Challenge Response Pair (CRP). PUFs should be unclonable within two aspects: Physical means the infeasibility to construct a PUF copy producing the (all) same CRPs of the original one. Mathematical means the infeasibility to describe a PUF in a formal logical way like a function or algorithm. It is the combination of both attributes which renders a PUF truly unclonable.

PUFs use randomness that can be intrinsically or explicitly introduced by a physical system. PUF relevant effects are found nearly everywhere in the matter-based world. Representatives of explicitly introduced PUFs includes optical ones using unique speckle scattering pattern, coating ones randomly doped with dielectric particles resulting into an unpredictable capacitance, or RF susceptible resonator circuitry build on integrated capacitors and coils providing strong resonance peaks called LC-PUFs. A fascinating work is the Radio-Frequency-Certificate-Of-Origin (RF-COA) approach presented by Darko Kirovski, Gerald Dejean et al. (V. Lakafosis, et al., "RF Fingerprinting Physical Objects for Anticounterfeiting Applications," in Microwave Theory and Techniques, IEEE Transactions on, 2011, pp. 504-514; V. Lakafosis, et al., "An RFID system with enhanced hardware-enabled authentication and anti-counterfeiting capabilities," in Microwave Symposium Digest (MTT), 2010 IEEE MTT-S International, 2010 and V. Lakafosis, et al., "RFID-CoA: The RFID tags as certificates of authenticity," in RFID (RFID), 2011 IEEE International Conference on, Orlando, Fla., 2011). The basic idea covers the construction of unclonable tags and labels containing random constellations of scatterers printed on paper (one implementation) or laminated into credit-card (sized) applications consisting of " . . . extremely difficult to replicate, random arrangement of a conductive material, such as copper wire, mixed with a firm dielectric material, such as plastic PET mold, that produces a unique and repeatable response in the near-field.". This serves then as genuine-identifying-oracle, the same but analog direction as intended with the RFID (far-field) technology based on digital properties. RF-COAs do not contain any electronic circuitry and are challenged using an external (trusted) RF-reader.

A more 'exotic' representative is the magnetic PUF as found on some magnetic stripe cards fabricated by blending particles of barium ferrite shaped in many different sizes together in slurry. After drying up, the receptor layer is sliced into strips and applied to plastic cards. This attaches a distinctive, repeatable, and readable magnetic signal. Such a system was the technology ground for a system named Magneprint developed by Ronald Indeck at Washington University (R. S. Indeck and M. W. Muller, "Method and Apparatus for Fingerprinting and Authenticating Various Magnetic Media," 1999). Examples of PUFs based on intrinsic randomness are silicon ones, e.g. bi-stable logic memory cells like SRAM-PUFs and Latches, Flip-Flops and Butterflies based ones, delay based ones, e.g. MUX/arbiters, ring oscillators or glitch PUFs to name a few. Intrinsic PUFs are said being attractive because they can be included in a design without or with only little modifications to the (silicon) manufacturing process. Most interest about intrinsic PUFs is captured by CMOS-based ones. The enrollment and verification phase handling of CRPs can be augmented through Fuzzy Extractors (FEs) (also called Helper-Data algorithms) realizing three functionalities: Error correction for information reconciliation, randomness extraction for privacy amplification, and robustness protecting integrity. FEs should also be seen in the light of information extraction, noise cancellation, and data compression: Characterization of the PUF and formatting the Helper-Data structure during the enrollment plus extracting and processing the physical data during the verification, (re)generating the fingerprint. This enables a number of new applications such as Physically Obscured Key (POK) storage where the control layer derives a secret from the PUF.

Trying to cover the physical complexity of a PUF structure from the algorithmic point of view, the Kolmogorov Complexity (KC) can be used. It describes in our PUF case the randomness or entropy a physical system has, defined as the size of the smallest computer program (in bits) required to generate the object in question to some degree of accuracy. KC stresses—in contrast to the Shannon entropy—the measurement of disorder without any need for probabilities. Of course, the average of KC is the same to the statistical entropy for a thermodynamic ensemble. To conclude, PUF's are pointing a way to handle the thermodynamic entropy of an isolated physical system useful for cryptographic element applications.

SUMMARY OF THE INVENTION

One of the objects of this invention is to provide a design of a tamper-protected semiconductor module usable for transferring electronic tokens between peer-devices.

Another object of the invention is to suggest designs for increasing tamper resistance of hardware (e.g. a device, semiconductor module or hardware module).

One aspect of the invention is the provision of a tamper-protected hardware, which is inter alia suitable for use in the transaction system. In this respect, aspects of the invention focus on the functionality of the tamper-protected hardware (which may of course also depend on its firmware), and on the design of the tamper-protected hardware so as to avoid misuse and cloning of the tamper-protected hardware and transaction system. It will become apparent from the following that there is often also a synergy between functionality and design concepts, which in combination improve the robustness of the transaction system.

As to the functionality of the tamper-protected hardware, same may be provided by the firmware (e.g. by means of TRUSTLET(s), and/or including integrity checking functions—see below), or may be provided in some dedicated hardware of the tamper-protected hardware. As some of the security measures to improve the tamper resistance of the hardware/device on the chip level and others provide tamper protection on the packaged chip level it will be referred to (tamper-protected) semiconductor modules and/or (tamper-protected) hardware modules. A semiconductor module is denoting the packaged hardware module (chip). In one exemplary implementation, a semiconductor module is obtained by bonding a hardware module on a circuit carrier and packaging the bonded hardware module into a casing box. A hardware module could be, for example, implemented as a chip, a die or a multi-die.

A tamper-protected semiconductor module may also be referred to as a Hardware Security Module (HSM).

In one exemplary embodiment, the tamper-protected semiconductor module is a tamper-protected chip, die or multi-die. In another exemplary embodiment of the invention, the tamper-protected module is implemented in a tamper-protected integrated circuit (IC). The tamper-protected IC may be implemented as a tamper-protected die having a tamper-protected enclosure.

A further aspect of the invention is related to the design of tamper-protected hardware. The tamper-protected hardware described herein may be usable in a transaction system as for example described in the priority application PCT/EP2011/001219 of the same applicant, but is not limited to such use. The various designs of tamper-protected hardware according to this invention are not limited to any specific application, but could be used to "harden" virtually any hardware against tampering. This includes hardening/annealing the hardware against tampering on the hardware/device and/or semiconductor module and/or hardware module level.

In this context, it is a further aspect of the invention to provide a tamper-protected hardware that is provided with a hardware structure providing a Physical Unclonable Function (PUF). A set of known challenges and their respective corresponding responses of the hardware PUF is used to verify integrity of the tamper-protected semiconductor modules: Basically, the hardware structure implementing the PUF could be challenged by one or more challenges for which at least one response of a challenge is known, and in case the tamper-protected hardware is a "cloned" tamper-protected hardware, the PUF response provided by the hardware structure would not match the expected and known response(s).

For example, in one exemplary embodiment of the invention, a tamper-protected hardware comprises a hardware structure providing a PUF—referred to as "hardware PUF" below. The hardware structure provides a response to an input challenge to the PUF implemented in the hardware structure. Furthermore, the tamper-protected hardware may be equipped with a processor unit for providing at least one challenge to the hardware PUF, for which the correct PUF response by the hardware PUF is known. The processor unit receives a respective PUF response for each challenge provided to the hardware PUF, and verifies integrity of the tamper-protected hardware by checking whether the response to the at least one challenge for which the correct PUF response is known is matching the response received from the hardware PUF.

Another possible way to use the hardware PUF for securing the tamper-protected hardware module is its use in a segmentation process of secrets (e.g. electronic tokens, encryption keys such as for example a secret key, a private key as part of a public key-pair, certificates, etc.) performed by the tamper-protected hardware module: A secret is split into two parts using a so called "constructor function" or "key generation function". The construction function uses the hardware PUF (this equals to the fingerprint of the PUF) to produce a file called Helper-Data, which is one of the parts of the secret. Due to the unique nature of the hardware PUF, the Helper-Data is also unique like an individual lock and it's key. The original secret can only be reconstructed using the (correct) hardware PUF as well as the correct Helper-Data. Such procedure avoids the (need of) storing of the secret in a digital form on the device as only the Helper-Data is stored. The Helper-Data do not need to be protected. The secret is extracted from the device by using the constructor function only if required. The secret, once used, can be removed from all internal (semiconductor) registers and memories.

Another aspect of the invention related to the design of tamper-protected hardware (which may be used together with the hardware PUF functionality or independent therefore) is to provide a tamper-protected hardware module with a FPGA that has a given configuration of an array of processing-elements to provide a given functionality. This given configuration of processing elements can be considered as fingerprint of the programmed FPGA. Moreover, a storage unit of the tamper-protected hardware module may store signed configuration information indicating the initial configuration of the array of processing-elements of the FPGA of the hardware module. The hardware module's processor unit could then verify integrity of the hardware module by verifying integrity of the initial configuration information of the FPGA based on its signature and comparing the verified initial configuration information of the FPGA with the current configuration information of the processing-elements of the FPGA.

Another aspect of the invention is also related to the design of the tamper-protected semiconductor module. Please note that this aspect is independent of the other aspects of the invention provided herein, but—in some embodiments of the invention—the tamper-protected semiconductor module may be used in combination with them to further improve tamper resistibility. The basic approach underlying this aspect of the invention is to design a semiconductor module which has unique properties with respect to the deflection of a physical measurand in response to an excitation. These unique deflection properties are introduced by the production process of the semiconductor module and are thus capable of uniquely identifying the semiconductor module. Further, tampering of the semiconductor module will alter its deflection properties, which makes tampering attempts observable. Therefore, the semiconductor module is referred to as "tamper-protected".

In one exemplary embodiment of the invention in line with this aspect, there is provided a tamper-protected semiconductor module comprising a tamper-protected hardware module. The hardware module comprises one or more emitters for emitting a predetermined excitation that can be measured as one or more physical measurands. Further, the hardware module may comprise one or more sensors for sensing the (back-) scatter of the predetermined excitation in form of the physical measurand(s) in a contactless and/or contact-based manner. The tamper-protected semiconductor module further has a cocoon that houses the hardware module. This cocoon may also be referred to as a package or housing. The cocoon is configured to influence the (back-) scatter of the predetermined excitation to be sensed by the sensors.

The deflection properties of the inside of the cocoon and thus also the (back-) scatter of a given excitation depends on the production process, e.g. the packaging process of the hardware module. Therefore, the measured (back-) scatter of the predetermined excitation influenced by the cocoon (deflection properties depending on the production process of the cocoon) provides a PUF specific to the tamper-protected hardware module. This PUF function of the tamper-protected semiconductor module is also referred to "cocoon PUF" for simplicity. Using this cocoon PUF, the hardware module—according to another more detailed embodiment of the invention—is able to detect any tampering of the tamper-protected semiconductor module, including non-invasive (or passive), semi-invasive, and full-invasive attacks to access the inside of the covering cocoon, respectively.

Another aspect of the invention is to control a tamper-protected hardware to boot in a controllable operating environment. Many attacks on tamper-protected hardware succeed by managing the attacked hardware to boot into a non-secure operating environment allowing the execution and/or exploit of the hardware. To prevent such type of attacks, the invention introduces so-called TRUSTLETs which can be considered integrity protected entity blocks (e.g. an entity block contains a code block and optionally a data section (e.g. comprising static data and/or initialization data or the like)) of software/firmware functionality to be executed by the tamper-protected hardware. The integrity of each TRUSTLET to be executed, e.g. within the bootstrapping of a tamper-protected hardware module, is verified prior to its execution using a public key infrastructure, so that the execution of malicious code is prevented.

According to one exemplary embodiment of the invention, a method for generating a software module (i.e. TRUSTLET) is provided. An entity block to be included to the software module is provided. The entity block can be considered executable piece of software/firmware (e.g. providing a given functionality). A fingerprint of the entity block using a hash function is generated. The fingerprint allows the verification of the integrity of the entity block. The fingerprint is then encrypted using the private key of a public key pair, to thereby generate a digital signature of the entity block. The entity block is then combined with the encrypted fingerprint to form an integrity protected entity block. Optionally, the entity block may be compressed prior to combining it with the encrypted fingerprint. Furthermore, the integrity protected entity block is encrypted using a random secret key to thereby form an encrypted and integrity protected entity block. The random secret key is also encrypted using the private key of a public key pair. The software module (i.e. TRUSTLET) is assembled (or generated) by combining the encrypted and integrity protected entity block, and the encrypted random secret key.

Optionally, each entity block that is included into a TRUSTLET may itself comprise functionality to execute another TRUSTLET, including the verification of the other TRUSTLET's integrity.

Furthermore, according to another embodiment of the invention, there is provided a method for bootstrapping a host device/hardware by executing a set of software modules (i.e. TRUSTLETs) in a given order. The bootstrapping may include:

a) decrypting an encrypted random secret key of one of said set of software modules to be executed next,
b) decrypting an encrypted and integrity protected entity block of the software module to be executed next, using the decrypted random secret key, to thereby obtain an integrity protected entity block of the software module to be executed,
c) decrypting an encrypted fingerprint comprised in the integrity protected entity block of the software module to be executed next, and
d) generating another fingerprint of the entity block using the same hash function as used to generate the encrypted fingerprint,
e) verifying the integrity of the entity block of the integrity protected entity block of the software module to be executed next by comparing the fingerprint decrypted in step c) with the fingerprint generated in step d), and
f) only in case the integrity of the entity block of the software module to be executed next is successfully verified, executing the entity block of the software module to be executed next, wherein steps a) to f) are performed for each software module of the set of software modules thereby realizing a chain of trust.

A further aspect of the invention, which can be considered to be a functional and design aspect of the tamper-protected hardware, is related to providing a validation process of the tamper-protected hardware, which could be considered an "initialization" of the tamper-protected hardware. This validation process/initialization of the tamper-protected hardware may be performed at a Root Certification Authority and provides the tamper-protected hardware module with a certificate that is used as the "identity" or identifying descriptor item (e.g. a serial number) of the tamper-protected hardware in any transaction performed. Any tamper-protected hardware that does not undergo the validation process/initialization at the Root Certification Authority and that has thus not obtained "its" certificate from the Root Certification Authority will be unusable in the target system of use.

BRIEF DESCRIPTION OF THE FIGURES

In the following the invention is described in more detail in reference to the attached figures and drawings. Similar or corresponding detail in the figures is marked with the same reference numerals.

FIG. 1 shows a block diagram of a tamper-protected hardware module (CASTOR) according to an exemplary embodiment of the invention, FIG. 2 shows a generation process of a TRUSTLET according to an exemplary embodiment of the invention, FIG. 3 shows the process for validating a TRUSTLET prior to its execution according to an exemplary embodiment of the invention, FIG. 4 shows an exemplary trusted bootstrapping of a CASTOR using TRUSTLETs according to an exemplary embodiment of the invention, FIG. 5 shows a comparison of a Read Only Memory (ROM), a Crypto-Function and a Physical Unclonable Function (PUF), FIG. 6 exemplifies the PSSBI approach provided by the API Filter of the CASTOR's firmware in combination with the hardware according to an exemplary embodiment of the invention, FIG. 7 exemplifies the logical PSSBI filter interface functionalism according to an exemplary embodiment of the invention, FIG. 8 shows an exemplary crypto-coprocessor implemented as a reconfigurable array of Processing-Elements and switch-boxes (FPGA), FIG. 9 shows a single processing element of the exemplary crypto-coprocessor, FIG. 10 exemplifies the operation of a switch-box interconnecting processing element, FIG. 11 shows an exemplary tamper-protected semiconductor module provided with a cocoon PUF as chip carrier and/or housing, also known as a chip container or chip package, FIG. 12 shows an exemplary embodiment of a hardware module containing sensor elements and emitters for an excitation comprised by the tamper-protected semiconductor module of FIG. 11, FIG. 13 exemplifies the separation of a secret by a Helper-Data generation function based on the secret and the PUF data (fingerprint) provided by a PUF, and FIG. 14 exemplifies the reconstruction of the secret by a secret generation function based on the Helper-Data and the PUF data (fingerprint) provided by a PUF, FIG. 15 shows an exemplary trusted bootstrapping model covering the serial chain strategy of a CASTOR using TRUSTLETs according to an exemplary embodiment of the invention, FIG. 16 shows an exemplary trusted bootstrapping model covering the central chain strategy of a CASTOR using TRUSTLETs according to an exemplary embodiment of the invention, and FIG. 17 shows an exemplary trusted bootstrapping model covering a hybrid form variation strategy of a CASTOR using TRUSTLETs according to an exemplary embodiment of the invention, FIG. 18 shows an exemplary digital electronic Wallet (eWallet) according to an exemplary embodiment of the invention, FIG. 19 shows how the concepts of physical effects affect the presented cocoon PUF mechanisms, FIG. 20 shows an exemplary principle measurement setup as used within the acquisition of measurands in the time domain by using radio frequency pulses (exemplary shown with reference to Gaussian nano-cycles), FIG. 21 shows an exemplary block diagram of a CASTOR (also referred to as "nano-Safe"), according to an exemplary embodiment of the invention, including a cocoon PUF, and FIG. 22 shows a cross-sectional view of a tamper-protected chip based on an exemplary BGA packaging according to an embodiment of the invention.

DETAILED DESCRIPTION

In the following different aspects of the invention will be described with respect to various exemplary embodiments that will at least in part refer to the Digital Cash/eCash context, i.e. the transfer of electronic coins between two peer-devices. However, it should be noted that the various aspects of the invention are not limited to a Digital Cash/eCash context, as it will become apparent from the following description. Aspects of the invention include design aspects of a tamper-protected hardware which is for example usable for transferring electronic tokens among two peer-devices; strategies and design aspect to improve resistibility of the tamper-protected hardware against attacks (in general), e.g. by means of a hardware PUF, cocoon PUF, etc.; a bootstrapping mechanism using special software modules (also referred to as TRUSTLETs herein) to avoid the execution of manipulated or other party code; etc. However, the aspects of the invention are not limited by this non-exhaustive list of aspects. Please note that for all cases where certain functionality is provided by some piece of hardware according to one of the various aspects of the invention herein, the invention also envisions protection for methods and systems making use of such piece of hardware.

Terminology

In the following paragraphs the meaning of some terms, frequently occurring in this document, will be defined before describing the various aspects of the invention in further detail.

Electronic Tokens

In this document, the term "electronic token" is used to denote an asset, liability, securitization of debt as a principle of an originate-to-distribute model, or secrets that are represented in a digital format, e.g. in form of a digital certificate. With respect to the some embodiments of related to the off-line transaction method of electronic tokens as discussed in the priority application PCT/EP2011/001219 by the same applicant, electronic tokens can be defined as provided in either one of these two PCT applications.

Moreover, it is assumed that the electronic tokens are provided in form of certificates that are issued by an issuing authority. Please note that there may be multiple issuing authorities of electronic tokens in the system, and electronic tokens of different issuing authorities may be the receivable in a transaction. In essence, the asset, liability, securitization of debt as a principle of an originate-to-distribute model or secret subject to a respective electronic token (and the—optional—remaining contents of the electronic token), is signed by the issuing authority.

Each electronic token can be checked and tracked down the chain of trust against the root certificate (also called Type-VI certificate herein) of the Root Certification Authority (RCA) as provided in the underlying hierarchical Public Key Infrastructure (see for example IETF RFC 3280, Internet X.509 Public Key Infrastructure, Certificate and Certificate Revocation List (CRL) Profile", available at http://www.ietf.org or ITU-T X.509, "Information technology—Open systems interconnection—The Directory: Public-key and attribute certificate frameworks", 2008 available at http://www.itu.int). As it will be outlined below, in one exemplary embodiment of the invention, the public key part of the signing key of the Root Certification Authority may be provided immune against counterfeit in the tamper-protected hardware module (e.g. in a ROM or EEPROM, "hardcoded" integrated circuit (IC) or other hardware structure thereof), so that even in case of attacks against the system, a manipulation can be detected by checking a certificate down the chain of trust to the root certificate. Depending on the application of the invention, the Root Certification Authority and the issuing authority may be or may not the same authority.

Electronic Wallets (eWallets)

eWallets are electronic devices containing at least one secure money purse chip (an exemplary embodiment of the tamper-protected semiconductor module, which is sometimes also referred to as CASTOR or nano-safe herein) with integrated and external non-volatile storage. eWallets may be capable of storing and transferring electronic tokens (eCoins) off-line from one eWallet to another eWallet using the teleportation transfer scheme as described in the priority application PCT/EP2011/001219 of the same applicant. eWallets in their entirety could be considered to build an ecosystem für digital-cash-like currencies. Their cross-linking accession is based on the IP-infrastructure (IPv4, IPv6). This means a direct one-to-one transformation of the common knowledged cash-exchanging way from the physical space into the Internet space without any intermediates. FIG. 18 exemplarily shows a stand-alone eWallet according to one exemplary embodiment of the invention. The eWallet may for example comprise a display and a multi-touch-panel or other input means for entering data into same. Optionally, the eWallet can also be equipped with an accelerometer as an input means allowing the user to interact with the eWallet. For example, by the user's movement of the eWallet can be measured by the accelerometer and could be translated into a user input. The movement of the eWallet by the user may thus for example acknowledge a question to the user, e.g. to authorize a transaction, such as a payment. The eWallet may also have one or more communication-interfaces, e.g. in order to allow for eWallet-to-eWallet transactions and eWallet-to-Internet connections (which can be operated without any external host). Of course, the construction of eWallets is not restricted to such a complete scenario, due to cost and other reasons it will be possible to design them to include only functional elements allowing the eWallet to work within an envisioned host scenario.

Signing and Certificates

A digital cryptographic signature is based on a mathematical scheme to demonstrate and provide the authenticity of a digital message or document by a proof. A valid digital signature (digital signature schemes herein are based upon cryptographic principles) makes a recipient believe the message has been created by a known sender, and it hasn't altered during transition. Digital signatures are commonly used for software distribution, financial transactions, and in other cases where it is important to detect forgery or tampering. They employ a type of asymmetric cryptography. For messages sent through a non-secure channel, a properly implemented digital signature gives the receiver reason to believe the message was sent by the claimed sender. Digital signatures can also provide non-repudiation, meaning that the signer cannot successfully claim they did not sign a message, while also claiming their private key remains secret; further, some non-repudiation schemes offer a time stamp for the digital signature, so that even if the private key is exposed, the signature is valid nonetheless.

Digitally signed messages may contain anything representable by a bit-string: Examples include keys, electronic tokens, electronic mails, contracts, or messages sent by the presented off-line transaction protocol. A signature can be applied to a bit-string (representing the data record/message to be signed) by using a hash function to calculate a hash value of the bit-string and to encrypt the hash value using a private signing key of the signing party. The encrypted hash value forms the so-called signature of the bit-string. Authenticity of the bit-string can be verified by a party by freshly calculating the hash value of the bit-string using the same hash function as used in signing the bit-string, and comparing the freshly generated hash value with the decrypted hash value of the signature—if the hash values match each other, the bit-string has not been altered. For decryption of the encrypted hash value (i.e. the signature), the counterpart public key of the private signing key of the signing party is used. This public key may be for example provided by a public key certificate (see below).

In the simplest form, a message and its signature is also called a "certificate". An electronic token that is implemented as a certificate thus contains at minimum a data record of the electronic token and a signature applied on the data record by the issuing authority. In another embodiment, the electronic tokens are provided in form of ITU-T X.509-compliant (version 3) certificates. For example, considering an eCash system, an eCoin can be considered to comprise a data record containing at least the value of the eCoin and a serial number thereof, and optionally currency information. The eCoin is provided in form of a certificate, i.e. contains the data record signed by the issuing authority.

In cryptography, a public key certificate (also known as a digital certificate or identity certificate) is an electronic document which uses a digital signature to bind a public key with a data record. In most cases this data record contains identity information such as the name of a person or an organization, their address, etc. These data records conclude not only information about a Root Certification Authority (RCA) and Certification Authorities (CAs) based on the ITU-T X.509 (version 3) PKI trust standard, but also about electronic mints (eMints), tamper-protected semiconductor modules (CASTORs/eWallets), electronic tokens (such as for example eCoins), acknowledge tickets, challenges and responses, eDocs and other system-related objects.

The public key certificate can be used to verify that a public key belongs to an entity (e.g. an individual, an organization or a tamper-protected semiconductor module). The digital signature(s) on a certificate are attestations by the certificate signer that the data record information and the public key belong together.

Summary of Functionality & Design of the Tamper-Protected Hardware

As noted above, aspects of the invention focus on the functionality of the tamper-protected hardware (as for example provided by its firmware), and on the design of the tamper-protected hardware so as to avoid misuse and/or cloning of the tamper-protected hardware and its transaction system. It will become apparent from the following that there also often is synergy between functionality and design concepts, which, in combination, improve the robustness of the transaction system. Furthermore, it should be noted that the different designs improve the tamper-resistance on the chip level and/or on the semiconductor module level and so far on the device level.

As to the functionality of the tamper-protected hardware, same may be inter alia responsible for executing the off-line transaction protocol according to one of the various embodiments described in priority application PCT/EP2011/001219 of the same applicant in a tamper-protected environment, which is one important security aspect of the system disclosed in the priority application. The respective functionality may be provided by the firmware (e.g. by means of TRUSTLET(s)—see below) or may be provided in some dedicated hardware of the tamper-protected hardware.

A tamper-protected hardware module (as part of a tamper-protected semiconductor module) could be for example a tamper-protected die or provided as a tamper-protected IC. The tamper-protected IC may be for example implemented as a tamper-protected die or multi-die having a tamper-protected enclosure as will be outlined below in more detail.

Furthermore, for enabling communication between the two tamper-protected semiconductor modules via a peer-to-peer link, some communication interface needs to be accessible and usable by a tamper-protected semiconductor module. Depending on the implementation, a tamper-protected semiconductor module may be provided with one or more wired and/or wireless communication interfaces directly, or one or more wired and/or wireless communication interfaces may be implemented internally in the device housing or externally to the device housing accessible to the tamper-protected semiconductor module via an (internal and/or external) I/O-interface (I/O-port) thereof. For example, the tamper-protected semiconductor module and the communication interface(s) could be provided in a host device, which could be—depending on the application—a PDA, PAD, mobile (smart) phone, or other portable device, a cash system provided at a Point of Sale, Access Control System (e.g. in a subway, in an airport, at train state, in an aircraft, fair ground, sports stadium, cinema, etc.), just to name a few.

A device comprising a tamper-protected semiconductor module could thus be provided with one or more wired and/or wireless interfaces The wireless interfaces could include at least one of a Radio Frequency IDentification (RFID) interface, a Near Field Communication interface (NFC), a Bluetooth interface (BTI), a WLAN interface (IEEE 802.11), a WiMAX interface (IEEE 802.16), a WIDI, WirelessHD or WiHD interface, a Wireless Gigabit Alliance (WiGig) interface, a Wireless Home Digital Interface (WHDI), a Wireless USB interface, and a mobile communications interface according to a 3GPP or 3GPP2 standard. The wired interfaces could for example include at least one choice of either an USB interface, an Ethernet interface (IEEE 802.3), a PanelLink interface, a DisplayPort interface, a SATA interface, a Light Peak interface, a Thunderbold interface, a HomePlug interface, a PowerLAN interface, a Powerline Communication (PLC) interface (IEEE 1901) and a FireWire interface (IEEE 1394).

Generally, one could also consider combining tamper-protected semiconductor modules with additional hardware elements, such as memory (volatile memory and/or non-volatile memory), communication interface(s), etc. within the same die and/or another enclosure, e.g. a separate shared housing, which may be referred to as an electronic wallet (eWallet) or as single IC. This electronic wallet may then in turn be integrated into the respective devices.

Another functionality provided by a tamper-protected semiconductor module according to another embodiment of the invention is the possibility to perform a secure bootstrapping process of its hardware module, thereby avoiding malicious firmware being executed on the tamper-protected semiconductor module. This concept of performing a secure bootstrapping by means of TRUSTLETs (i.e. specially designed software modules of executable code) is another aspect of the invention which is not limited to use in a tamper-protected semiconductor module but may be used for bootstrapping any hardware in general, independent of their utilization in a transaction system.

The PUF Mechanism

A Physical Unclonable Function or PUF is a function that is embodied in a physical structure and is easy to evaluate but hard to predict. Further, an individual PUF device must be easy to make but practically impossible to duplicate, even given the exact manufacturing process that produced it. In this respect it is the hardware analogue of a one-way function.

Rather than embodying a single cryptographic key, PUFs can be used to implement challenge-response authentication. When a physical stimulus (excitation) is applied to the structure, it reacts in an unpredictable way due to the complex interaction of the stimulus with the physical microstructure of the device. This exact microstructure depends on physical factors introduced during manufacture which are unpredictable. The applied stimulus is called the challenge, and the reaction of the PUF is called the response. A specific challenge and its corresponding response together form a Challenge-Response-Pair (CRP). The device's identity is established by the properties of the microstructure itself. As this structure is not directly revealed by the challenge-response mechanism such a device is resistant to spoofing attacks.

Uncloneability means that each PUF device has a unique and unpredictable way of mapping challenges to responses, even if it was manufactured with the same process as a similar device, and it is infeasible to construct a PUF with the same challenge-response behavior as another given PUF because exact control over the manufacturing process is infeasible.

Different sources of physical randomness can be used in PUFs. A distinction is made between PUFs in which physical randomness is explicitly introduced and PUFs that use randomness that is intrinsically present in a physical system. To conclude, that means the secrets are not stored anyway in digital form on the device containing the PUF or elsewhere.

According to another aspect of the invention, hardware modules could be provided with a hardware structure that provides a Physical Unclonable Function (PUF) which can aid the improvement of their tamper resistance. A set of known challenges and their respective corresponding responses of the hardware PUF could then be used to verify integrity of the tamper-protected hardware modules: Basically, the hardware structure implementing the hardware PUF could be challenged by one or more challenges for which at least one response to a challenge is known, and in case the tamper-protected hardware module is a "cloned" tamper-protected semiconductor module, the hardware PUF response provided by the hardware structure will not match the expected and known response(s).

In another optional implementation the response of the hardware PUF may be compressed using a cryptographic hash function. For example, in applications where a response of the hardware PUF is used only to be checked for being correct (i.e. matching/not matching a known response of the un-tampered hardware module) this implementation may be advantageously used to reduce the size of the response data, which could be for example of interest in case one or more responses of the hardware PUF need to be provided via a communications interface to another party providing the challenge(s). In this alternative exemplary implementation a response of the hardware PUF to a given challenge can be verified (and thereby the integrity of the tamper-protected hardware module) by comparing the hash value thereof to the hash value of the known response of the hardware PUF to this given challenge. Of course, the same cryptographic hash function needs to be used to (re)calculate the hash values.

Moreover, in a more advanced implementation, prior to "hash compression" of a response by the hardware PUF, the response is stabilized against minor deviations introduced by the physical hardware nature of the hardware PUF. Such stabilization could be for example realized by functionality used within information and coding theory for applications in computer science and telecommunication like error detection and correction or error control techniques (Error-Correcting-Code, ECC) used for the detection of errors and reconstruction of the original, error-free data.

Another possible way to use the hardware PUF for securing the tamper-protected hardware module is its utilization in a segmentation process of secrets used within the tamper-protected semiconductor module: A secret is split into two parts using a so called "constructor function" (one exemplary way to achieve that is one aspect of the Vernam-Chiffre by Gilbert Vernam): Such construction function uses the hardware PUF to produce a file called Helper-Data which constitutes one of the secret's parts. Due to the unique nature of the hardware PUF (fingerprint), the Helper-Data is also unique. The original secret can only be reconstructed if both, the (correct) hardware PUF (fingerprint) and the correct Helper-Data, are applied. This procedure can be used to avoid digitally storing a secret in the hardware. The secret, once used, can be removed from all internal semiconductor registers and memories. The secret will be extracted from the hardware as required.

Chip-Internal Hardware PUFs

For example, in one exemplary embodiment of the invention, the tamper-protected hardware module comprises a hardware structure providing a PUF. A processor unit comprised by the tamper-protected hardware module provides, to the hardware structure implementing the PUF, at least one challenge, for which the correct PUF response by hardware structure implementing the PUF is known. The processor receives a respective PUF response for each challenge provided to the hardware structure implementing the PUF, and verifies integrity of the tamper-protected hardware module by checking whether the response to the at least one challenge for which the correct PUF response is known is matching the response received from the hardware structure implementing the PUF.

According to a more advanced embodiment of the invention the tamper-protected hardware module further comprises an I/O-interface for receiving at least one challenge for which the correct (cryptographic hash of) hardware PUF response by hardware structure implementing the hardware PUF is known. The respective (cryptographic hash of) the hardware PUF response for each challenge applied to the hardware structure implementing the hardware PUF could be then made available outside the tamper-protected hardware module through the I/O-interface.

This would e.g. allow external authorities or devices to check the integrity of the tamper-protected hardware module. Hence, the challenge(s) to the hardware PUF could be received from a device comprising the tamper-protected hardware module (i.e. from an "external component" of the device) or on-line from another, external device. Likewise, the respective (cryptographic hash of) hardware PUF responses for each challenge provided to the hardware structure implementing the PUF could be provided to the device comprising the tamper-protected hardware module or on-line to the external device, respectively.

An integrity check of the tamper-protected hardware module utilizing the hardware structure providing the PUF may for example be a tamper-protected hardware module function, implemented by the firmware (e.g. upon power-up or reset of the tamper-protected hardware module). For this purpose, in another embodiment, the tamper-protected hardware module may further comprise a storage unit for storing a set of challenges and their (known) corresponding (cryptographic hash of) hardware PUF responses. In one exemplary embodiment, the challenges and their corresponding (cryptographic hash of) hardware PUF responses are signed by a Root Certification Authority to allow verification of their integrity.

The tamper-protected hardware module may verify the integrity of at least one challenge and its (cryptographic hash of) hardware PUF response based on its signature. The challenges and their corresponding (cryptographic hash of) hardware PUF responses could for example be signed by the Root Certification Authority using a signing key-pair's private signing key, while the public key is provided immune against counterfeit in the tamper-protected hardware module, is used to verify the integrity of the challenges and their corresponding (cryptographic hash of) hardware PUF responses.

Moreover, another embodiment of the invention relates to a tamper-protected semiconductor module provided with a tamper-protected hardware module having a hardware structure implementing a PUF, as discussed above. Further, another embodiment of the invention provides a device which comprises such tamper-protected semiconductor module.

The type of the hardware PUF can be of standard hardware (silicon, optical, magnetic, acoustic, coating, butterfly, or intrinsic) PUF, or even a cocoon PUF.

Semiconductor Modules with Cocoon PUFs

Another aspect of the invention is related to the design of the tamper-protected semiconductor module so as to avoid misuse and cloning of the tamper-protected semiconductor module. Please note that this aspect is independent of the other aspects of the invention provided herein, but—in some embodiments of the invention—may nevertheless be used in combination with them to further improve tamper resistance.

The basic approach underlying this aspect of the invention is to design a semiconductor module which has unique properties with respect to the deflection of a physical measurand in response to an excitation (which could also be denoted a challenge). These unique deflection properties are caused by natural variances or deliberate stochastic parameter variations introduced during the production process of the semiconductor module and are thus capable of uniquely identifying the semiconductor module. Further, any attempt to tamper the semiconductor module will alter its deflection properties, which makes tampering attempts observable by the semiconductor module. Therefore, it is referred to as "tamper-protected". Especially in a "cocoon PUF" (as explained below), opening the cocoon in any way will destroy the recreation ability (and the respective secret).

In one exemplary embodiment of the invention a tamper-protected semiconductor module comprising a hardware module is provided. This hardware module comprises one or more emitters to emit a predetermined excitation which can be measured as a physical measurand (German: Messgröße). Further, the hardware module may comprise one or more sensors for sensing the (back-) scatter of the predetermined excitation as physical measurand in a contactless and/or contact-based manner. The tamper-protected semiconductor module further has a cocoon encasing the hardware module. This cocoon may also be referred to as a package or housing. The cocoon is configured to influence the (back-) scatter of the predetermined excitation to be detected by the sensor(s).

Qualities

PUF systems can be graded based on quality criteria. Exemplary criteria of relevance are:

How gets a manipulation (of the PUF itself and on the surrounding circuitry/circuit) detected?

In case of detection, how is the system able to react? Does it need electrical energy for it?

How big is the expected (statistical) failure rate, what happens if the attack gets not detected?

What's the level of protection loss of the whole system in case of single successful attacks?

How big is the amount of information the system is able to store within the analog PUF?

Even the last criterion is important in times, where today's symmetrical keys have sizes about 256 bits and digital certificates are even a lot bigger.

As already said, cocoon PUFs jacket the protected system, they are a component of a functionalization of the package, extending the mechanical physical functionality to provide structural and logical data integrity. In case the protected device is an electrical semiconductor module, the connection terminals (wire connectors to the bond landings areas/pads of the die) may be passed through the cocoon to realize the outer connection to the Printed Circuit Board (PCB).

FIG. 22 shows a cross-sectional view of tamper-protected chip exemplarily based on a BGA packaging according to an exemplary embodiment of the invention. As depicted in FIG. 21 the cocoon is not a part of the cocoon PUF circuitry, it is even not part of the die. It can be considered to form an encasement, which may be connected—in one exemplary embodiment of the invention—by electrode coupling with the dedicated cocoon PUF circuitry in the inside.

The cocoon itself consists for example of a binding matrix (e.g. made of a synthetic material, ceramic, etc.). This matrix may be formed by the potting material with less or even no interactions to the used excitation principle. This principle implies matter containing smart structured materials and/or clusters, also referred to as granules herein. Examples of matter with the required attributes are metallic and/or polymer-based particles/composites in dielectric and/or magnetic matrices. Their attributes based on physical effects like electronic conductivity ranging from single-electron hopping and tunneling to percolation, surface plasmons giving rise to characteristic optical adsorption, ferromagnetic single domain behavior and superparamagnetism, granular giant magnetoresistance, and enhancement of catalytic activity. A profile of an exemplary utilization is named CASTOR and depicted in FIG. 22.

The packaging in FIG. 22 shows in its center the circuit carrier (named Multi-layer substrate/Interposer) as the base for the mounted bare-die or chip (silicon device) connected in this example as flip-chip through the use of ball grids or bumps forming the protected CASTOR (the protected device soldered on the PCB). The covering cocoon builds the surrounding wrapping consisting of a potting material including a plurality of (in material, size and form) different types of granulates from nano-up to macro-sized particles. All connection terminals (can be hundreds and even more) are going through the cocoon to connect the CASTOR chip with the PCB (in the exemplary case via ball grids). There is optionally a shielding coat in combination with a finishing housing on the outer side of the cocoon. The mechanism of action of a shielding is a combination of reflecting and absorbing or attenuating an excitation, so that only very little excitation would penetrate the shield.

In this example the shield jackets the housing of the cocoon PUF. In another exemplary implementation, the potting material with the included granules, the shielding and the housing is integrated into a single cocoon unit.

Utilization

FIG. 21 shows a block diagram of a tamper-protected semiconductor module (nano-Safe) including a cocoon PUF according to an embodiment of the invention. In the analogue domain, the module comprises a cocoon PUF and an emitter-/sensor phalanx for emitting the excitation of the cocoon PUF and receiving its back-scatter. The emitter-/sensor phalanx can be also considered part of the digital domain of the tamper-protected semiconductor module (nano-Safe) since it may also provide analogue-to-digital conversion (ADC) and vice-versa (DAC). Alternatively, a separate ADC and/or DAC circuitry could be provided within the tamper-protected semiconductor module (nano-Safe). Moreover, the digital domain of the tamper-protected semiconductor module (nano-Safe) comprises a fuzzy-extractor for accessing Helper-Data and a key control unit. The digital domain may also be referred to as the cocoon PUF circuitry. The key control unit may be communicatively coupled to further circuitry of the tamper-protected semiconductor module (nano-Safe) that may use the secret of the tamper-protected semiconductor module (nano-Safe). This circuitry ("Third 'IP' Party's circuitry using the Secret") may be part of the tamper-protected semiconductor module (nano-Safe).

After the die production (of the semiconductor die, the Q&A selection, the integration into its housing) process, the tamper-protected semiconductor module (nano-Safe) receives its secret: Within a controlled environment (meaning not within the fab, but under control of the IP holder), the secret is injected from the outside into the cocoon PUF circuit (e.g. through the key control unit) as depicted in FIG. 21. This procedure can be also called enrollment and is comparable to the personalization of smart card systems. During this enrollment the normal (current) state of the cocoon PUF is measured, the resulting fingerprint extracted out of the response of the cocoon PUF is then intermixed with the injected secret and interwoven within the encoding process for the secret. This takes care of facts like variations introduced by the manufacturing and the mechanical tolerances of the individual cocoon PUF and is used as part of the reference of future acquired (real-time) measurands.

This mechanism in combination with a so called Helper-Data reconstruction allows a flexible secret regeneration (only from the inside of a cocoon). Such a recombination of two (previously split within the segmentation process) data record parts is comparable to the application of one aspect of the Vernam-Chiffre by Gilbert Vernam. This allows the implementation of a "Physically Obscured Key" (POK) storage mechanism, mentioning the fact, that the secret gets "distributed" into the cocoon PUF structure: The fixed fingerprint of the cocoon PUF is cryptographically combined with the changeable Helper-Data to form the secret. The medium for the Helper-Data is rewritable digital memory storage, the fingerprint is property of the cocoon. Their combination reveals the secret.

The packaging of the hardware module (in one exemplary embodiment of the invention the semiconductor die) mutates into an analog read/write storage based on the above described mechanism, only capable to read and reconstruct the secret from the inside of the cocoon protected environment.

Principle of Protection

From a hackers perspective, the aim is to corrupt the functionality of the protected device by changing the firmware (software used by the protected device) or hardware (conducting paths/wires, transistors, diodes, gates, memory cells et. al. functionality). This has the need of "tunneling through" the cocoon as a precondition. The creation of this "tunnel" will change the fingerprint of the cocoon PUF in a significant way, so that the previously stored secret (POK) will never again being able to reconstruct; the secret is vanished. This does not depend on a failed target/actual-comparison, but on the change measurands acquired from the cocoon PUF after the "tunneling through", which do no longer correspond to the original ones to needed to reconstruct the original fingerprint. This is fundamental based on the fact that the cocoon is ideally a 360 degree protection implemented by functionalization of the packing (the cocoon). The use of cocoon PUFs in tamper-protected semiconductor modules/chips therefore targets and aims the development of a new cryptographic security primitive (element).

Cocoon PUFs based on material effects are not build on or constructed within the semiconductor die, but implemented in the cocoon wrapping thereof. This adds a lot of degrees of freedom to the production proceedings (no limits as introduced by the silicon process) and even to the Electronic Design Automation (EDA) process of the die. Only the required analysis electronic (e.g. the fuzzy extractor for carrying out the fingerprint and the emitter-/sensor phalanx) may thus be situated on the die. Another positive aspect is the (higher) amount of material in comparison to the protected system (e.g. the die), which may allow for a higher storage capacity for the secret in comparison to other known PUF systems.

The idea underlying a resistant wrapping cocoon PUF is to hide secret information to be protected in the cocoon structure. In exemplary embodiments of the invention, a cocoon structure may protect the secret information on the molecular level of the cocoon material. Particles (e.g. in different shapes and sizes, including nanosized particles), liquids or gas filled bubbles in a potting matrix effect local changes in permittivity ($\varepsilon$), permeability ($\mu$) or conductivity ($\sigma$) following a linear and/or nonlinear unpredictable function. They interact with a predetermined excitation by using the dielectric and magnetic matter material mechanisms of action. This is also referenced in FIG. 19, where the common usage of near-field impedance spectroscopy effects is presented in a consolidated picture.

Their inhomogeneous geometrical distribution dopant density ranging from the nano- to macro length scales within the matrix is a stochastic process fixed within the production process and guaranties spatial random distortions of the measured effects. This makes every cocoon being a unique specimen, containing extractable information: The cocoon becomes an analog storage device (POK).

Since the deflection properties of the inside of the cocoon and thus the (back-) scatter of a given excitation is influenced by natural or deliberate variations in the production process, e.g. the packaging process of the hardware module, the measured (back-) scatter of the predetermined excitation influenced by the cocoon provides a Physical Unclonable Function (PUF) specific to the tamper-protected semiconductor module. For simplicity the tamper-protected semiconductor module's PUF function provided by the unique deflection properties of the cocoon is also referred to "cocoon PUF". Using this cocoon PUF, the hardware module—according to another more detailed embodiment of the invention—is able to detect or making impossible any tampering of the tamper-protected semiconductor module, respectively, and non-invasive (or "passive", e.g. scanning the tamper-protected semiconductor module through a beam of (LASER) light, other radiation fields or screening technology), semi-invasive and full-invasive attacks to access the inside of the cocoon, respectively the hardware module.

Furthermore, in another embodiment of the invention, the hardware module makes itself temporarily or permanently unusable, once the hardware module detects a tampering of the tamper-protected semiconductor module.

Please note that in the following it will be often referred to "emitters" and "sensors" in plural. However, also implementations where the hardware module has only one single emitter and/or one single sensor are encompassed by this invention.

How the tamper-protected semiconductor module is using its cocoon PUF functionality to detect tampering may be implemented in various ways. For example, in one exemplary embodiment of the invention, the tamper-protected semiconductor module may generate a digital "measured fingerprint" (denoting the fingerprint that has—so to say—just been "measured" by the sensors) of the tamper-protected semiconductor module from the measured values (German: Messwerte) of the (back-) scatter of the excitation provided by the respective sensors and detects an attempt to tamper the tamper-protected semiconductor module by comparing the measured digital fingerprint with a digitized fingerprint of the un-tampered tamper-protected semiconductor module (which may have been for example stored previously). It should be apparent that repeated verification of the integrity of the cocoon, respectively, the tamper-protected semiconductor module requires the same predetermined excitation emitted in each verification process, i.e. each measurement of the (back-) scatter of the predetermined excitation (for details on the "same" predetermined excitation, please see below).

In another exemplary embodiment of the invention, the tamper-protected semiconductor module also generates a measured digital fingerprint of the tamper-protected semiconductor module from the measured values of (back-) scatter of the excitation provided by the sensors. Further, a processor unit of the hardware module could receive (so-called) Helper-Data from storage, and generates a secret based on the measured digital fingerprint and the Helper-Data (a two-factor secret, as explained with reference to the Vernam-Chiffre). In case the measured digital fingerprint is not sufficiently corresponding to the "correct" (previously measured and digitized) fingerprint of the un-tampered tamper-protected semiconductor module, the generated (re-combined two-factor) secret is incorrect, meaning that it is not corresponding to the "correct" secret that would have been obtained when generating the secret using the Helper-Data and the "correct" fingerprint of the un-tampered tamper-protected semiconductor module.

In such case, the generation of an incorrect secret implies that the unique deflection properties inside the cocoon must have changed somehow (i.e. the cocoon PUF function of the tamper-protected semiconductor module has also changed), which in turn indicates an attempt to try to access the inside of the cocoon (respectively, tamper-protected semiconductor module) yielding a tampering attempt.

There are also different possibilities how to provide one or more emitters on the hardware module. According to one exemplary embodiment of the invention, the one or more emitters is/are circuitry and/or integrated circuits of the hardware. Hence, in some applications, the individual circuit components, wires or some chip areas of the hardware module may have properties of an oscillator/clock generator/radiator and may thus be used as emitters (thus no separate emitters may need to be used). In order to ensure the emission of the predetermined excitation, the tamper-protected semiconductor module operates the emitters at predetermined operation conditions during the period in which the sensors are to measure the (back-) scatter of the excitation.

Alternatively, or in addition to those emitter(s) formed by circuitry and/or integrated circuits of the hardware module, in another exemplary embodiment, the one or more emitters are provided as one or more oscillators comprised by the hardware modules. The oscillators together (and optionally in combination with the emitter(s) formed by circuitry and/or integrated circuits of the hardware module) emit the predetermined excitation.

Moreover, it should be noted that the excitation by the emitter(s) may be an electromagnetic excitation (e.g. electromagnetic fields (e.g. in the radio spectrum), X-ray, etc.), an optical excitation (e.g. generated by LED or LASER elements) and acoustic excitation (e.g. infra- or ultrasonic), or combinations thereof. Apparently, the sensors that sense the (back-) scatter of the excitation are electromagnetic sensors, electric field sensors, magnetic field sensors, acoustic sensors, optical sensors or other radiation sensors, depending on the excitation type. For example, the sensors and/or the emitters provided as part of the hardware module may be semiconductor elements and/or Micro-Electro-Mechanical-Systems (MEMS) and/or Nano-Electro-Mechanical-Systems (NEMS). MEMS are also known as Micro-Machines (MM) or Micro-System-Technology (MST).

Furthermore, in one further embodiment of the invention, the cocoon comprises a shield to prevent interference with the predetermined excitation from the outside of the tamper-protected hardware. Another aspect of the shielding is to prevent undesirable emittance of the excitation to the outer world beyond the limits of the cocoon serving as covering (e.g. Electro-Magnetic-Interference, EMI, in case the excitation is of this type). Accordingly, the shielding ensures the sensors measure the (back-) scatter of the predetermined excitation within the limits of the cocoon (respectively, the shielding provided therein). The required type of shielding is of course depending on the type of the excitation by the emitter(s). Hence, the shielding can be an electromagnetic shielding, an electric shielding, a magnetic shielding, an acoustic shielding, an optical shielding or a combination thereof.

In a further exemplary embodiment of the invention, the shielding comprises or is a metallic plumbiferous or aluminum based shield.

In embodiments of the invention, where an acoustic shielding is desired, the shielding material may for example comprise or consist of structured permanently elastic foam like compounds. However, other materials that absorb sound and attenuate the acoustic excitation may also be used to provide an acoustic shield.

According to another embodiment of the invention, an optical shielding may comprise one or more surface reflectors or could be implemented as a surface reflector at least a portion of the hardware module. For example, in one exemplary implementation, the surface reflector(s) could be made of metal.

Further, in another embodiment of the invention, the cocoon is non-transparent in the optical and infrared spectrum of electromagnetic radiation. This feature may for example be advantageous to prevent non-invasive attacks on the inside of the tamper-protected semiconductor module (respectively, its cocoon as the outer part), e.g. by means of infrared light or other optical scanning methods.

Moreover, in another embodiment of the invention, the cocoon may have a high thermal conductivity. This may be advantageous in that heat (generated by the operation of the hardware modules circuitry and circuit components) may be provided to the outside of the cocoon, respectively, cooling of the hardware modules from the outside of the surrounding cocoon becomes possible.

In order to provide unique deflection properties inside the cocoon, the design of the cocoon (besides adding a shield) may ensure for such property. For example, in a further embodiment of the invention, the cocoon comprises a coating and/or a potting compound including a material or material mixture (e.g. granulate added to a conventional coating/potting material, such as a ceramic or a synthetic material) influencing the (back-) scatter of the predetermined excitation. Please note that the coating and/or potting is applied inside the shielding.

For example, in one exemplary implementation the material or the material mixture comprises a granulate whose granules are influencing the (back-) scatter of the predetermined excitation. In a more detailed implementation the granules of the material or the material mixture could for example have different mechanical dimensions: They may be of different size (e.g. nanosized granules to macro-sized granules) and/or different shape.

The granules of the material or the material mixture may be non-regularly (randomly) distributed in the potting material thereby influencing the (back-) scatter of the predetermined excitation in way unique to the tamper-protected semiconductor module. This may be for example achieved by the production process that is providing the coating and/or potting to form the cocoon encapsulating the hardware module. In one example, the potting material is made of ceramics and may contain a granulate of the material or the material mixture influencing the (back-) scatter of the predetermined excitation.

In another exemplary embodiment of the invention, the material or material of the shielding or the granules thereof are similar to the material mixture of the hardware module and/or its bonding with respect to their chemical characteristics (and optionally the physical characteristics). The idea behind this is to make full-invasive attacks on the tamper-protected semiconductor module more difficult: For example, the package being or including the cocoon of the tamper-protected semiconductor module might be removed using acids or chemical bases in order to access the inside hardware module. By choosing the chemical character of the cocoon's material and the hardware module's material (and/or its bonding) to have similar chemical resistance against acids/chemical bases, it is difficult to control the etching to remove the cocoon material only without damaging the hardware module or its bonding. In embodiments of the invention, bonding can be understood mean "connection" and applies insofar also to other connection techniques, e.g. so-called ball grid connections.

Similarity of the physical character may be another optionally desired property, since the physical characteristics influences the reaction time with the acid/base so that it becomes even more difficult to control the edging to only remove the cocoon material, while not damaging the hardware module or its bonding.

Regarding the predetermined excitation, there are also various ways to generate such predetermined excitation. Of course, to be able to reproduce the "fingerprint" (for the un-tampered case) the predetermined excitation should be the same for each measuring process that determines the actual "just measured" fingerprint. In practice it may be difficult to achieve identical excitations (for example, due to temperature variations, drift effects of physical material properties in time, noisy measurement, fuzzy sensors, etc.). Hence, the same excitations should not be interpreted as 100% identical excitations; however, the variations may be compensated by the generation process of the fingerprint from the measured values provided by the sensors, and/or countermeasures may keep variations of the excitation in an acceptable range not critical to the uniqueness and stability of the generated fingerprint. In one exemplary embodiment, the cocoon's influence on the (back-) scatter of the excitation to be detected by the sensors is insensible to change of temperature (in a definable range or desirable range of temperatures).

Please note, there may be a tradeoff, respectively a mutual influence, between the foreseeing countermeasures keeping variations of the excitation in an acceptable range not critical to the uniqueness and stability of the generated fingerprint and the generation process of the fingerprint from the measured values provided by the sensors (i.e. the measured values so to speak form the data base for the determination of the fingerprint): On the one hand, the generation process of the fingerprint may not reduce the data spectrum for the generation of the fingerprint in a way it loses its uniqueness; on the other hand, countermeasures keeping variations of the excitation in an acceptable range may aid to minimize the reduction of the data spectrum for the fingerprint but may be expensive to implement.

To generate a sufficiently wide data spectrum i.e. a sufficient number of measured values (respectively "bits" once the measured values are quantized) that can be used for the generation of the unique fingerprint of the tamper-protected semiconductor module, different possibilities to design the predetermined excitation of the one or more emitters are possible. For example, one possibility may be that the predetermined excitation is a constant predetermined excitation, i.e. not varying over time. Alternatively, the predetermined excitation could also be an excitation varying in a predetermined manner—which implies the sensors should measure the measurand multiple times within a measurement period. The variation of the excitation could for example be implemented by the hardware module comprising an excitation controller that controls the emitters individually or in combination to produce the predetermined excitation varying in time. For example, different sets of emitters are used in a given sequence in time to generate respective excitations (i.e. a predetermined sequence of individual excitations) that form the predetermined excitation.

In a further embodiment, the sensors to provide a measured value of the measurand that is to be part of the data base for generating the fingerprint could be controlled by the hardware module. For example, the hardware module may trigger/query different sets of sensors at different times of a measurement cycle to receive their measurement results. This control of the sensors may of course be readily combined with the control of the emitters described in the preceding paragraph.

Moreover, the hardware module protected by the cocoon may virtually be any hardware structure that should be made tamper resistant. In one exemplary embodiment of the invention, the hardware module is a die, a multi-die, or a chip comprising of one or more integrated circuits (ICs). Likewise and in another embodiment of the invention, the hardware module is a die, a multi-die, or a chip comprising of one or more ICs assembled on a circuit carrier (e.g. by means of a bonding process).

As indicated above, it may be possible that circuitry and/or integrated circuits of the hardware module is/are used as the one or more emitter(s) of the predetermined excitation.

With respect to the electromagnetic signal exchange nature, it is also possible to "check the channel" before executing the reconstruction process revealing the secret. Such a Physical Carrier Sensing (PCS) of the environment through passive scanning for later collision avoidance attitude may be useful to optimize the procedure.

In order to allow the emission of a predetermined excitation, according to one embodiment of the invention, the tamper-protected semiconductor module deactivates the (integrated) circuit parts of the hardware module occasionally during a measurement cycle in which the one or more sensor(s) detect the (back-) scatter of the predetermined excitation. For instance, the deactivation may be a deep power down to minimize the interference of the (integrated) circuit parts of the hardware module with the (back-) scatter of the predetermined excitation.

For the purpose of controlling emitters and sensors and optionally for deactivating the (integrated) circuit parts of the hardware module during a measurement cycle a measurement unit may be provided on the hardware module. This management unit may be considered an IC of the hardware module. The management unit is provided with an I/O-interface for transmitting and/or receiving standardized commands and/or data packets from the other integrated circuit parts of the hardware module, e.g. the sensors and emitters. For example, the measurement unit may coordinate the one or more sensor(s) and the one or more emitter(s) in a measurement cycle.

Please note the cocoon may be the housing of the hardware module or may be itself included in housing together with the hardware module. Likewise, the shielding of the tamper-protected semiconductor module could be part of the cocoon or may enclose same. In case a "separate" housing is provided, the cocoon could be provided in form of a malleable mass between the housing and the hardware module.

Another aspect of the invention is the provision of a method for manufacturing a tamper-protected semiconductor module with a cocoon PUF as described herein. According to an embodiment of the invention a manufacturing method of a tamper-protected semiconductor module with a cocoon PUF comprises of providing a hardware module equipped with one or more emitters for emitting a predetermined excitation that can be measured as a physical measurand, and one or more sensors for sensing the (back-) scatter of the excitation in form of the physical measurand in a contactless and/or contact-based manner. Further according to this manufacturing method, the hardware module is housed in a cocoon to obtain the tamper-protected semiconductor module, wherein the cocoon influences the (back-) scatter of the excitation detected by the sensors in a way unique to the tamper-protected semiconductor module.

In an exemplary embodiment of the invention, housing the hardware module in the cocoon includes the enclosure of the hardware module in a potting material, and encapsulating the hardware module enclosed by the potting material inside a shield to prevent interference with the predetermined excitation from the outside of the tamper-protected semiconductor module. As noted above, the shielding may be but is not necessarily part of the cocoon.

Furthermore, in another embodiment of the invention, the exemplified shielding is produced using one or more of the following technical processes for producing different layers of shielding material on the inside and/or outside of the cocoon surface:

sintering one or more shielding materials,
sputtering one or more shielding materials,
spraying, spritzing or bubbling one or more shielding materials (e.g. using High-Volume-/Low-Pressure plants (HVLP)),
coating and/or plating one or more shielding materials (e.g. electric conductive (finishing) paint/lacquers containing/made of epoxy, polyurethane or acrylic with expletive particles like silver, silver plated copper, pure copper or nickel),
immersing in one or more baths of fluids comprising the shielding material,
evaporating, optional in a vacuum, of one or more shielding materials (e.g. Physical Vapor Deposition (PVD)),
electroless plating one or more shielding materials (e.g. one layer/sheet/lamina e.g. of pure copper, followed by another layer/sheet/lamina e.g. of nickel-phosphorus alloy),
electrolysis using one or more same shielding materials.

Optionally, the shielding may be subject to (additional) thermal treatment.

In one exemplary embodiment of the invention, the potting material comprises conductive material or a conductive material mixture influencing the (back-) scatter of the excitation to be detected by the sensors provided on the hardware module. Optionally, the manufacturing method provides a passivation (e.g. electrical isolation) to the hardware module and/or to its outside.

In a further exemplary embodiment, the provision of the hardware module as part of the manufacturing process includes implementing the hardware module in a standard wafer process. For example, the standard wafer process is a silicon semiconductor process.

A further aspect of the invention is to provide a method to detect tamper attempts against a tamper-protected semiconductor module equipped with a cocoon PUF (the hardware module of the tamper-protected semiconductor module with the cocoon PUF):

a) causes the one or more emitters of the hardware module to emit predetermined excitation, and further
b) causes the one or more sensors of the hardware module to sense the (back-) scatter of the predetermined excitation reflected by the cocoon of the tamper-protected semiconductor module. Further, the hardware module then
c) generates a digital "measured fingerprint" from (back-) scatter of the predetermined excitation sensed by the one or more sensors, and
d) verifies the integrity of the cocoon by using the measured digital fingerprint recorded.

As before, the term "measured fingerprint" is used to denote the fingerprint derived from the just/last measured values of the (back-) scatter of the predetermined excitation sensed by the one or more sensors.

Please note that the hardware module may perform these steps a) to d) not only once, but also repeatedly. Hence, an ongoing verification of the integrity of the tamper-protected semiconductor module is possible. Steps a) to d) may be for example repeatedly performed in irregular intervals or on a random basis.

The method according to another embodiment of the invention further comprises a step e) of producing an interrupt, in case integrity could not be verified in step d). This interrupt may cause the hardware module disable itself permanently or temporarily.

In a further embodiment of the invention, the method further comprises a step f) of deactivating integrated circuit parts of the hardware module during a measurement cycle in which the one or more sensors detect the (back-) scatter of the predetermined excitation. This may be helpful to produce the same predetermined excitation in all measurements.

Furthermore, as noted previously, there may be different possibilities how to make use of the cocoon PUF for verifying the integrity of the cocoon/tamper-protected hardware module. In one exemplary embodiment of the invention the integrity of the cocoon is verified by comparing the measured digital fingerprint (i.e. the digital fingerprint just generated from the latest measured values of the sensors) with a digital fingerprint of the un-tampered cocoon (this latter fingerprint could also be referred to as the "reference fingerprint" or "un-tampered fingerprint"). For instance, the fingerprint of the un-tampered cocoon is stored in form of a certificate in a memory.

In a further exemplary embodiment, the method for checking the integrity of the cocoon may further comprise the following steps of g) initializing the hardware module by creating and recording a fingerprint of the un-tampered semiconductor module, h) securing this fingerprint of step g) using a certificate signed by an Certification Authority, and i) storing the certified fingerprint in a semiconductor non-volatile memory. In one exemplary embodiment, this certificate may be signed by the Root Certification Authority (RCA) or another Certification Authority that can be validated against the RCA's certificate containing the public key part of the RCA's public key-pair.

Another possibility for verifying the integrity of the cocoon is the use of the cocoon PUF as part of a key restoration process (two-factor secret). Using the cocoon PUF this key restoration process is used to recreate the key (also referred to as "recombined secret") from Helper-Data. The Helper-Data is generated based on the key (fingerprint) using the cocoon PUF of the un-tampered cocoon, respectively, un-tampered (tamper-protected) semiconductor module, which binds the recreation of the key (fingerprint) to this specific cocoon PUF. If the cocoon PUF is altered due to a tampering attempt, the key (fingerprint) may be temporarily or permanently destroyed, since the PUF of the cocoon will be temporarily or permanently changed as a result of the tampering attempt, so that the key (fingerprint) generation function is unable to reconstruct the correct key (fingerprint) (again) or due to the intention of the designer/IP owner to trigger a backlash. Hence, in this exemplary embodiment, the verification of the integrity of the cocoon is realized by means of a key (fingerprint) restoration process generating a key based on Helper-Data and the detected (back-) scatter of the predetermined excitation.

The generation of the Helper-Data may be e.g. part of an initialization procedure of the semiconductor module in an un-tampered case (e.g. by performing the initialization at a trusted party; a trusted party could be for example a Root Certification Authority, the manufacturer of the tamper-protected semiconductor module, the manufacturer of a device comprising the tamper-protected semiconductor module, the customer/user, etc.). Therefore, in another embodiment of the invention, the method further comprises the steps of g) initializing the hardware module by creating and recording a fingerprint of the un-tampered semiconductor module, and generating the Helper-Data based on the key and the sensed (back-) scatter of the predetermined excitation. This Helper-Data may then be stored in a non-volatile memory.

Please note that the Helper-Data may not need to be protected, since it is impossible to recreate the secret from the Helper-Data without the correct PUF (fingerprint). Hence, the Helper-Data may be stored either in the hardware module or in an external storage of a device or another hardware structure that contains the tamper-protected semiconductor module.

Such a cocoon PUF method could be for example made available within the value chain on two positions:

IP: within the EDA tool set as a primitive library element (the cocoon PUF circuitry without the cocoon itself) in form of a soft- or hard macro ready for the ASIC designer to "point and shoot", and Hardware: within production processes for the chip (fab) industry as a small change at the packaging point of the production line.

Encapsulation Through the Cocoon

Cocoon PUFs can be fundamental primitive security vaults well suited for semiconductor circuitry: A logical similar approach following the concept of a bank vault, however built mainly from functional (nano)sized material instead of sheathed steel and reinforced concrete. If such a security vault integrates also the necessary capability and intelligence to 'extract the secret out of the cocoon' only for the authorized user-circuitry inside the cocoon (such a behavior is known as read-proof-hardware, where the attacker cannot read information on the medium stored), it is capable to act in and enforce the security interests of the designers/IP-owners/users using a flexible policy control approach. This is a way to put security at work autonomously and self-reliant in unfriendly environments. Such a system is considered as general suitable to protect cryptographic artifacts (short: secrets) like keys for AES (Advanced Encryption Standard), ECC (Elliptic Curve Cryptography), or HASHes (a hash function is any algorithm that maps a mostly larger data set to a smaller (fixed length) data set, called the hash (key)), digital signatures in certificates, biometric data (e.g. human fingerprints), customer data (e.g. bank accounts), special algorithms or business logic coded in firmware which has to be executed in a secured and controlled environment and other IP based arbitrary data. This may all come in combination with the ability to provide strong authentication on an open-source Kerckhoffs' principle (cryptosystems should be secure even if everything about the system, except the key, is public knowledge). Moreover, a cocoon PUF is expected to provide significant more memory capacity than other PUFs, due to the greater volume of functional material without using space on the silicon itself (of course, the measurement logic (e.g. Fuzzy Extractor, Key Control, emitter-/receveiver phalanx, etc.) is a small fixed part of the silicon).

Chip designs using a cocoon PUF can help to enhance the attack resistance of System-on-Chip (SoC) devices with local intelligence and protected firmware (which can be placed inside or outside the security perimeter), complex CPUs, FPGAs, RFID-chips, containers for crypto material like Secure Element's (SE's) in SIM, USIM, ISIM or μSD-Cards, user related biometric information in the new identity card (nPA) and new passport (ePass) in Germany or wallet chips for digital cash to name a few by releasing them only in a safe-toughened appearance. ASIC designer do not need to be cryptographic specialists, knowing how to "make chips" will be enough. The silicon part of the cocoon PUF can be made available as library element so that it can be easily picked and integrated into the chip-under-development within the standard design Electronic Design Automation (EDA) process.

Hackers Perspective on Tamper Protection

The truth about tamper protection is that it is impossible to harden integrated circuits totally against all forms of attacks; this might also become true for the cocoon PUF concept. It is assumed, that—with enough 'energy' it will always be possible to analyze the functional logic out of any design. The only and single item which can be defended up to a sensible limit (security based on tamper-resistance is a matter of economics: the costs in money and time for breaking the system must be reasonably higher than the value of the protected assets) is the secret protected by the cocoon PUF approach. So the strategy of the cocoon PUF concept is to protect the secret and not the device. The challenge is to destroy this secret before the attacker can get it. It is this most important 'feature' of being tamper-evident, meaning that if the (sub-) micron structure is physically damaged (e.g. through an attack), its CRP (Challenge Response Pair) behavior changes noticeably and hence allows to detect the tampering. The issue at stake here is that every (semi)-invasive tampering meaning any physical manipulation causes this and that is it practically impossible to find a way to snatch the secret. In most PUF implementations, this property is only unproven implicit.

If the attacker surmounts the PUF in a way that the secret is still extractable than the remaining steps to be taken are easy: Tapping the internal interface to the PUF interface and initiating a secret reconstruction is enough. To prevent such a scenario, the most important "feature" of the cocoon PUF will be its fundamental ability to apply the read-proof effect even in a passive "out of service" supply voltage less state and making this inevitable: The fact of a cocoon cover fracture (this is a must to penetrate the cocoon interior "accessing the protected device" in a direct manner) is a sufficient condition for the secret to vanish.

Advantages of the Cocoon PUF

Concluding the introduction of the presented cocoon PUF technology, the following advantages may be obtained:

The cocoon PUF mechanism is based on material-inherent (non-silicon) functionality, It implements copy protection by making a system uncloneable, It implements misusage protection by making a system insensibly to reverse engineering, It encompasses passive destructing (without electricity) of the secret as countermeasure, It operates in potential unfriendly environments under "paranoidal assumptions" of continuous exposures to threats, It implements self-reliant autarky in combination with autonomy, It needs only a moderate silicon-sized footprint for the measurement circuitry, It is assumed of being cheap to manufacture on existing production lines, The application implements and emphasizes ease-of-use, no need to be a security specialist, Maze of Knossos—Configuration of the FPGA Another aspect of the invention is to provide a hardware module (chip) with a FPGA having a configuration of an array of Processing-Elements to provide a given functionality. Moreover, a storage unit of the tamper-protected semiconductor module could store signed configuration information ("fingerprint") indicating the initial configuration of the array of Processing-Elements of the FPGA of the hardware module. The hardware module's processor unit could then verify integrity of the hardware module by verifying the integrity of initial configuration information based on its signature and comparing the verified initial configuration information with configuration information of the Processing-Elements of the FPGA. If a mismatch is detected, the hardware module may for example disable itself temporarily or permanently. As this mechanism allows detecting attacks on the hardware module it can be considered tamper-protected. The principle of a configuration fingerprint may also be implemented with other programmable ICs (hardware structures) that have a unique, programming dependent configuration (excluding ROMs). For simplicity, it is referred to FPGAs herein, but the concept outlined herein may also be used in other programmable ICs (programmable hardware modules).

Please note that the use of a hardware structure providing a hardware PUF for which a set of challenges and corresponding (cryptographic hash of) responses is known and the use of a FPGA whose initial Processing-Elements' configuration is known within a hardware module in principle are two independent aspects of the invention to improve the robustness of a tamper-protected hardware module which may be used independently. However, it may of course be advantageous to use the combination of both of them (and optionally even more protections mechanisms) to improve the tamper-resistibility of the tamper-protected hardware module. In case the tamper-protected hardware module cannot verify its integrity, the tamper-protected hardware module is capable to disable itself temporarily or permanently.

On-Chip Trusted Time Source

Another aspect of the invention facilitating an improvement of the tamper-resistibility of the tamper-protected hardware module is the provision of an on-chip trusted time-source within the tamper-protected hardware module. Please note a trustable time-source is required for example in order to be able to verify the validity of all certificates (which do typically have an expiration date and time). In one exemplary embodiment, the on-chip of the tamper-protected hardware module's trusted time-source is implemented as a (strong) monotone timer which is erased after a predetermined time span upon disconnection from its power supply. Please note that the expression "predetermined time span" is intended to express the (strong) monotone timer will be erased once its counter value cannot longer be held in memory due to disconnection from the power supply. Please note also, in case the trusted time source is to be reinitialized after erasure, the tamper-protected hardware module may receive on-line the current date and time from a trustable authority, e.g. a Root Certification Authority or a CA, or from an eMint signed by a Root Certification Authority, and initialize the trusted time source with the current date and time only if the signature of the Root Certification Authority can be verified successfully.

It should be apparent that without a local valid trusted time-source, none of the certificates can be verified, so the reestablishment of the validity of the trusted time source should be performed first before any other protocol communication operation, including any transaction, can be done.

Crypto-Initialization of the Tamper-Protected Hardware Module (CASTOR)

Another aspect of the invention related to increasing the tamper-resistibility of a tamper-protected hardware module is to provide a validation process of the tamper-protected hardware module, which could be considered an "initialization" of the tamper-protected hardware module. This validation process/initialization of the tamper-protected hardware module may be performed at the Root Certification Authority and provides the tamper-protected hardware module with a certificate used as the "identity" or identifying descriptor item (e.g. a serial number) of the tamper-protected hardware module in any transaction performed. Any tamper-protected hardware module that does not undergo the validation process/initialization at the Root Certification Authority and that's thus not equipped with such certificate will be unusable in the transaction system. Hence, tamper-protected hardware modules embezzled from the production process become unusable.

For this purpose, according to an exemplary embodiment of the invention, a tamper-protected hardware module comprises a key generation unit which autonomously generates a predetermined set of one or more symmetric keys and one or more asymmetric (public) key-pairs in response to an initialization request. Optionally, the key generation unit could be adapted to autonomously generate the keys only once upon initialization.

One of these generated keys is used to identify the tamper-protected hardware module, respectively the tamper-protected semiconductor module comprising same, similar to an identifying descriptor item of the tamper-protected hardware. Furthermore, the tamper-protected hardware module is equipped with an I/O-interface for providing the key used for identification of the tamper-protected hardware module to the outside of the tamper-protected hardware module in response to the initialization request. Furthermore, through its I/O-interface the tamper-protected hardware module receives a certificate from a Root Certification Authority comprising the key used to identify the tamper-protected hardware module and stores the certificate comprising the key used for identification of the tamper-protected hardware module and (together with) the generated predetermined set of symmetric keys and asymmetric key-pairs in a storage unit.

The certificate of the Root Certification Authority provided as part of the initialization of the tamper-protected hardware module may for example further comprise public keys of the Root Certification Authority for encryption and verifying the Root Certification Authority's signatures. Moreover, the Root Certification Authority's certificate could optionally comprise the public key of the public key-pair for internal encryption and hashing purposes generated by the tamper-protected hardware module in response to an initialization request. For example the public keys may be used in the protection of a symmetric key for on-the-fly encryption/decryption of data as to be explained below (umbrella protection).

In another embodiment of the invention, besides the key/keys used to identify the tamper-protected hardware module, the key generation unit may further generate a symmetric key for on-the-fly encryption/decryption (also called umbrella encryption/decryption) of data to be maintained and/or stored inside or outside the tamper-protected hardware module in a host device including the tamper-protected hardware module prior to its exchange through the I/O-interface.

Furthermore, the symmetric key for on-the-fly encryption/decryption of data could be then stored by or in the external storage of a host device comprising the tamper-protected hardware module. In a more detailed exemplary embodiment, the symmetric key is processed as follows prior to its storage:

a) The symmetric key is first encrypted using a public key of an asymmetric key-pair of the Root Certification Authority.
b) Then the encrypted symmetric key of step a) is encrypted through a private key of a key-pair used for internal encryption, and hashing purposes being generated by the tamper-protected hardware module in response to an initialization request.
c) Finally, the double-encrypted symmetric key of step b) is signed using a public key of an asymmetric key-pair of the Root Certification Authority.

The signed and double-encrypted symmetric key of step c) is then stored by in a host device's external storage comprising the tamper-protected hardware module (i.e. a storage residing outside the tamper-protected hardware module).

In one embodiment of the invention, the predetermined set of one or more symmetric keys and one or more asymmetric key-pairs generated by the key generation unit comprises a public key-pair for internal encryption and hashing purposes being generated by the tamper-protected hardware module in response to an initialization request (i.e. the public key-pair used in step b) is inter alia used for encrypting the symmetric key for on-the-fly encryption/decryption of data mentioned above).

Moreover, in a more detailed exemplary implementation, the tamper-protected hardware module could on demand provide the public key part of the public key-pair for internal encryption and hashing purposes to the exterior of the tamper-protected hardware module via the I/O-interface.

For example, the symmetric key for on-the-fly encryption/decryption of data could be used to encrypt electronic tokens that then could be stored in encrypted form outside the tamper-protected hardware module in a host device including the tamper-protected hardware module. In case the tamper-protected hardware module is destroyed or rendered unusable (permanently or temporarily), the encrypted electronic tokens stored in a host device's storage outside to the tamper-protected hardware could be recovered by the Root Certification Authority (or alternatively by the Escalation Authority, EA), assuming that the Root Certification Authority maintains the respective tamper-protected hardware's public key-part of the public key-pair for internal encryption and hashing purposes, as described above.

The decision to enable or disable this functionality may be up to the user/owner of the tamper-protected hardware module. Accordingly, in one embodiment of the invention, the user/owner of the tamper-protected hardware module can configure whether or not the tamper-protected hardware module stores the symmetric key for on-the-fly encryption/decryption outside the tamper-protected hardware module. The symmetric key for on-the-fly encryption/decryption may be protected by steps a), b) and c) as mentioned before, before storing same outside the tamper-protected hardware module.

SUMMARY

A tamper-protected semiconductor module may be used as a so called Key-Wrap-Module (KWM), also referred as Key-Generating-Key (KGK) container, where a KWM cryptographically wraps all existing (a)symmetric keys, so that they may be safely stored. The KWM initialization process can be used to transform the KGK combined with an external or internal SW-supplied Initialization Vector (IV). Another usage of a KWM is the production of safe master Key-Encrypting-Key (KEK) schemes.

It should become apparent from the foregoing explanations there are several individual functional and design-related measures of the tamper-protected semiconductor module making same less vulnerable to misuse or cloning. It should be apparent that the individual functional and design measures of the tamper-protected hardware (including also Secure Bootstrapping explained below) may be advantageously combined to obtain an overall security architecture that allows achieving a very high-level of tamper resistance of the tamper-protected semiconductor module.

Summary of Trusted Boot Through TRUSTLETs

As indicated above, another aspect of the invention is the suggestion of a bootstrapping mechanism for hardware. This bootstrapping mechanism may be used for bootstrapping a tamper-protected hardware module as used in a transaction system, but could be—in general—also used to bootstrap any type of IC (firmware) or device (firmware and/or software). The bootstrapping mechanism is based on the provisioning of firmware/software in form of one or more software module(s) (also called TRUSTLET(s) herein) each of which providing a piece of the overall functionality of the firmware/software—of course, also one (standard) software module could provide the entire firmware/software functionality. The idea of the bootstrapping mechanism is to generate a chain of trust by one software module checking the validity of the next software module to be executed prior to its execution. If the verification of the subsequent software module fails, the bootstrapping is stopped, which may leave the bootstrapped hardware (temporarily) dysfunctional. The individual software modules are encrypted and signed themselves which is intended to protect the software modules against being tampered by attackers.

According to an exemplary embodiment of the invention, the software modules are generated as follows: It is assumed that an entity block is provided to be included into the software module. The entity block provides an executable piece of software implementing a given (set of) functionality of the firmware/software. First, the software module is signed: A fingerprint of the (uncompressed) software module is generated using a hash function (e.g. by using the Secure Hash Algorithm Standard (SHA—see FIPS PUB 180-3, "Secure Hash Signature Standard", available at http://csrc-.nist.gov) in order to allow verification of the integrity of the software module. This fingerprint is then encrypted using the private key of a public key-pair (signing key) to thereby generate a digital signature of the software module.

Optionally, the software module is additionally compressed to reduce its size. The—compressed or uncompressed—software module is then combined with the encrypted fingerprint to form an integrity-protected software module. This integrity protected software module is encrypted using a random secret key to thereby form an encrypted and integrity protected software module.

The random secret key is encrypted using the private key of a public key-pair, and the software module is obtained by combining the encrypted and integrity protected entity block, and the encrypted random secret key. Please note that a software module generated according to this process (or according to a more advanced exemplary implementation thereof) is also referred to as a TRUSTLET herein.

Please note, the public key part of a public key-pair used for encrypting the random secret key is assumed to be known to the bootstrapping hardware (in order of being able to decrypt, verify and execute).

The public key encryption may for example be realized according to one of the Elliptic Curve Cryptography (ECC) Standards (ECC is included in numerous standards around the world. This issue of Code and Cipher focuses on three key standards bodies that incorporate ECC: ANSI, IETF and NIST. Standards are: ANS X9.62, WAP WTLS, ANS X9.63, and IEEE 1363, and recommendation NIST SP 800-56). For example, the fingerprint could be encrypted with the private key of the key-pair using a Digital Signature Algorithm (DSA), or an Elliptic Curve Digital Signature Algorithm (ECDSA), DSA, and ECDSA can be found within FIPS PUB 186-3, pp. 19 to 26, available at http://csrc.nist.gov.

In one exemplary further implementation, the integrity protected entity block is encrypted using symmetric-key encryption, such as for example the Advanced Encryption Standard (AES, see FIPS PUB 197, available at http://csrc.nist.gov) or Data Encryption Standard (DES, see FIPS PUB 46-3, available at http://csrc.nist.gov). Accordingly, the random secret key may be a symmetric key.

In order to implement a chain of trust between the software modules upon bootstrapping, the entity block of a software module may comprise instructions to execute another software module. Basically, these instructions may enable:

decryption of an encrypted random secret key of the other software module, decryption of the encrypted and integrity protected entity block of the other software module using the decrypted random secret key to thereby obtain an integrity protected entity block of the other software module, decryption of an encrypted fingerprint (i.e. the digital signature) comprised in the integrity protected entity block of the other software module, and generation of another fingerprint of the entity block using the same hash function as used to generate the encrypted fingerprint of the other software module, verification of the entity block's integrity of the other software module's integrity protected entity block by comparing the decrypted fingerprint with the other generated fingerprint, and execution of the other software module's entity block, only in case the integrity of the other software module's entity block is verified successfully.

In a further exemplary embodiment of the invention, the private key used to encrypt the fingerprint differs from the private key used for encrypting the random secret key. Further, the public keys corresponding to the private keys to encrypt the fingerprint and random secret key, respectively, are assumed to be provided in form of a certificate originating from the Root Certification Authority. This means the public keys are signed by a Root Certification Authority using a private signing key (part) of a signing key-pair, the public key (part) of which is provided immune against counterfeit in the hardware to execute the software module.

Being provided with such software modules (TRUSTLETs), according to a further embodiment of the invention, a piece of hardware is bootstrapped into a controlled environment by executing a set of software modules in a given order as follows:

a) decrypting an encrypted random secret key of one of said set of software modules to be executed next, b) decrypting an encrypted and integrity protected software module's entity block to be executed next, using the decrypted random secret key, to thereby obtain an integrity protected software module's entity block to be executed, c) decrypting an encrypted fingerprint comprised in the integrity protected software module's entity block to be executed next, and d) generating another entity block's fingerprint using the same hash function as used to generate the encrypted fingerprint, e) verifying the entity block's integrity of the software module's integrity protected entity block to be executed next by comparing the fingerprint decrypted in step c) with the fingerprint generated in step d), and f) only in case the integrity of the software module's entity block to be executed next is successfully verified, this software module's entity block will get executed next, Steps a) to f) are to be performed for each software module of the set of software modules thereby realizing a chain of trust.

In one further exemplary embodiment of the invention, the functionality to perform steps a) to f) for the set of software modules' first software module is implemented in the hardware (e.g. is stored in a ROM, or the like within the hardware as a gate-based hardcoded (never to be changed) implementation). The hardware's or its piece(s) providing functionality to perform steps a) to f) therefore should be advantageously tamper-protected.

Furthermore, the processing of a software module to be executed next may further comprise g) obtaining a certificate comprising one or more public keys, wherein the one or more public keys are signed by a Root Certification Authority using a signing key-pair's private signing key (part), the public key (part) of which is provided immune against counterfeit in the host device, and h) verifying the one or more public key(s) (part's) integrity comprised in the certificate using the public key (part) provided immune against counterfeit in the host device.

One verified public key of the certificate is used for decrypting the encrypted random secret key in step a) and one verified public key of the certificate is used for decrypting the encrypted fingerprint in step c). The two public keys may be the same or different (more secure).

As for steps a) through f), the functionality to perform steps g) and h) for the first software module of the set of software modules may be implemented in hardware. The (piece(s) of the) hardware that provides functionality to perform steps g) to h) may therefore be equally tamper-protected.

Furthermore, the functionality to perform steps a) through f) (respectively steps a) through h)) for a software module other than the first software module could be implemented in hardware or could be implemented in software within the entity block of the software module executed prior to said given software module.

Furthermore, it should be apparent that the unsuccessful execution of one or more of steps a) to f) (respectively a) to h)) results in interrupting the bootstrapping of hardware. This interruption of the bootstrapping could result in the hardware becoming temporarily or permanently unusable. Alternatively, depending on the functionality to be provided by the firmware/software, the boot process could be finished, but certain functionality—in particular functionality which has to be immune against attacks and/or counterfeit—may be disabled by the hardware.

In one exemplary embodiment of the invention, the bootstrapped hardware is a tamper-protected hardware module, and the functionality provided by the software modules (TRUSTLETs) includes at least one of:

an interface filter (API Filter) for cooperation with a host device's filter controller and for controlling messages exchanged via an I/O-interface of the tamper-protected hardware module for interfacing with the host device comprising the tamper-protected hardware module, a license check module which implements "Identification Friend or Foe" (IFF) to analyze the local tamper-protected hardware module. This is helpful to indemnify the decision if the tamper-protected hardware module is a legalized or counterfeit hardware and which application the hardware is licensed to run, an Initial Program Loader module (IPL Boot). This TRUSTLET makes it possible to coordinate the boot process and to allow options within same. It may for example contain an extended Power-On-System-Test (POST) and may manage (parts of) the update process of the tamper-protected hardware module. The Initial Program Loader may be optionally provided with a simple (user) interface able to allow user-selectable decisions and features, an embedded operation system (micro) kernel to handle the various operations of the tamper-protected hardware module's application module, the application for the tamper-protected hardware module specifying the tasks and features same is able to do, an implementation of an off-line transaction protocol for a transfer of electronic tokens between two hardware-protected hardware modules (respectively two host devices comprising same), and a handler (i.e. a piece of software or dedicated hardware managing the respective task(s)) for termination of the off-line transaction protocol in case of an off-line transaction protocol's interruption, including a generation of a proof of loss of electronic token in response to the off-line transaction protocol terminating in an unfair state.

A handler for checking and maintaining (e.g. by performing an on-line refresh of the trusted time-source—if necessary) a trusted time-source comprised in the host device, a handler for initialization of the I/O-key-unit for real-time I/O-encryption and decryption of information exchanged via an I/O-interface of the host device (umbrella encryption/decryption), a handler for compensation for a loss of electronic tokens using a proof of loss of electronic token provided in response to the off-line transaction protocol terminating in an unfair state (as described in the priority application PCT/EP2011/001219 of the same applicant), and a handler for checking a semiconductor module's cocoon PUF fingerprint comprising the tamper-protected hardware module.

The tamper-protected hardware module may for example store the software modules in an internal or external memory. Moreover, the hardware could receive an update of one or more of the software modules from a third party.

Furthermore, in another embodiment of the invention a certificate (see e.g. Type-V certificate below) is appended to the software module (e.g. firmware or software) which is signed by a Root Certification Authority using a private signing key of a signing key-pair. The public key of this signing key-pair is provided immune against counterfeit in the bootstrapped hardware, respectively the tamper-protected hardware module. Please note that the certificate may already be appended to the software modules upon generation.

It should be further noted, according to this aspect of the invention, that the invention is not only related to the generation of the software modules and bootstrapping mechanism using same, but also provides the hardware and/or software to perform the generation of the software modules, respectively a hardware to perform the bootstrapping mechanism using same. Hence, further embodiments of the invention provide a device, adapted to perform the generation of the software modules, and further a tamper-protected die or multi-die, a tamper-protected chip, and/or a device adapted to perform bootstrapping mechanism using same.

Design of the Tamper-Resistant Semiconductor Module (CASTOR)

As already indicated above, different aspects of the invention relate to improving the tamper resistance of semiconductor modules respectively the hardware module (e.g. die/multi-die/chip packaged therein). A semiconductor module may be for example a die/multi-die bonded onto a circuit carrier and packaged into housing. In general, tamper resistance can be best achieved by building a programmable full custom ASIC. Such ASIC may be for example realized as a System-on-Chip (SoC) with integrated processing capabilities and a non-volatile memory to store electronic secrets, tokens, keys, passwords, and digital certificates.

A tamper-protected semiconductor module may make use of a variety of known and/or new techniques to become tamper-resistant and making reverse-engineering as well as micro probing a challenging and difficult task. The property of tamper-resistance may not be treated as an absolute security measure as it is known, every tamper-resistant semiconductor module using today's known techniques for making it tamper-resistant can be completely reverse engineered (see S. Skorobogatov, "Hardware security: trends and pitfalls of the past decade", University of Cambridge, 2009). An attack can be considered successful if all protected information (root-secret) as electronic tokens, encryption keys, and software code is revealed. However, the design of the transaction system with its PKI infrastructure, the design of the off-line transaction protocol discussed above, and further hardware-based and software-based techniques to "harden" against attacks may—in combination—prevent an attacker from gaining the equivalent or more of the invested money used to break the semiconductor module. This is very likely to deter the attacker from attempts to attack the system.

Although model and design of the CASTOR discussed below in further detail combines a variety of techniques to prevent tampering, it is to be noted that not all techniques may need to be used simultaneously in order to provide a tamper-resistant semiconductor module. Every technique may increase the tamper-resistance and sometimes may interact with another technique to improve tamper resistance of the semiconductor module. Further, especially the novel techniques to improve tamper resistance discussed herein represent individual aspects of the invention, but also new uses of known techniques, such as a PUF, are proposed in some aspects of the invention.

Moreover, the techniques to improve tamper resistance of the semiconductor module (CASTOR) are not limited to semiconductor modules for use in a transaction system, but may readily be used in order to improve the tamper resistance of a semiconductor module intended for any application, e.g. in computers, cars, Smartphones, PDAs, PADs, smartcards, gaming consoles, PoS terminals, etc. just to name a few.

Model of a CASTOR Chip

FIG. 1 shows an exemplary block diagram of a CASTOR chip according to one exemplary embodiment of the invention. The IC/die is referred to as the CASTOR chip while the packaged CASTOR chip is referred to as the CASTOR. However, in most cases this distinction inspired by the production process is not important for the overall understanding. For sake of simplicity it is more often referred as CASTOR or a (tamper-protected) semiconductor module in most sections herein.

Exemplarily, the CASTOR chip comprises a main processor (CPU), e.g. an ARM processor with an integrated interrupt controller (INT), a Memory Managing Unit (MMU), a Direct Memory Access (DMA) unit, and a L1/L2 cache. The chip may for example include a separate hardware interrupt service unit (INT/ISR). Additionally, a timer-unit and/or Clock Phase Lock Loop (Clock PLL), which may be used to implement timers for detecting timeouts (e.g. fail-stop timeouts, lock timeouts, etc.), and to provide a WatchDOG timer (WDOG) in combination with a reset logic may be provided. The CASTOR may further include power management circuitry (e.g. a sleep mode & wake-up logic, voltage & power regulator sensors, filters, etc.). The CASTOR also includes a volatile and non-volatile Random Access Memory (RAM), e.g. an SRAM, DRAM, EEPROM, FLASH, MRAM, PCRAM, PRAM or the like. Optionally, the CASTOR may also be provided with circuitry to generate and maintain (en-/decrypting, signing and checking by recalculation) crypto objects (e.g. keys, unique objects and other security relevant objects)—see "Crypto Primitives" unit. Further, the CASTOR may also include a Scatter/Gather DMA speedup engine to improve the DMA performance The CASTOR may further comprise an I/O-unit which allows to exchange information (commands/messages and data) with its environment. For example, the CASTOR may be provided in a device and could use the device's memory or BUS functionality to communicate with another CASTOR or another device/server/authority (e.g. the issuing authority (eMint), RCA, etc. as described in the priority application PCT/EP2011/001219 of the same applicant) through the I/O-interface. Alternatively, the CASTOR may also use tethering mechanisms for communication.

The circuitry providing the crypto-objects in combination with the crypto-coprocessor (see below) and the scatter/gather DMA can form an efficient bulk cryptographic offload engine, able to collect packets and their fragments from multiple locations in system memory, and write back the data upon completion of the cryptographic operation. This can eliminate demand for the main processor to require direct control on the cipher- and DMA-operations.

In addition to these elements of the CASTOR, the CASTOR may further comprise a crypto-coprocessor (Soft Core Maze of Knossos Processor implemented as FPGA) which assists the main processor taking over cryptographic operations like primitive en-/deciphering, signing, verifying certificates and signatures, etc. Moreover, a PUF unit is providing a hardware functionality, which may be used to verify the CASTOR chip's integrity. The off-line transfer protocol unit (as described in the priority application PCT/EP2011/001219 of the same applicant) is a dedicated circuitry performing the off-line transaction protocol, handling interruptions due to transmission errors and other tasks related to the transaction processing like the execution of an on-line fairness reconstruction process, obtaining system update information from a trusted party, etc.

The optional key generation unit (PK/ID Generator & License Info) is a circuitry to generate keys, e.g. the session keys for a transaction, keys for the umbrella encryption, the CASTOR's public key-pair (SUDI and PUDI, the latter is contained in the CASTOR root certificate, as described in the priority application PCT/EP2011/001219 of the same applicant), and numerous other keys required for the execution of transactions and management functions in the system. Further, this unit may also store the various generated keys. The key generation unit (PK/ID Generator & License Info) is an optional unit of the CASTOR, as for example its functions could be also performed by the main processor (optionally in combination with the crypto-coprocessor and the crypto-primitives unit).

Moreover, the CASTOR may comprise a bootstrapping unit (Init, Build-In-System-Test (BIST), TRUSTLET startup) dedicated to boot the CASTOR upon power-on or reset. The bootstrapping unit may for example perform a BIST and may control the loading of the firmware, e.g. using secure firmware modules (TRUSTLETs) as discussed herein.

The Process-Service-Security-Balanced-Interface (PSSBI) filter controller, which is another optional component of the CASTOR, is responsible to control/filter the I/O-traffic of commands and data according to the defined communication protocol with the external host device.

Furthermore, the CASTOR chip may also be provided with a cocoon PUF, when packaging same.

Please note, not all components of the CASTOR shown in FIG. 1 are needed to provide a semiconductor module. Some functionality provided by dedicated circuitry (e.g. the off-line transfer protocol unit as described in the priority application PCT/EP2011/001219 of the same applicant, the key generator unit, the crypto-coprocessor, the crypto-primitives unit, etc.) may also be performed by the main processor however, with less performance as if using dedicated circuits, optimized to the respective function or task.

Concept of the CASTOR Design Philosophy

The exemplary CASTOR shown in FIG. 1 is constructed to provide an effective protection system, able to generate a kind of hard-to-clone chips in spite of mass production. To improve the tamper resistance of the CASTOR chip, the CASTOR chip may contain a standard hardware (silicon, optical, magnetic, acoustic, coating, butterfly, or intrinsic) hardware PUF,
contain a cocoon PUF,
be balanced by the Soft Core Maze of Knossos Processor,
contain a security monitor to enable the detection of potential attacks,
generate its own identifying descriptor item (e.g. serial number) crypto identity,
generate its own public key-pair (PUDI, SUDI as described in the priority application PCT/EP2011/001219) to be used for digital signing purposes,
generate an I/O-key (as exemplary private key component of a PKI, e.g. the $K_{E:CASTOR:I/O,sym}$ as described in the priority application PCT/EP2011/001219 in the chapter "Private Key Rings" of the same applicant) for the umbrella-encryption, and/or
be validated by certifying the identifying descriptor item (e.g. serial number) by the RCA.

Using SoC processes to design and implement the CASTOR chip may be one technological means to create very secure systems. One reason is the achievable grade of integration: The smaller the chip structures the harder their reverse engineering becomes. Attackers routinely are using second-hand semiconductor manufacturing and testing equipment only countered by the use of the latest highest-density technologies. The application of unique-per-chip embedded secret storage in non-volatile memory in combination with a cocoon PUF and/or hardware PUF is among the best of these techniques. Such combination is an advantage with respect to cost and effort for a physical attack because it raises the hurdle an attacker has to leapfrog with technical expertise, and financial resources sufficient to mount an attack.

Detected attacks against the CASTOR may be responded by temporarily or permanently making the CASTOR unusable. This could be e.g. achieved by an instant erasure or—even better—by falsification of the CASTOR's root certificate or other essential CASTOR-internal objects, which are key elements for the CASTOR to be operable in the transaction system. In addition thereto, essential functional circuitry and stored information may be partially and/or functionally self-destroying in a manner that leaves the CASTOR in a state where it still seems to work, however in an erratic and wrong way. The destruction process can be realized by driving high currents through internal circuit's logic conducts. A silent self-destruction may be even more advantageous than indicating the perception of the attack as feedback to the attacker.

Expected Attacks on the CASTOR and their Countermeasures

This section discusses several possible attacks and a selection of countermeasures that may be implemented in the CASTOR or CASTOR chip.

Simple Power Analysis (SPA) and Differential Power Analysis (DPA)

With respect to SPA and DPA, one effective countermeasure may be the use of internal randomized power protection (adding random noise via injection to internal power supply of the SoC) and jittering clock signals in combination with (only partially) asynchronous self-timed dual-rail logic with alarm functionality by the CASTOR chip. It counters SPA and DPA by blurring and de-correlating statistical predictions. Each bit will be signaled on two wires: (0,1) states "zero", (1,0) signals "one" while everything else raises an alarm. There is a high probability a single transistor failure might also result in alarm propagation. The power supply may be internally filtered for fluctuation integration, realized through an 'on-chip' capacitor, which partially buffers the energy consumption and reduces signal sizes. The additional usage of an idiot (idle) task (e.g. prime number generation) can be helpful, too.

Date and Time Manipulation

Another possible attack on the CASTOR may be based upon date and time manipulation. The usage of certificates and CRLs, the determination of the electronic token transferability, and the prevention of all kinds of replay-attacks make the transaction system potentially prone to date and time manipulation since all these objects rely on the system time, devaluating their meaning over time. One countermeasure may be the provision of a trusted time-source on the CASTOR chip.

Glitches and Other Fault Injections

Further, the use of a self-clocking gate-design (which can prevent and limit the delay and skew of the clock by an internal Phase-Locked-Loop (PLL), robust low-frequency sensors, a RESET filter, and over/-under voltage protection are effective measures to counter glitch attacks introduced through clock frequency manipulation.

Low-frequency sensors will trigger if no clock edge has been seen for a period longer than a specified time-limit. In this case, it may be advantageous if parts of the CASTOR chip's internal logic are reset immediately, and if bus lines as well as registers are erased/grounded quickly. An intrinsic self-test built into the detector prevents a simple disabling. An attempt to tamper with the sensor should lead to a malfunction of the entire CASTOR chip. Furthermore, external resets may not directly be forwarded to the internal reset lines; it may be better to cause the reduction of the clock signal by an additional frequency-divider which then triggers the sensor and leads to an internal reset of the CASTOR chip, which finally deactivates the divider.

Glitches, Electro-Static-Discharge (ESD) measures, and other fault-based attacks are frequently injected with radiation (e.g. LASER UV light). Passive and active CASTOR shielding in combination with light detectors and radiation-sensors will enable the design of a resistant chip. Situating the logic design inboard between metal layers makes this type of attacks more improbable. Furthermore, an additional option is the use of a cocoon PUF.

Optical Scanning

On-chip busses and memory structures on the SoC are easily optically identifiable. To prevent against an easy useful sniffing attack which gathers information directly from the SoC-internal busses or cell memories, busses and cell memories may be protected by encryption and/or dynamic address permutation. This may be a countermeasure which can prevent attacks on CASTOR chip internal data structures and transfers by ECC, Error Detecting Code (EDC) and Cyclic Redundancy Check (CRC) protection mechanisms, or a sealing with signed values.

Electro-Magnetic-Analysis (EMA) and EMission SECurity (EMSEC)

One common attack against a chip is to sense Electro-Magnetic-Interference (EMI) emitted from the chip as "black-box reconstruction-approach". The CASTOR chip or CASTOR may therefore be designed in a way that reduces electromagnetic emanation by shielding (e.g. through a TEMPEST design) and/or obscured by faking the radiation. The protection provided by a shielding could be further enhanced by "salting" the SoC with additional oscillators. In one embodiment, the shielding is provided by a cocoon upon packaging, the cocoon providing a cocoon PUF.

Laser Cutting

A further security measure may be the bonding of the CASTOR chip to the circuit carrier and its encapsulation into a non-standard BGA package with custom markings. This allows preventing direct access to the external chip interconnections. Additional metal passivation sandwich-layers on the CASTOR chip may be a good measure to avoid critical structures being exposed to the attacker without removing active layers first.

In one exemplary implementation of the CASTOR chip, each layer is planarized using a Chemical-Mechanical-Planarization (CMP) process before applying the next layer. As a result, the top metal layer does not show the impact of the layers beneath. The only way to reveal their structure is to remove (the) top metal layer(s).

A further security measure may be to render the chip's/die's layout design virtually random, for example by conducting a simulated annealing. Distracting components over multiple layers and locations in combination with the usage of own fixed (macro) structures not found in a public ASIC library will make the process of logical reverse engineering and reconstruction much more time consuming.

Moreover, the usage of meshed glue logic could further be used to make it hard to find signals for physical probing. Modular redundancy of critical design parts makes it even harder for the attacker to launch successful modifications through wire cutting and micro wiring (patches).

Further Design Optimizations for Improving Tamper Resistance

In order to provide a safe storage (e.g. for secrets/configuration data), distributed One Time Programmable (OTP) memory in combination with embedded non-volatile (e.g. flash, EEPROM, MRAM, PCRAM, PRAM etc.) memories could be used on the CASTOR chip/die. They are physically integrated on the same die all over the chip structure even lying in-between different layers.

The structurally destruction (e.g. burning) of integrated debugging ports, unused access- and test circuitry (including interfaces) like JTAG scan chains or BIST logic before the product release is another measure which may improves tamper resistance of the resulting CASTOR. The destruction of such structures on the CASTOR chip/die prevents read-back or direct-write to internal memory cells through external interfaces. The destruction of these structures may be for example realized by burning them, e.g. by creating high currents from external I/Os that will destroy the circuit structures.

Another optimization is to make memory states dependent on a number of bits of physical storage, by distributing their logical meaning over multiple different memory cells, so no single-transistor failure can subvert the chip's security policy. It can be useful to seal the data using CRC, ECC and EDC codes. As a result of data-remanence for memory artifacts in some technologies (even by cooling down the die), all relevant secrets and data stored on the chip may be continuously moved and inverted. Moreover, a low temperature sensor could be provided on the chip for auto-powering down the CASTOR chip in case temperatures below −40° Celsius (or similar low temperatures commonly not encountered in nature or within the operating limits) are detected.

Further, it is possible to scan and snatch memory cell contents of all storage technologies, including ROM, RAM, EEPROM, FLASH, MRAM, PCRAM, PRAM or the like by using Focused-Ion-Beams (FIBs), Laser-Cutters (LCs), Electron-Beam-Testers (EBTs), Electron-Microscopes (EMs), Atomic-Force-Microscopes (AFMs), Scanning-Probe-Microscopes (SPMs), Scanning Capacitance Microscopes (SCMs), Scanning Spreading Resistance Microscopes (SSRMs), Scanning Tunneling Microscopes (STMs), Magnetic Force Microscopes (MFMs), Scanning Surface Potential Microscopes (SSPMs), Scanning Thermal Microscopes (STMs), Scanning Electron Microscopes (SEMs), and other tools.

To make such attacks as expensive as possible, one countermeasure may be the usage of the smallest available SoC structures for the CASTOR chip. Furthermore, the use of on-chip-encryption and the realization of memory cells deep between the core layers make their direct read-out a challenging task for the hacker. These countermeasures may be further supported by precautionary flanking them with extra metal refractory passivation sandwich on-die layers. Each of these layers may be planarized using CMP before applying the next layer. Opaque top-metal grids and shields as generic protective measure may further be used on the chip to raise the bar for an attacker in terms of time and equipment cost.

Another optional security measure is the usage of a die wrapping cocoon (different to the cocoon PUF). The naked CASTOR chip/die may be protected by a thin high-resistance wire-based intrusion sensor to harden the chip decapsulation process countering any further external probing. Such wrapping cocoon encloses the chip/die to be protected, while a very low current (in the nano Ampere range) is used to check the wrapping cocoon's physical integrity, if the protection wire remained untouched (opens and shorts). If the sensor line is broken, shortened to ground, or electrical voltage or its resistance changes significantly, the chip/die may detect an attack and may take the foreseen procedures like a temporary disablement of the chip/die or even a self-destruction of the chip/die. The wire of the wrapping cocoon may be folded back over itself and wound as multiple parallel strands to increase the sensitivity of the wrapping cocoon. A mixture of copper and silicon (potting material as similar as possible in both appearance and chemistry to the bond wire and the die) powder with ceramic cement may be used to cement the wrapping cocoon in the package.

To prevent against attacker using IR LASER techniques, one possible countermeasure may be to replace bulk silicon with material not transparent at useful LASER frequencies (e.g. Silicon/Metal Oxide (SiMOX), Silicon-on-Sapphire (SoS) or other Si-on-Insulator (SoI) technologies).

Trusted Boot Through TRUSTLETs

As already indicated above, one further aspect of the invention is the provisioning of a secure bootstrapping procedure "for starting" a chip or device, also referred to as trusted startup. This bootstrapping is using secured software modules (comprising executable code and optionally data; also referred to as entity blocks below) provided by the firmware. The provision of a trustable bootstrapping process may be of particular importance for chips (or devices containing same) that should be update-able. The trusted boot process discussed in this section has a capability to device the chip's firmware into multiple small functional parts, each of them carrying out a specialized function. These secure self-contained fragments/software modules are called TRUSTLETs. It is apparent that a trusted boot by the use of TRUSTLETs can thus improve tamper resistance of the semiconductor module (CASTOR).

The basic idea of the proposed secure bootstrapping process is simple: It identifies a systemic way of distinction in order to differentiate between a secure interior (a tamper-protected hardware module) and an unsafe exterior (the rest of the world). To achieve this, the bootstrapping model covers two different main organizational strategies:
1. The serial chain strategy, where one TRUSTLET passes the control to the next TRUSTLET, where every TRUSTLET is started to be executed only once every time, and
2. the central chain strategy, where one (distinguished) TRUSTLET (which may be the first TRUSTLET started in the bootstrapping process) coordinates the execution of other TRUSTLETs. The other TRUSTLETs are started to be executed only once every time and return the control back to the (distinguished) TRUSTLET after their execution.

It is also possible to have hybrid variations of both of these organizational principles. The expression "started to be executed only once a time" intends to clarify that the exemplary TRUSTLET gets only one single start. It does not mean that (parts of) the code of the respective TRUSTLETs are not resident servicing the tamper-protected hardware module during the work-phase.

The utilization of a trusted bootstrapping process using TRUSTLETs is not limited to its use for chips to be employed as part of devices in a transaction system. The trusted bootstrapping by means of TRUSTLETs may readily be used in chips, semiconductor modules, and devices intended for any application, e.g. in smart-phones, computers, smartcards, gaming consoles, just to name a few.

The trusted boot joins into the various security concepts presented herein that can be used to make a chip or a semiconductor module in which it is packaged more tamper resistant. Furthermore, since one possible scenario where the trusted boot can be employed are chips or semiconductor modules for use in a transaction system (eCash system) as presented in the priority application PCT/EP2011/001219 of the same applicant, and may form part of the overall security architecture therein, it will be also referred to the integration of the trusted bootstrapping in the context of a transaction system. More specifically, the trusted boot by means of TRUSTLETs can be a part of a layered security strategy, which allows the establishment of trust between the CASTORs and the eCash system (e.g. represented by services from RCA/CAs/eMints).

As will be outlined below in further detail, TRUSTLETs are compressed and encrypted entity blocks which allow checks of their integrity and of the authentic creation source. If a chip can be booted into an environment which honors security and compliant functions to access restricted data, the data integrity within the chip can be assured. If trusted bootstrapping cannot be assured, the chip or device comprising same is prone to boot it into an unsecure operating system, whatever security management system the secure kernel provides. Trusted bootstrapping ensures boot integrity protection because:

It can protect the chip against off-line attack vectors by an authentication process, It locks the chip, because if any entity block is tampered with, the system will not boot, It ensures that only an un-tampered chip is operational.

TRUSTLETs also facilitate secure firmware updates (even Over-the-Air). Further, TRUSTLETs are countering the following integrity attacks:
bootstrapping manipulation,
code manipulations of the operating system,
unauthorized generic code and data changes,
use of own (unauthenticated) code.

TRUSTLET Generation Process

FIG. 2 shows an exemplary process for the generation of TRUSTLETs by the RCA according to an exemplary embodiment of the invention. The software pieces (entity blocks) of the firmware may be for example generated using the standard tool-chain of compiling and linking. An entity block is a piece of executable code (e.g. comprised in a code section of the entity block) and optional data (e.g. comprised in a data section of the code block). In one exemplary embodiment of the invention, the entity block is the resulting data of the linking process performed by a linker, but the entity blocks are not limited thereto. The data that may be optionally comprised in the entity block are for example data static data (e.g. constant variables for the runtime system), and/or data for initialization of parameters/variables (e.g. predetermined variables of the runtime system), etc.

In a first step, an entity block to be "transformed" into a TRUSTLET will be hashed using a hash function (e.g. SHA1). The entity block may be optionally compressed—it should be apparent that the hash-fingerprint is determined from the uncompressed entity block.

The hash-fingerprint of the entity block is then signed by encrypting it with a RCA's private key for encryption (as exemplary private key component of a PKI, e.g. the KE:FW: T1-XXX.prv as described in the priority application PCT/EP2011/001219 in the chapter "Private Key Rings" of the same applicant) to generate a digital signature thereof. For example, an Elliptic-Curve-Digital-Signature-Algorithm (ECDSA) could be used for encryption, but also other asymmetric encryption algorithms may be used. This digital signature is then combined with the (compressed) entity block.

Hereafter, this linked package (containing the (compressed) entity block and the digital signature) is again encrypted with a random key, e.g. a symmetric key. For this, AES (e.g. with a 256 bit key) could be used in the XTS encryption-block cipher-mode. However, other symmetric encryption schemes and/or cipher-modes could be used, too. The random key is then encrypted with a RCA's private key for encryption (as exemplary private key component of a PKI, e.g. the KE:FW:T2-XXX.prv as described in the priority application PCT/EP2011/001219 in the chapter "Private Key Rings" of the same applicant). Please note, the RCA may use the same or different private keys for encrypting the hash-fingerprint (signing) and encrypting the random key (encryption). The encryption of the random key may use for example ECC (e.g. with a 571 bit key) or another asymmetric encryption scheme.

Please note that parts of the following text and in the whole document uses concepts (like public "KD" keys and private "KB" keys, other keys like SUDI, PUDI, CON, PIO, the RCA, Type-V certificates, RCLs and the like), an exemplary implementation of which are described in the priority application PCT/EP2011/001219 of the same applicant (cf. inter alia chapter "Public Key Rings" there).

The private key or keys used by the RCA to encrypt the hash-fingerprint (signing) and the random key (encryption) is/are owned by the RCA, while its/their public key counterpart(s) is/are contained in the CASTOR product (firmware) certificate (Type-V). In the final building step, the concealed entity block is combined with the encrypted random key to form the TRUSTLET.

Optionally, the RCA may include to each TRUSTLET (or only one for all TRUSTLETs constituting the firmware), the CASTOR product certificate (Type-V) which contains the public key(s) required for the decryption and validation of the TRUSTLET at the respective chip (or device) executing the TRUSTLET. Alternatively, the CASTOR product certificate (Type-V) may also be made available to the chips (respectively, devices) by some other means.

Use of TRUSTLETs in the Trusted Bootstrapping Process

Before being executed or read, each TRUSTLET is validated using the process described below with respect to FIG. 3. FIG. 3 shows an exemplary embodiment of a validation process for a TRUSTLET which has been produced according to the procedure described above with respect to FIG. 2. As discussed above, the TRUSTLET comprises two main parts: The encrypted random key and the concealed entity block. To validate the TRUSTLET, the bootstrapping chip/device is first using the counterpart public key (KD:FW:T2-XXX.pub) to the RCA's private key for encryption (KE:FW:T2-XXX.prv) to decrypt the random key (symmetric key) which has been used previously to encrypt the (compressed) entity block and its digital signature. If successful, the random key is subsequently used to decrypt the concealed entity block comprising the (compressed) entity block and its digital signature. Next, the bootstrapping chip/device is verifying the digital signature of the (compressed) entity block. For this purpose, the entity block is decompressed (if it is included in compressed format to the TRUSTLET) and a hash-fingerprint is calculated from the (decompressed) entity block using the same hash function as used by the RCA when creating the entity block's fingerprint. Further, the digital signature is decoded using the counterpart public key (KD:FW:T1-XXX.pub) to the RCA's private key for encryption (KE:FW:T1-XXX.prv) to obtain a reconstructed fingerprint of the entity block. The reconstructed fingerprint and the freshly generated fingerprint are compared and if they match, the entity block has been successfully validated and is allowed being executed by the chip.

It should be apparent that any attempt to modify the contents of the TRUSTLET would falsify the validation process and interrupt the bootstrapping process.

It is worth noting that the functionality to validate the first TRUSTLET to be executed in the trusted bootstrapping process is hardcoded in the chip.

Moreover it should be noted that the counterpart public key (KD:FW:T2-XXX.pub) and the counterpart public key (KD:FW:T1-XXX.pub) may be identical, although it may be more advantageous to use distinct keys for signing and encryption by the RCA. The counterpart public key(s) used in the validation process may be for example provided to the chip for example by means of a certificate, such as for example the CASTOR product (firmware) certificate (Type-V) previously herein. This certificate may be for example appended to the TRUSTLETs (or may be part thereof) or may be provided to the chip by some other means, e.g. by downloading it on-line from the RCA.

Execution of a TRUSTLET starts through a previous TRUSTLET in the (logical) chain or, if the TRUSTLET is the first TRUSTLET to be executed, with functionality hardcoded in the chip itself as already stated above. Execution means the following herein:
- a measurement of the current code/data state: checking the authenticity,
- case yes: CASTOR passes the execution control to the measured, decrypted and decompressed TRUSTLET,
- case no: CASTOR performs a RESET. In such case the CASTOR starts over with the same procedure as performed by a power-on-event. Alternatively to that method the following techniques may be employed: Entering into an error mode (and the indication of same to the user) or performing a (deep) sleep or power-downing the CASTOR.

This execution is performed with every TRUSTLET within the chain. Please note, there are many possible different logical chain configurations. Three possibilities are depicted in FIG. 15, FIG. 16 and FIG. 17. The chain position of every TRUSTLET is hardcoded during the compilation/generation phase of the chip's firmware, so every TRUSTLET knows it's succeeding TRUSTLET. During its boot phase, the CASTOR cycles through the chain of all of its firmware's TRUSTLETs. The chain of trust is kept alive as long as each TRUSTLET ensures any subsequent TRUSTLET is "executed in the way as explained above".

This structured execution assures neither off-line system tampering nor an attempt to boot an unauthorized firmware can happen. A trusted startup employing TRUSTLETs protects the system boot process by ensuring tamper-freeness before releasing the system control to the embedded operating system and granting system access to the protected application. Trusted startup enabled system secrets could be for example protected by using the chip to encrypt root-secrets, rather than protecting through obfuscation or by shared passwords.

The trusted startup protected chip is resilient against advanced methods of off-line code and data modification on the secured storage. Assuming that the chip is tamper-protected (using one of the various measures described herein), i.e. provides the hardware protection for the startup integrity, decryption keys, and the sealed storage, every attempt to change a boot sequence component makes the firmware inaccessible, the system unbootable, and the application data unattainable (as being protected by the application of an umbrella encryption).

The functionality for the provisioning of the umbrella encryption may be implemented e.g. as a TRUSTLET, too. Therefore, not only a chip-internal storage may be encrypted, but also data stored outside the chip can be encrypted by means of the umbrella protection, as described for the CASTOR chip herein. Because memory content and external stored data objects may be encrypted in real time while being transferred to the external mass storage device through secured-I/O, data objects like eCoins, certificates, CRLs, and any (open) document or (cached) secrets (and e.g. even swap files) are also encrypted under this umbrella protection. Therefore, the mass storage data can be encrypted completely and is therefore not exploitable. Off-line attacks cannot compromise or reveal system passwords, keys, or any other data. In addition, replay or image duplication attacks (launched by the attacker by copying the content of the external memory with the encrypted eCoins and intends their reuse) are thwarted by synchronization checks to the last safe sealed transaction state using the chip-internal memories. By comparing certain boot process characteristics to previously stored measurements (e.g. signed cryptographic hashes), a trusted startup through TRUSTLETs can detect system tampering while starting up. This enables the trusted startup to verify system integrity at an early stage, improves data security, and reduces equipment-re-purposing concerns. The feature is simple to deploy and operate, and it enables an easy system management.

Although it may be advantageous to interrupt the trusted bootstrapping (leaving the chip without a usable embedded operating system) in case a TRUSTLET cannot be validated successfully, this interruption may not always be feasible or desirable depending on the target application. TRUSTLETs may contain only individual functions of the firmware, security relevant ones as well as security irrelevant ones. Therefore, in another embodiment of the invention the chip may also be able to continue bootstrapping with the subsequent TRUSTLET in chain, even if one or more TRUSTLETs cannot be validated, thereby possibly being able to boot at least a partially operable system. Thus, the functionality of the non-executed TRUSTLET(s) (due to a validation error) won't be available to the system.

Furthermore, another option may be that an entity block of a TRUSTLET comprises multiple code sections with executable code and optionally further data sections. In case the TRUSTLET cannot be validated successfully, a specifically dedicated code of one code section could be executed, while in case the TRUSTLET is validated successfully, another code of another code section is executed. The code of the respective code sections (and the corresponding data in the data sections) may be adapted to the specific needs and application of the chip or system in which the trusted startup is used. For example, the code of the code sections executed in cases where the TRUSTLET cannot be validated successfully could ensure the bootstrapping of the chip with a minimal operating system of the chip which is for example not allowing any transactions requiring a secure environment. The code of the code sections executed in cases where the TRUSTLET is validated successfully could be for example ensure the bootstrapping of the chip with the full-functional operating system of the chip allowing to perform also transactions requiring a secure environment.

A further option to react to a validation error of a TRUSTLET may be that the chip (e.g. its boot manager) continues booting the system and—without allowing any security relevant operations—notifies the RCA, if it encountered a non-validated TRUSTLET on the chip/device. This notice to the RCA may for example include an identifying descriptor item (e.g. serial number) of the chip, which would allow the RCA to lock the device by (black-) listing its identifying descriptor item (e.g. serial number) in a respective RCL, assuming the chip's identifying descriptor item is provided in form of a certificate. Upon having notified the RCA, the chip may then disable itself or the entire device.

Optionally, instead of a sequential bootstrapping process where one TRUSTLET validates and starts the next TRUSTLET to be executed, the bootstrapping process may be changed as follows: The first TRUSTLET to be executed may provide a boot-manager's functionality (please refer to FIG. 16) which controls the execution of the subsequent bootstrapping process. Please note, the boot manager may be part of the hardware or may be implemented as part of the hardware functionality. The boot manager may thus control the execution of (further) TRUSTLETs. For this purpose the boot manager provides the necessary functions to validate TRUSTLETs as described above with respect to FIG. 3, and some decision logic to decide how to proceed (in) the bootstrapping process (or how to interrupt same) in case a validity check fails for a TRUSTLET. Further, the boot manager may of course be further aware in which order the TRUSTLETs should be executed.

Trusted Bootstrapping of a Chip/Device for Use in the Transaction System

FIG. 4 shows exemplified a bootstrapping process according to an exemplary embodiment of the invention, which specifically relates to the use of the trusted bootstrapping for a device (respectively, the CASTOR chip) used within a transaction system as described herein:

1. After power-on, the CASTOR hardware (i.e. the chip to be bootstrapped) is initialized, which may for example include a basic BIST internal hardware functionality test. This initial BIST may be later on augmented with a more comprehensive test. Thereafter, a first TRUSTLET (being the API filter in this example) is executed as exemplified above. All these actions are performed by the hardware; no software is involved at this stage.

2. Given the first TRUSTLET (in this specific case the API filter) is successfully executed; the subsequent TRUSTLET will be executed next. Each TRUSTLET may comprise code (see FIG. 15 and FIG. 17) to perform the execution process described with respect to FIG. 3 for the next TRUSTLET or only a "managing TRUSTLET" may comprise that code (see FIG. 16). Accordingly, at the "end" of the execution of the first TRUSTLET, this first TRUSTLET will execute the next TRUSTLET only in case the next TRUSTLET can be successfully validated. This procedure is continued until the last firmware's TRUSTLET is executed. As each TRUSTLET checks the validity of the next TRUSTLET prior to its execution, a chain of trust is generated, and it is not possible to sneak unauthorized code into the bootstrapping process (of course presuming that the PKI infrastructure is not broken, which is extremely unlikely if not impossible). In case a TRUSTLET is not validated successfully the bootstrapping process may be interrupted. In case the API filter executes successfully, in turn, the License Check TRUSTLET is next.

3. The License Check TRUSTLET is responsible for performing a more comprehensive system test, e.g. by checking the chip's (or the semiconductor module's) integrity using one or more of the further security means to detect tampering of the chip or the semiconductor comprising same, such as e.g. checking the integrity by using the built in hardware PUF, the cocoon PUF and/or a configuration check of the crypto-coprocessor, etc., respectively. Furthermore, the License Check TRUSTLET authenticates the chip's license information as provided in the respective section (e.g. Cert.Unit.Info.CLC) of the CASTORs Type-VI RCA root certificate (see section "CASTOR Root Certificate (Type-VI)" of the priority application PCT/EP2011/001219).

4. One possible (but not exclusive) way to achieve this is cross-referencing the information provided by the RCA root certificate with other—later on delivered—on-line or off-line available information provided by the RCA to the CASTOR (e.g. if licensee do not pay its license fees or is not a certified customer of the system anymore). In case the License Check executes successfully, in turn, the IPL (Initial Program Loader) Boot TRUSTLET is executed next.

5. The IPL Boot TRUSTLET is the bootstrap service loader for the (embedded) operating system. It performs the extended Power-On-System-Test (POST) and manages the update process of the chip's firmware. In case the IPL Boot executes successfully, in turn, the (embedded) operating system TRUSTLET is next.

6. The (embedded) operating system TRUSTLET is the operating micro kernel responsible for the on-CASTOR management. After its initialization this software is responsible to load the application. In case the (embedded) operating system executes successfully, in turn, the application TRUSTLET is next.

7. The last TRUSTLET in the chain will be the application. In one embodiment of the invention this is the eCash transaction system application.

It should be noticed, any executable code not validated (e.g. non-validated TRUSTLETs or standard code) is impossible to be executed in such environment (excluding the above mentioned "relaxed" security handling possibilities). A chain of trust can only be assured by the exclusive use of TRUSTLETs. If ever the execution chain "forks" to an invalid TRUSTLET the chain of trust ends with the last validated TRUSTLET. Henceforward, control of the CASTOR within a guaranteed secure environment is not possible. As already mentioned earlier in this section this can make sense due to the nature of the (intended) application e.g. with no or only negligible needs for security.

The "logical chain of trust" which provides trusted boot capability implemented by the TRUSTLET system can be technically encompassed in various architectural ways. FIG. 15 depicts the simplest linear model. As shown in FIG. 16, also a central approach is possible, where a "managing TRUSTLET" (e.g. the IPL boot TRUSTLET) sits in the center of the boot process. Countless hybrid forms are also possible; one of them is exemplary depicted in FIG. 17.

Exemplary TRUSTLET: API-Filter

In the transaction system described above the CASTOR chip communicates with an external host, i.e. the device containing and/or operating the CASTOR. The CASTOR's host may never even provide an operating platform through a (graphical) user interface. However, its communication capabilities can nevertheless be used to communicate with the external (remote) world.

The interface between the CASTOR chip's I/O-unit and the host may follow a point-to-point architecture consisting of two participants, the security service provider (CASTOR chip), and a generic service consumer device (e.g. PC, smart-phone, TV, Car, eFilling station, paddle, separate eWallet etc.). The interface of such architecture is sometimes also referred to as a Process-Service-Security-Balanced-Interface or PSSBI (general outlined in FIG. 6) and is provided by the API Filter TRUSTLET.

According to a certain policy, conventional security APIs provide a command set using cryptography to control the processing of and the access to sensitive data. The tasks of a security API are to allow users to process data and key material, achieve flexibility and atomicity according to the designer's intention, and prevent any malicious command sequences which might violate these intentions. It provides a communication interface for commands on a very low level (meaning to provide only basic and simple operations) with the intension of being usable in a more general way.

In contrast, according to an embodiment of the invention, the API filter provides a communication filter interface for services on a very high level (e.g. application specific level). Data is exchanged over this PSSBI interface in form of Protocol Data Units (PDUs) located between a hardware module and the external host (please take a look to FIG. 7). There are two types of PDUs:

command PDUs containing data sent to the CASTOR chip, and response PDUs containing data sent by the CASTOR chip.

To prevent some sort of abuse attacks, the API Filter TRUSTLET further enhances the CASTOR chip (owning the PSSBI Filter Controller as hardware resource) with a PSSBI gatekeeper, which checks incoming PDUs for their correct formats, formats outgoing PDUs, and calls the respective internal CASTOR chip service based on the PDU received from the host.

Optionally, the PSSBI gatekeeper may provide protection against buffer overflow attacks and may further detect, repeal, and recover from known (interface related) attacks.

PUFs

The application of a Physical Unclonable Function (PUF) is a technology in which an easy to evaluate function, embodied in a physical structure, maps a set of challenges to a set of responses based upon a hard to characterize complex physical system. The physical structure of a PUF consists of many random components introduced during the manufacturing process in a not controllable fashion. They can be regarded as digital fingerprint or "digital DNA" of a chip-identity. The PUF can help to enhance a system's security because parts of or even the complete root secret can be stored and protected without the application of digitally stored information.

As depicted in FIG. 5, a PUF can be regarded in functional comparison to other mapping techniques like the ROM or a crypto function. The displayed ROM maps 2128 different 'challenges' to a 128 bit wide 'response'. If the ROM matrix is filled with white noised data an almost perfect digital mapping with two exceptions is achieved: It will never be possible to build a ROM able to carry more bits than the number of stars in the universe, (2128)*128 bits as required in this case. And even in case this was possible it would be susceptible to a copy attack.

If a cryptographic function like 3DES, AES or others is used, such function can replace the ROM mapping device. This is usually done in every Electronic Codebook (ECB) encryption block cipher mode of operation, the simplest one. The problem with such approach for a PUF is that there is no copy protection of the crypto cipher at all (once the crypto function becomes known, the protection is gone).

PUFs inherit their un-clonability property from the fact every PUF has a unique and unpredictable way of mapping challenges to responses in an iterative way. Due to the manufacturing process, even dies located on the same wafer (e.g. used for silicon and intrinsic PUFs) still exhibit a unique challenge-response behavior. PUFs are useful in authentication: Due to the presence of these random components, the PUF reacts in an unpredictable way (the corresponding response) if a physical stimulus (the challenge) is applied. The un-clonability property makes is impossible to build a PUF with identical challenge-response behavior as observed from a given PUF. In PUFs, different sources of physical randomness can be used. A distinction is made between PUFs in which physical randomness is explicitly introduced and PUFs using randomness intrinsically present in a physical system.

According to one aspect of the invention, a PUF implemented in is used to validate the integrity of a hardware module (which may be a die, multi-die or IC). A hardware module can also be referred to as a chip. In some embodiments of the invention, the chip comprises a hardware structure providing a PUF. To use the PUF for integrity checking, it is provided with a set of challenges and the PUF's responses thereto are stored as pairs of challenges and corresponding responses.

The integrity of the chip can be checked by applying a set of challenges to the hardware structure of the chip providing the PUF and by receiving the PUF's responses to these challenges. For at least one challenge, the PUF response is known from the previously stored set of PUF challenges and corresponding PUF responses. A mismatch between the known PUF response for a challenge and the actual PUF response received from the hardware structure of the chip indicates a tampering or cloning of the tested chip.

Such PUF based integrity check may be used in different fashions.

In one exemplary implementation, the integrity check based on the PUF could be chip internal. In this case the challenges and their corresponding known PUF responses should be recorded and provided by a trusted party (e.g. RCA) in form of a certificate, which is stored in non-volatile memory inside the chip. By validating known challenges and corresponding known PUF responses, the chip can assure the challenges and corresponding known PUF responses haven't been tampered.

In this exemplary implementation, the chip could provide some integrity checking function, which may be part of the firmware in charge to check the integrity of the chip in given regular or random intervals (and at the least at bootstrapping). The integrity checking function may select an arbitrary challenge from the validated pool of challenge/response pairs and tests the PUF for the correct PUF response.

The PUF may also be used to allow for an authority to check the integrity of a chip. In this case the authority (e.g. host device, the RCA, an institution manufacturing a product containing the chip with the PUF, etc.) has recorded a set of PUF challenges and their corresponding PUF responses. For integrity checking, the chip would be provided with one or more challenge to which the response is known to the authority. If the PUF response(s) provided by the chip is/are correct, the authority can confirm the integrity of the chip, or the host device, respectively. Otherwise the authority could e.g. cause a deactivation of the chip respectively its host device, an action also feasible by means of a certificate revocation through a CRL. In one advanced implementation, the challenge(s) for which the PUF response is known is/are sent to the chip as part of a set of challenges, so the chip cannot know which of the challenges is "hot", i.e. for which challenge(s) the querying authority knows the appropriate PUF response(s).

In one exemplary embodiment of the invention, the PUF is implemented in a CASTOR chip for use in a transaction system as described herein. In this exemplary embodiment, the RCA may record the challenges and their corresponding PUF responses as part of the CASTOR's crypto-initialization at the RCA (for more details, see section Crypto-Initialization of the Tamper-Protected Hardware Module (CASTOR)). The PUF may be used by the RCA to verify integrity of the CASTOR or may also be used by the CASTOR chip internally for verification of the integrity as described above.

Chip-Internal Hardware PUFs

The (standard) hardware structure provides a response to challenges input into the hardware PUF. Furthermore, the tamper-protected hardware module may be equipped with a processor unit for providing at least one challenge to the hardware structure implementing the hardware PUF, who's correct (cryptographic hash of) response from hardware structure implementing the hardware PUF is known. The processor unit receives a respective (cryptographic hash of) hardware PUF response for each challenge provided to the hardware structure implementing the hardware PUF and verifies integrity of the tamper-protected hardware module by checking whether the (cryptographic hash of) response to at least one challenge (for which the correct (cryptographic hash of) hardware PUF response is known) is matching the (cryptographic hash of) response received from the hardware structure implementing the hardware PUF.

In one exemplary embodiment of the invention the processor unit of the tamper-protected hardware module provides plurality of challenges to the hardware structure implementing the hardware PUF. The plurality of challenges including the before-mentioned or more challenges for which the correct (cryptographic hash of) hardware PUF response is known. This may be advantageous as the processor unit cannot recognize which challenge(s) response(s) to the hardware PUF (and their cryptographic hash(es), respectively) is/are known already. Therefore, it is unable to differentiate between a fake challenge and a critical one.

According to a more advanced embodiment of the invention the tamper-protected hardware module further comprises an I/O-interface for receiving at least one challenge for which the correct (cryptographic hash of) hardware PUF response by hardware structure implementing the hardware PUF is known. The respective (cryptographic hash of) the hardware PUF response for each challenge applied to the hardware structure implementing the hardware PUF could be then made available outside the tamper-protected hardware module through the I/O-interface.

This would e.g. allow external authorities or devices to check the integrity of the tamper-protected hardware module. Hence, the challenge(s) to the hardware PUF could be received from a device comprising the tamper-protected hardware module (i.e. from an "external component" of the device) or on-line from another, external device. Likewise, the respective (cryptographic hash of) hardware PUF responses for each challenge provided to the hardware structure implementing the PUF could be provided to the device comprising the tamper-protected hardware module or on-line to the external device, respectively.

An integrity check of the tamper-protected hardware module utilizing the hardware structure providing the PUF may for example be a tamper-protected hardware module function, implemented by the firmware (e.g. upon power-up or reset of the tamper-protected hardware module). For this purpose, in another embodiment, the tamper-protected hardware module may further comprise a storage unit for storing a set of challenges and their (known) corresponding (cryptographic hash of) hardware PUF responses. In one exemplary embodiment, the challenges and their corresponding (cryptographic hash of) hardware PUF responses are signed by a Root Certification Authority to allow verification of their integrity. The tamper-protected hardware module may verify the integrity of at least one challenge and its (cryptographic hash of) hardware PUF response based on its signature. The challenges and their corresponding (cryptographic hash of) hardware PUF responses could for example be signed by the Root Certification Authority using a signing key-pair's private signing key, while the public key is provided immune against counterfeit in the tamper-protected hardware module, is used to verify the integrity of the challenges and their corresponding (cryptographic hash of) hardware PUF responses.

Moreover, another embodiment of the invention relates to a tamper-protected semiconductor module provided with a tamper-protected hardware module having a hardware structure implementing a PUF, as discussed above. Further, another embodiment of the invention provides a device which comprises such tamper-protected semiconductor module.

The type of the hardware PUF can be of standard hardware (silicon, optical, magnetic, acoustic, coating, butterfly, or intrinsic) PUF, or even a cocoon PUF.

Semiconductor Modules with Cocoon PUFs

Another aspect of the invention is related to the design of the tamper-protected semiconductor module. Please note, this aspect is independent of the other aspects of the invention provided herein, but—in some embodiments of the invention—may nevertheless be used in combination with them to further improve tamper resistance.

The basic approach underlying this aspect of the invention is to design a semiconductor module which has unique properties with respect to the deflection of a physical measurand within the semiconductor module in response to an excitation (which could be also denoted a challenge). These unique deflection properties inside the semiconductor module are introduced by the production process of the semiconductor module (for example as a result of its manufacturing process) and are thus capable of uniquely identifying the semiconductor module. Further, any attempt to tamper the semiconductor module will alter its deflection properties since any attack on the inside of the semiconductor module will influence the physical measurand. This makes tampering attempts observable by the semiconductor module. Therefore, it is referred to as "tamper-protected".

FIG. 11 shows a tamper-protected semiconductor module according to an exemplary embodiment of the invention, which is provided with a cocoon PUF. The semiconductor module is made of a hardware module (die/chip). The hardware module of the semiconductor module is exemplified in FIG. 12 and comprises one or more emitters and one or more sensors (also referred to as an emitter-/receiver phalanx herein). The emitters emit a predetermined excitation which can be measured as a physical measurand. The one or more sensors of the hardware module sense the (back-) scatter of the predetermined excitation in form of the physical measurand in a contactless and/or contact-based manner. As shown in FIG. 11, the hardware module is bonded (e.g. by means of a ball grid) to a circuit carrier providing terminals to the outside of the housing. Another exemplary tamper-protected semiconductor module is shown in FIG. 22, where a cross-sectional view of a tamper-protected semiconductor module based on a BGA packaging is shown. The bonding and the provision of the connection terminals may be realized by any suitable technique known state of the art.

The hardware module protected by the cocoon may be any hardware structure that should be made tamper resistant. In one exemplary embodiment of the invention, the hardware module is a die, a multi-die, or a chip comprising one or more Integrated Circuits (ICs). Likewise and in another embodiment of the invention, the hardware module is a die, a multi-die, or a chip comprising one or more ICs assembled on a circuit carrier (e.g. by means of a bonding process).

The tamper-protected semiconductor module further has a cocoon that houses the hardware module (housing). This cocoon may also be referred to as a package or housing. The cocoon is configured to influence the (back-) scatter of the predetermined excitation to be sensed by the sensors. In the example of FIG. 11 the cocoon comprises a shielding which is advantageously provided towards the inside of the housing and which is surrounding the entire hardware module and the circuit carrier. The shielding is preventing interference with the measurand from the outside of the semiconductor module. Furthermore, the inside of the housing (and inside the shielding), the (gap/cavity inside the) semiconductor module (between the hardware module and the cocoon) may be filled with a potting material or—in another implementation possibility—the housing is the cocoon and thus contains the potting material, leaving the gap/cavity free, e.g. filled with gas.

Further, the housing may be non-transparent in the optical and infrared spectrum. This feature may be for example advantageous for preventing non-invasive attacks on the inside of the tamper-protected semiconductor module (respectively, its cocoon as the outer part), e.g. by means of infrared light or other optical scanning methods. Moreover, the cocoon may have a high thermal conductivity, so that heat (generated by the operation of the hardware modules circuitry and/or circuit components) may be guided to the outside of the cocoon thus enabling cooling of the hardware modules from the outside of the surrounding cocoon. A high thermal conductivity may be defined as a thermal conductivity $\lambda > 10$ W/m·K.

In order to provide unique deflection properties inside the cocoon, the design of the cocoon (besides adding a shielding) may ensure for such property. For example, the cocoon comprises a coating and/or a potting compound including a material or material mixture (e.g. granules added to a conventional coating/potting material, such as a ceramic or a synthetic material) influencing the (back-) scatter of the predetermined excitation. Please note the coating and/or potting is provided inside the shielding. In the exemplary embodiment shown in FIG. 11 the potting material is provided with some material (here, granules) which influences the (back-) scatter of the predetermined excitation of the emitters. In this embodiment, an electromagnetic excitation is used, i.e. the sensors may for example sense the electromagnetic field (e.g. magnetic field intensity and/or electric field intensity) of the (back-) scatter of the predetermined excitation from a specific point or region of the cocoon emitted from the emitters on the hardware module, which could be viewed as charting of an excitation map. These measured values are then quantized and form the digital PUF "response" to the "challenge", i.e. the predetermined excitation.

The granules within the potting and/or coating are of a material which reflects the excitation within the limits of the cocoon (i.e. the shielding) so that a unique (back-) scatter is sensed by the sensors. The distribution of the granules within the potting material is virtually random and depending on the production process of the cocoon. Therefore, the (back-) scatter obtained in response to the predetermined excitation is unique to the semiconductor module.

In another exemplary embodiment of the invention, the material of the shielding and/or the material of the granules thereof are similar to the material mixture of the hardware module and/or its bonding with respect to their chemical character (and optionally the physical character) to make full-invasive attacks on the tamper-protected semiconductor module more difficult: The package (cocoon) of a semiconductor module can be removed using acids or chemical bases in order to access the inside hardware module. By choosing the chemical character of the cocoon material and the hardware modules material (and/or its bonding) to have similar chemical resistance against acids/chemical bases, it is difficult to control the edging to only remove the cocoon material, while not damaging the hardware module and/or its bonding. Similarity in the physical character may be advantageous, since the physical character influences the reaction time with the acid/base. Hence, it becomes even more difficult to control etching precisely enough it only removes the cocoon material without damaging the hardware module or its bonding.

Basic Cocoon Mechanism of Action

As described above, one basic aspect of a (cocoon) PUF is the creation of a fingerprint using the cocoon. The fundamental mechanism of action is the statistic distribution of detectable descriptors for example embedded in potting materials or laminator foils surrounding the protected hardware module as housing. Exemplary implementations are made out of plastic, ceramics or glass components based materials, building the backbone of the cocoon.

There are variances of possibilities about how the fingerprints characteristics can be implemented, part of these are presented in the following.

One qualitative umbrella target of the cocoon functionality is the distribution and dispersion of events evidencing the existences of injuries and damages (penetrations) of the cocoon making holes (ideally at any position in the whole) structural cocoon matrix detectable. This introduces a threshold of perception.

The cocoon PUF reaches that goal by a passive (without any energy-consuming countermeasure to the attack) irreversible changing of the fingerprint.

In some embodiments of the invention, the following two approaches to achieve this are combined:

1. Granules or particles of solid objects and/or bubbles filled with liquids or gases of different size and shape are statistically distributed in a potting matrix. This mixture is then treated in way that it will change its state from a malleable (for example liquid) mass to a fixed state. This locates all the component parts inside the mixture, forming the cocoon. The excitation used to form the physical measurand(s) uses nearly all of the cocoon material, so that the transfer function of the PUF will change in case of "visible" cocoon changes (e.g. holes above the threshold of perception). Due to a weak (e.g. electromagnetic, optical or acoustic) coupling of the obstacles in the potting matrix, most of the measured effects are from the local material and the receptors for the measured data near to the position of the change (e.g. hole). More far away situated receptors are not expected to contribute much of the mechanical distortion and field displacement caused by the breach.

2. The "visibility" of breaches is enhanced, if the effect has the ability to "grow". This happens for instance if the structural changes caused by the breach (e.g. hole) influences further additional areas of its neighborhood so that the effect is replicated and insofar amplified. The result: modifying a small region of the cocoon structure has a correspondingly great effect on the extracted fingerprint.

Memory Mechanism of a Cocoon PUF

According to an exemplary embodiment of the invention, the cocoon PUF uses the challenge-response-pair (CRP) method, but only internal, for example by using a Fuzzy Extractor as shown in FIG. 21. Due to the principle of fingerprint generation, the fingerprint (FP) can be measured only from the inside of the cocoon. The existing and measurable (part of the) entropy will limit the number of different fingerprints to be expected. This equals to the cardinality as being the same number of elements as the CRP set. It is reasonable to expect more than 1020 variations, which is definitely enough for practical applications.

The fingerprint of the cocoon PUF is fixed like a ROM, i.e. after the cocoon production it is generated and will never change (only in case of an attack, as already said). To extend this ROM behavior to be usable for arbitrary secrets, a non-volatile memory capability may be implemented in the design. The raw fingerprint will be transformed after its measuring into a long-term stable digital dataset by using e.g. error correcting measures to stabilize the fingerprint against small variations introduced by the analog nature of the memory. In embodiments of the invention, the fingerprint is not stored in a digital memory, but recreated as it is needed (by a new measurement process). This can be done at every time, but only with the original, unchanged cocoon.

The arbitrary secret (SE) is encoded in the following way: The "owner" of the cocoon PUF calculates the function using the secret and the fingerprint (FP) as operands. For example the function can be realized by a simple XOR operation (SE XOR FP), but also other optionally more complicated functions could be used. The result of this function is called Helper-Data (HD). The Helper-Data may then be stored in a (digital) read/write memory without the need for further protection. The Helper-Data can thus for example be stored in- or outside of the module protected by the cocoon PUF. This procedure happens at minimum once a time in the beginning of the application of the cocoon PUF, where for example the IP owner "injects" the secret from the controlled environment outside. The reconstruction of the secret in the above described exemplary XOR operation, the calculation of (HD XOR FP) recreates the secret SE. Such a PUF usage model is also called Physically Obscured Key (POK) memory.

Different Variations of Principles of a Cocoon PUF

Since the properties of deflection, reflection, absorption, (back-) scattering, and refraction of the inside of the cocoon in combination with a given excitation depends on the production process, e.g. the packaging process of the hardware module, the measured (back-) scatter of the predetermined excitation influenced by the cocoon (deflection properties depending on the production process of the cocoon) provides a physical unclonable function (PUF) specific to the tamper-protected hardware module. This PUF functionality of the tamper-protected semiconductor module is for simplicity also referred to as "cocoon PUF". Using this cocoon PUF the hardware module is able to detect tampering of the tamper-protected semiconductor module and to detect non-invasive (or passive), semi-invasive and full-invasive attacks to access the inside of the cocoon or the hardware module, respectively. In case the hardware module detects a tampering attempt to the tamper-protected semiconductor module, the hardware module could for example make itself temporarily or permanently unusable.

How the tamper-protected semiconductor module is using its PUF functionality to detect tampering may be implemented in various ways. For example, in one exemplary embodiment of the invention, the tamper-protected semiconductor module may generate a digital "measured fingerprint" susceptible to be represented as e.g. a map (i.e. containing positional information, denoting the fingerprint that has—so to say—just been "measured" by the sensors) of the tamper-protected semiconductor module from the measured values of the (back-) scatter of the excitation provided by the respective sensors and detects an attempt to tamper the tamper-protected semiconductor module by comparing the measured digital fingerprint with a digitized fingerprint of the un-tampered tamper-protected semiconductor module (which may have been for example stored previously). It should be apparent that the repeated verification of the integrity of the cocoon or the tamper-protected semiconductor module requires the same predetermined (map of) excitation is emitted in each verification process, i.e. each measurement of the (back-) scatter of the (map of) predetermined excitation (for details on the "same" predetermined excitation, please see below).

In another exemplary embodiment of the invention, the cocoon PUF may be used to reconstruct a two-factor secret from Helper-Data. If the cocoon PUF is changed, the original, correct secret cannot be recovered from the Helper-Data any more. This procedure will be outlined in the following in more detail with respect to FIG. 13 and FIG. 14.

As depicted in FIG. 13, the Helper-Data generation process is exemplified, which is to be performed with the un-tampered semiconductor module. The Helper-Data generation function provided in the hardware module is provided with a secret and uses the PUF data obtained from the cocoon PUF by the measurement unit (collecting the sensors' measured values of the predetermined excitation's (back-) scatter) to generate Helper-Data. The secret is thus split into two parts (one exemplary way to achieve that is one aspect of the Vernam-Chiffre by Gilbert Vernam), the PUF data and the corresponding Helper-Data. The Helper-Data can be left un-protected and may be stored in a CASTORs internal or external non-volatile memory without any further protection. In order to recover the secret, a "secret generation function" is used, which is inversing the operation of the Helper-Data generating function, given correct PUF data and Helper-Data are used. Hence, the Helper-Data is loaded from the CASTORs internal or external storage and the secret generation function obtains the latest PUF data from the measurement unit (collecting the sensors measured (map of) values of latest measurement of the (back-) scatter of the (map of) predetermined excitation) to generate a secret. As long as the PUF data is the same PUF data previously used in the Helper-Data generation process and the Helper-Data is the Helper-Data generated in the previous Helper-Data generation process, the correct secret is reconstructed, otherwise another, however incorrect, "secret" is obtained.

Using this mechanism for tamper protection, some essential data required by the firmware to operate the hardware module could be input to the Helper-Data generation function upon setup or initialization of the hardware module, and only the Helper-Data thus obtained is stored in the hardware module (or an external memory). Hence, in order to operate the hardware module, the tamper-protected semiconductor module requires the correct secret (i.e. the essential data). Accordingly, the hardware module might generate a measured digital fingerprint of the tamper-protected semiconductor module from the (map of) measured values of (back-) scatter of the excitation provided by the sensors, receive the Helper-Data from memory, and generate a secret based on the measured digital fingerprint and the Helper-Data (a two-factor secret), as depicted in FIG. 14. In case the measured digital fingerprint is not corresponding to the "correct" (previously measured and digitized) fingerprint of the un-tampered tamper-protected semiconductor module, the generated (recombined two-factor) secret is incorrect. This means: It is not corresponding to the "correct" secret that had been obtained from the generation of the secret using the Helper-Data and the "correct" fingerprint of the un-tampered tamper-protected semiconductor module.

Hence, in this case the hardware module won't be operable as the essential data won't be correct. Furthermore, the generation of an incorrect secret does also imply, the unique (e.g. deflection) properties inside the cocoon must have been changed somehow (i.e. the PUF fingerprint function of the tamper-protected semiconductor module has also changed), which in turn indicates an attempt to access the inside of the cocoon (respectively, tamper-protected semiconductor module), thus flagging a tampering attempt.

Electromagnetic (Radio) Fingerprinting

One possible way to produce a fingerprint is as follows: The cocoon interacts with electromagnetic excitations used for the intensity measurement based on applied radio frequency (RF). For example, in one embodiment of the invention, methods of (near-field) spectroscopy in combination with a matrix of electrodes are used to allow the measurement of local individual transmission behavior patterns, caused by physical characteristics. Such physical characteristic is for example density. This is influenced by the gap-distributed particle materials (like intraformational conglomerates and components in the cocoon) due to their characteristic electromagnetic resonances and absorptions impacts on the field lines.

In one example implementation an emitter-/sensor phalanx is used to transmit pulses of radio-/microwaves which bounce off and diffuse into the cocoon. The cocoon returns a tiny part of the wave's energy to the emitter-/sensor phalanx. Measurands of data of such "excitation" may be one or more of the following:
   (displacement of) amplitude (=intensity),
   (displacement of) frequency,
   (displacement of) phase and the
   (displacement of) signal propagation delay.

The quality of the measurands may cover one or more of the following:
   (grade of) dissipation ($\delta$, degree of the lost intensity),
   (grade of) absorptivity ($\alpha$, degree of the absorbed intensity),
   (grade of) transmittance ($\tau$, degree of the leaked intensity) and the
   (grade of) reflection ($\rho$, degree of the reflected intensity)
(where relation between these physical values: $\rho+\alpha=1$, $\rho+\tau+\delta=1$, $\alpha=\tau+\delta$ can be assumed).

Atoms and molecules have unique spectra, which can be interpreted to derive information about them. The measured spectra may be used to determine the composition and physical properties of the functional granules of granulates (the functional particles), liquids or gases filled bubbles within the potting matrix forming the cocoon.

Transport mechanism of charge carrier and electromagnetic impacts to functional materials can be manifold. According to embodiments of the invention, it is possible to analyze state and sort of the deposited materials inside the cocoon through the appearance of material specific time constants of those (relaxation) effects. Part of these occurring effects can be reduced to phenomena of the atomic electron shell, to atomic or dipole moments, to (rare) electrochemical charge coupled effects, to interface boundary layer charges and many other effects.

In practice, (part of) this can be used for the same organic resin and production process that is employed in manufacturing of the chip housing (as established in the semiconductor industry) and is well suited as host matrix to incorporate a dispersed mixture ranging from nano- to micro particles with a unique combination of (different) particle sizes, (different) shapes, (different) distributions, (different) filling factors (volume fraction) and (different) physical properties of the particles.

Generally, in composite materials, homogeneous dispersion of the particles is always a challenge because the particles tend to agglomerate. For the present application in a cocoon, however, some degree of heterogeneity may be beneficial. The degree of heterogeneity in the local distribution of the particles tailors the functionalization of the particles covering the whole range from non-functionalized particles, which tend to agglomerate, to completely functionalized particles which can be dispersed homogeneously.

Among the different particles with different physical properties the conductivity of the particle material may be an important quantity. For example, large effects may result from using metallic particles. In some exemplary implementation of the cocoon, carbon black or TiO2 can be used as filler, although metallic particles may allow for a much better control of the properties to influence fields (lines). Moreover, some implementations of the cocoon may also use the alloy composition as an additional adjustable parameter, which is especially interesting for magnetic particles (see below).

Incorporated semiconducting particles into the matrix can take advantage of the resulting nonlinear features of Shottky junctions. For example, fullerenes (i.e. molecules composed entirely of carbon, in the form of a hollow sphere, ellipsoid, or tube, called buckyballs in its spherical form or Carbon-Nano-Tubes (CNTs) in their cylindrical form), which are typically produced as a mixture of metallic and semiconducting tubes, offer the possibility to form many Shottky junctions in a random way during dispersion.

In other exemplary implementations, ferromagnetic particles may be comprised in the cocoon, because they can be designed to exhibit a ferromagnetic resonance frequency in the interesting frequency range. Thus it may be possible to obtain a random but unique distribution of resonances by using ferromagnetic particles of different size and shape and, if metallic particles are used, different alloy composition. Via the particle filling factor, eddy current damping is another means of generation of additional information within the cocoon material. Since the chip housings may for example have a thickness in the mm range (this may be relaxed to even sub-mm range due to the integration requirements for lamination and RFID applications) the ferromagnetic resonances and the eddy current damping can also be used to avoid an extra shielding layer around the cocoon. This is also an exemplary way (as alternative or in combination with special external shielding materials) to reduce the problem of GHz frequency crosstalk between different chips.

The dielectric properties and their spatial variation can be tailored by adding particles with a very high permittivity into the particle mixture causing radio-wave resonance and Mie scattering. Possible materials are BaTiO3 and YIG, for instance.

The relevant physical properties may depend on the frequency range of the electromagnetic radiation which is used for the secret generation, because the transmission (due to dielectrics, magnetics and conductors), reflectance (due to scattering and transmission) on our 3D nano- and/or microstructures causing propagation, dispersion and the absorption, as well as memory effects (e.g., due to capacitive coupling) depend on the frequency range at hand. Reflection and refraction of RF near-field waves at the boundary of two media can produce hard-to-predict effects: The modeling can be done by using the Maxwell equations or the generalized Ewald-Oseen extinction theorem. The exemplary frequency range of up to 10 GHz was identified to be as most suitable. In this frequency range, available materials allow tailoring physical properties over a broad range. The crucial properties are the frequency dependent real and imaginary part of the permittivity $\varepsilon(\omega)$ and the permeability $\mu(\omega)$ and the frequency dependent conductivity $\sigma(\omega)$. The imaginary parts of $\varepsilon(\omega)$ and $\mu(\omega)$ represent the losses and are closely related to $\sigma(\omega)$. Nonlinear effects can be explored for generating additional information, in particular, by using Shottky junctions.

There are various possibilities how to provide the one or more emitters on the hardware module. For example, one possibility is to use (non-specific) circuitry and/or integrated circuits of the hardware module (e.g. semiconductor elements and/or Micro-Electro-Mechanical-Systems (MEMS)) as emitters. Hence, individual circuit components, wires or some chip areas of the hardware module may have properties of an oscillator/clock generator/radiator and may thus be used as emitters for emitting the predetermined electromagnetic excitation.

In another exemplary embodiment of the invention a set of (for instance) electrodes is used to excite (stray) fields within the interior of the cocoon. The fan-out of these electrodes may be for example achieved through an internal switch matrix, but may also be realized via port connectors. The cocoon interior could for example form a cavity. The various electrodes could be coupled through (for instance) evanescent fields or resonances, which may be governed by geometrical properties as well as potentially inhomogeneous material inclusions in a unique manner By exciting pairs or groups of input and output electrodes, various field patterns and thus surface current distributions can be obtained. The position of the electrodes and therefore the field distributions are chosen in a way, that, wherever the shielding (or the cocoon itself) is broken or deliberately penetrated from the outside, the surface currents and thus the internal fields as well as the coupling of the electrodes will be distorted. The distortion will be observed at or can be derived from the port signals.

In order to ensure the emission of the predetermined excitation, the tamper-protected semiconductor module operates the emitters at predetermined operation conditions during the period in time the sensors are to measure the (back-) scatter of the excitation. To establish such operation conditions, the tamper-protected semiconductor module may (partially) deactivate the (integrated) circuit parts of the hardware module during a measurement cycle in which the one or more sensors sense the (back-) scatter of the predetermined excitation. For instance, such (partly) deactivation may be a deep power down to minimize the interference of the (integrated) circuit parts of the hardware module with the (back-) scatter of the predetermined excitation.

With respect to the electromagnetic signal exchange nature, it is additional possible to "check the channel" before executing the reconstruction process revealing the secret. Such a Physical Carrier Sensing (PCS) of the environment through passive scanning for later collision avoidance attitude may be useful to optimize the procedure.

Alternatively or in addition, the circuitry use and/or integrated circuits of the hardware modules emitter, oscillators/radiators may be provided on the hardware modules for the purpose of emitting the predetermined excitation. The entirety of the oscillators/radiators together (and optionally in combination with the emitter(s) formed by circuitry and/or integrated circuits of the hardware module) emits the predetermined excitation.

The concept of the cocoon PUF is, however, not limited to the use of electromagnetic excitations. The emitter(s) may provide an electromagnetic excitation (e.g. electromagnetic fields, X-ray, etc.), an optical excitation (e.g. generated by LED or LASER elements) and acoustic excitation (e.g. infra- or ultrasonic), or combinations thereof (please see below). Accordingly, the sensors that sense the (back-) scatter of the excitation are—dependent on the type of the excitation—electromagnetic sensors, electric field sensors, magnetic field sensors, acoustic sensors, optical sensors or other radiation sensors. The sensors and/or the emitters may be implemented as Micro-Electro-Mechanical-Systems (MEMS) and/or Nano-Electro-Mechanical-Systems (NEMS).

Optical (Light) Fingerprinting

Optical imaging is a technique and process used to create images of the environment for further processing purposes (physical procedures seeking to reveal, analyze or examine information for an "initial pattern learning" or "recognition match with already known patterns"). Although imaging physical structures of interest can be performed for analyzing reasons, such procedures are not usually referred to as picture imaging, but rather could be a part of cocoon fingerprinting. As a discipline and in its widest sense it is part of general imaging and incorporates investigative radiological sciences, thermography, and photography. Measurement and recording techniques which are not primarily designed to produce images, but which produce data susceptible to be represented as maps (i.e. containing positional information) can be seen as forms and means of fingerprinting imaging that may also be used to generate a fingerprint of a given semiconductor module including a cocoon.

An example for such optical fingerprinting that may be used also for generating fingerprints of a semiconductor is an optical radar, particularly a laser radar (Light Detection And Ranging (LIDAR)) used to record range images (the name for a collection of techniques which are used to produce a 2D image showing the distance to points in a scene from a specific point, normally associated with some type of sensor device) or reflection images (same constructed from the reflection and on the formation of light). It consists of a light source (serving as an emitter of the excitation), a light receiver (serving as a sensor) and a processing unit. The light source and the light receiver can be e.g. constructed as diode rows which operate in conjunction with one or more imaging optics in a manner a light pulse from a particular transmitter diode is imaged on a particular receiver diode after reflection in a particular scanning field of the objective lens. For fingerprinting a semiconductor module, one or more light sources and one or more light receivers could be provided on the hardware module and the scanning field may be defined within the inside of the cocoon encapsulating the hardware module.

Acoustic (Sonic) Fingerprinting

An acoustic wave is the propagation of oscillations of molecules or point masses. The sonic speed is up to pressure, temperature, material properties, frequency and amplitude. At every place the contemporaneous measurement of time-dependent physical values like the elongation of atoms/molecules from their middle position, speed, pressure, temperature, and density is possible. This leads to the calculation of sound pressure, energy density, sound power, sound intensity, and sound pressure level, usable for a fingerprint generation process. An example for such principle is the navigation of bats through ultra/supersonics, allowing them the acoustic classification of landmarks and identification of objects. Another example of sonic fingerprinting is found in the field of underwater acoustics: The study of sound-propagation in water and the interaction of the mechanical waves that constitute sound with the water and its boundaries. This leads then to a number of other fields of acoustic study, including sonar, transduction, acoustic signal processing, acoustical oceanography, bioacoustics, and physical acoustics. All these areas use the physics of acoustic waves for fingerprinting purposes in one or another way and the principles may also be used for generating an acoustic (sonic) fingerprint of a semiconductor module. For example, an acoustic (sonic) excitation can be emitted by the emitters on the hardware module and the sensors measure (or a processing unit determines from measurement values of the sensor(s)) one or more of the parameters sound pressure, energy density, sound power, sound intensity, and sound pressure level, which are used to defined a fingerprint of the semiconductor module is some predetermined way.

Digital Geometry Processing (DGP) Fingerprinting

Digital geometry processing is used to generate a three-dimensional image of the inside of an object and its detailed internal structures from a large series of two-dimensional images. Known examples are Computer Tomography (CT) scanning systems and Magnetic Resonance Imaging/Tomography (MRI/MRT) systems. Both produce a volume of data which can be manipulated through a process known as "windowing" in order to analyze various structures based on their ability to block the radiation. Although most common in medicine, they are also used in other fields, such as nondestructive materials testing. Another example is archaeological use. In this invention, these mechanisms can be used to generate a PUF fingerprint inside the cocoon (shielding) of the semiconductor module.

Shielding Methods

The shielding, of course, also depends on the type of the excitation by the emitter(s). Hence, the shielding can be an electric, magnetic, electromagnetic, acoustic, optical shielding or a combination thereof (as descript above). The mechanism of action of a shielding is a combination of reflecting and absorbing/attenuating an excitation, so that only very little excitation would penetrate the cocoon (with the shielding).

The intended effect of a shielding comprises two principle strategies:
  preventing undesirable emittance of the excitation to the outer world beyond the limits of the cocoon, to minimize EMI and insofar protecting the environment from a pollution of the excitation, and
  preventing a "mixture" of the self-generated "predetermined" excitation with an excitation coming from the outside of the tamper-protected hardware. This ensures the sensors measure of only the (back-) scatter of the predetermined excitation within the limits of the cocoon (respectively, the shielding provided therein). Different types of shielding are to be applied depending on the type of the excitation by the emitter(s).

Electromagnetic (Radio) Shields

If electromagnetic excitation is used, in one embodiment of the invention, the shielding should be an electromagnetic shielding to provide a Faraday cage within itself. For example, the shielding material may be or comprise a metal or another material with high magnetic permeability and high electrical conductivity. This electromagnetic shield may shield anything inside its cocoon, the shielding from all electromagnetic excitations, or at least electromagnetic excitations up to frequencies in the GHz or even THz range. Hence, the permeability of the shielding material should be selected accordingly.

In one embodiment of the invention, the magnetic permeability of the material of the electromagnetic shielding is as high as possible. In an exemplary embodiment of the invention, the shielding has high magnetic permeability, such as for example permalloy (e.g. a Nickel-Iron magnetic alloy). Furthermore, in some applications low coercivity, near zero magnetostriction, and significant anisotropic magneto-resistance of the shielding material may be desirable. High magnetic permeability for example means permeability $\mu_r$ higher than approx. 5.000 H/m.

The electrical conductivity (the specific conductance is the reciprocal quantity, and measures a material's ability to conduct an electric current) of the material of the electromagnetic shielding is as high as possible. In an exemplary embodiment of the invention, the shielding has high electrical conductivity, such as a metal (or a combination of metals) like aluminum, gold, copper or silver for example. High electrical conductivity for example means a conductivity $\sigma$ (commonly represented by the Greek letter $\sigma$, but also the Greek letters $\kappa$ and $\gamma$ are occasionally used) higher than approx. 106 S/m.

In an exemplary embodiment of the invention, the shield of the cocoon may cover the cocoon's outer surface, and may be only broken at the connection ports.

Optical (Light) Shields

An optical shielding may for example comprise one or more surface reflectors or could be implemented as a surface reflector that covers at least a portion of the hardware module. For example, in one exemplary implementation, the surface reflector(s) could be made of metal (e.g. aluminum, silver or the like) in form of a coating e.g. on the inner and/or outer surface of the cocoon. Another exemplary realization of an optical shielding is to use the principle of optical fibres. The light is "waveguided" on the top of the cocoon on the hardware module by the shielding—acting as "light pipe"—using a process of total reflection between two dielectric materials of the shielding with different refractive indices. Another way is the more or less high absorption known from black bodies.

Acoustic (Sonic) Shields

An exemplary known way to shield acoustic excitation is the anechoic room that can be for example provided inside the cocoon (more precisely, the shielding) of a semiconductor module. An anechoic chamber is designed to suppress the acoustic echo-waves and isolates from the acoustic noise present in the external environment.

Another way is the usage of Active Noise Reduction (ANR) inside the cocoon of the semiconductor module in cases where the structure of the noise is known (e.g. by using internal and/or external microphones). Noise-cancelling may be for example realized by emitting a sound wave with the same amplitude but with inverted phase (also known as anti-phase) to the original sound. The waves combine to form a new wave, in a process called interference, and effectively cancel each other out—an effect which is called phase cancellation.

Another exemplary implementation of an acoustic shielding is provided using shielding material able to comprise or consist of permanently elastic compound structured foamed material, which could be provided inside the cocoon of the semiconductor module.

Magnetic Shields

In another embodiment of the invention, a magnetic shielding can be provided. The conductivity/permeability of the shielding material should be as high as possible. In an exemplary embodiment of the invention, the shielding material comprises or is a material that has a high permeability, such as permalloy for example (e.g. a Nickel-Iron magnetic alloy).

Furthermore, in some applications it may be desirable that the shielding material furthermore has low coercivity, close to zero magneto-striction, and significant anisotropic magneto-resistance. High permeability may for example mean permeability $\mu_r$ higher than 50,000 H/m or at least 5,000 H/m.

Electric Shields

Another possibility is to use an electric shielding. The electric shield is reducing the electrostatic field in a space by blocking the field with barriers made of conductive materials. The same precautionary measures applied against the electromagnetic shielding are also suitable for blocking this type of field.

Creation, Generation and Manufacturing Methods

Production of the Shielding

The shielding can be produced by using one or more of the following technical processes for producing different layers of shielding material on the inside and/or outside of the cocoon surface:

sintering one or more shielding materials, sputtering one or more shielding materials, spraying, spritzing or bubbling one or more shielding materials (e.g. using High-Volume-/Low-Pressure plants (HVLP)), coating and/or plating one or more shielding materials (e.g. electric conductive (finishing) paint/lacquers containing/made of epoxy, polyurethane or acrylic with expletive particles like silver, silver plated copper, pure copper or nickel), immersing in one or more baths of fluids comprising the shielding material, evaporating, optional in a vacuum, of one or more shielding materials (e.g. Physical Vapor Deposition (PVD)), electroless plating one or more shielding materials (e.g. one layer/sheet/lamina e.g. of pure copper, followed by another layer/sheet/lamina e.g. of nickel-phosphorus alloy), electrolysis using one or more same shielding materials.

Creation of the Fingerprint

Regarding the predetermined excitation, there are also various possibilities how to generate such predetermined excitation. To reproduce the "fingerprint" (of the un-tampered hardware) the predetermined excitation should be the same in each measurement cycle in which the sensors sense their measured values that are used to determine the actual "just measured" fingerprint. In practice, it may be difficult to achieve identical excitations (for example, due to temperature variations, drift effects of physical material properties in time, the fact of a noisy measurement, fuzzy sensors, etc.).

Hence, the same excitations should not be interpreted as 100% identical excitations; however, the variations may be compensated by the fingerprint generation process (e.g. using error detection and correction mechanism, e.g. ECC, EDC and CRC) of the fingerprint from the measured values provided by the sensors and/or countermeasures may keep variations of the excitation in an acceptable range not critical to the uniqueness and stability of the generated fingerprint. In one exemplary embodiment, the cocoon's influence the (back-) scatter of the excitation to be sensed by the sensors is insensible to change of temperature (at least within a definable range or desirable range of temperatures).

There may be a tradeoff in terms of a mutual influence between the implemented countermeasures keeping variations of the excitation in an acceptable range not critical to the uniqueness and stability of the generated fingerprint (effectively, such countermeasures may reduce the amount of usable digital data for the fingerprint) and the generation process of the fingerprint from the measured values provided by the sensors (i.e. the measured values so to say forms the data basis for determining the fingerprint): On the one hand, the generation process of the fingerprint should not reduce the data basis for the generation of the fingerprint such that it loses its uniqueness; on the other hand, countermeasures keeping variations of the excitation in an acceptable range may aid to minimize the reduction of the data basis for the fingerprint, but may be expensive to implement. However, by providing a sufficiently large data basis, i.e. sufficient number of measured values by the sensors for the countermeasures to keep variations of the excitation in an acceptable range may be one solution to solve this tradeoff.

To generate a sufficient data base (i.e. a sufficient number of measured values (respectively "bits") once the measured values are quantized) that can be used for the generation of the unique fingerprint of the tamper-protected semiconductor module, different possibilities to design the predetermined excitation of the one or more emitters are possible. For example, one possibility may be that the predetermined excitation is a constant predetermined excitation, i.e. not varying in time. Alternatively, the predetermined excitation could be also an excitation that is varying in a predetermined manner—which implies that the sensors should measure the measurand multiple times within a measurement period. The variation of the excitation could be for example implemented by the hardware module comprising an excitation controller, also referenced as Fuzzy Extractor (as shown in FIG. 21), that controls the emitters individually or in combination to produce the predetermined excitation varying in time. For example, different sets of emitters, also referenced as part of the Emitter-/Sensor Phalanx (as shown in FIG. 21) are used in a given sequence in time to generate respective excitations (i.e. a predetermined sequence of individual excitations) that form the predetermined excitation.

In one exemplary implementation of the invention, the measurement process uses the feature of localization (pinpointing) to increase the available database of measurands.

In a further embodiment, the sensors to provide a measured value of the measurand that is to be part of the data basis for generating the fingerprint could be controlled by the hardware module. For example, the hardware module may trigger/query different sets of sensors at different times of a measurement cycle to receive their measurement results. This control of the sensors may of course be readily combined with the control of the emitters described in the preceding paragraph.

For the purpose of controlling emitters and sensors and optionally of deactivating the (integrated) circuit parts of the hardware module during a measurement cycle, a measurement unit may be provided on or by the hardware module (an exemplary implementation is shown on a block diagram within FIG. 21: "Key Control"). This management unit may be considered an IC of the hardware module or may be implemented in its firmware. The management unit transmits and/or receives commands and/or data packets from the other integrated circuit parts of the hardware module, e.g. the sensors and emitters to control their emission, respectively receive the measured values. Further, the measurement unit may coordinate the one or more sensors and the one or more emitters in a measurement cycle.

Please note, the cocoon may be the housing of the hardware module or may itself be included in a housing together with the hardware module. Likewise, the shielding of the tamper-protected semiconductor module could be part of the cocoon or may enclose same. In case a "separate" housing is provided the cocoon could be provided in form of a malleable mass between the housing and the hardware module.

Manufacturing of a Tamper-Protected Semiconductor Module with Cocoon PUF

Another aspect of the invention is the provision of a manufacturing process for a tamper-protected semiconductor module with a cocoon PUF. According to an embodiment of the invention the manufacturing process of a tamper-protected semiconductor module with a cocoon PUF comprises the provision of a hardware module equipped with one or more emitters for emitting a predetermined excitation that can be measured as a physical measurand, and one or more sensors for sensing the (back-) scatter of the excitation in form of the physical measurand in a contactless and/or contact-based manner. Further, as another step of the manufacturing process, the hardware module is housed in a cocoon to realize the tamper-protected semiconductor module, wherein the cocoon influences the (back-) scatter of the excitation sensed by the sensors in a way unique to the tamper-protected semiconductor module.

Housing the hardware module in the cocoon comprises enclosing the hardware module in a potting material, and encapsulating the hardware module enclosed by the potting material with a shielding to prevent interference with the predetermined excitation from the outside of the tamper-protected semiconductor module. As noted above, the shielding may be but is not necessarily part of the cocoon.

Optionally, the shielding may be subject to thermal treatment. Further optionally, the manufacturing method provides a passivation (e.g. electrical isolation) to the hardware module.

The hardware module may be manufactured in a standard wafer process, for example a silicon semiconductor process.

In the following, some exemplary methods for producing cocoons are presented. The invention is however not limited to these methods, but also other suitable methods may be used. A cocoon may also be viewed as sensing element driven by stimuli excitations and reporting-back measurands (measured data). As a result, the fingerprint of the cocoon can be obtained. This is shown in principle in the FIG. 20.

There are many ways to manufacture cocoons with attributes as contemplated by this patent application. Different possibilities to build a cocoon are described in the "cocoon design methods" set out below. Cocoons can be produced using only one of the manufacturing concepts outlined below, i.e. applying only one of them as single cocoon design method, but it is also possible to use a combination of more than one of the manufacturing concepts outlined below, i.e. to combine cocoon design methods set out below to manufacture cocoons.

Cocoon Design Method: Cavity Resonators

The mechanical arrangement of the cocoon and its unique material properties may sometimes lead to individual cavity properties. These are discoverable through a measurement of resonance behavior over the applied frequency range in form of pronounced maxima and minima (modes) field distributions.

In one exemplary implementation, the cocoon excitation will be carried out with wideband signals, having spectra from e.g. some kHz or MHz up to several GHz (kind of pulsed Ultra-Wide-Band (UWB) signals), in another exemplary implementation, this could be extended to reach even THz (it is a matter of costs and the design restrictions due to the production technology someone is willing to take).

One possible choice is the usage of Gaussian monocycles, which can be produced in a cheap manner, but also other time-domain waveforms are possible. The usable bandwidth of the signals may be even extended by partially non-linear properties of the filling material (field amplitude-dependence of the constitutive material parameters, e.g. through internal Shottky-contacts formed by metal and semiconductor inclusions (fullerenes as CNTs)).

As already noted, electrodes are an example for means to couple the excitation and responding reaction as impulse answer or transfer function between the cocoon and the cocoon PUF circuitry. For every chosen electrode combination (responsible for the excitation and the measurement), the (wideband) output signal may be recorded in an exemplary implementation by sequential (sub) sampling (subsampling is one of the prevalent method of choice for periodic signals). This can allow for extremely high effective sampling rates utilizing slow and cheap analogue-to-digital converters. From the entity of the various recorded signals, a unique fingerprint can then be derived by sophisticated signal processing (Fuzzy Extractor).

Cocoon Design Method: Self-Organization and Structure Formation/Texturing

The effect of structure formation and texturing of self-organization like crystal growth (epitaxy) for example on boundary layers and thin films (e.g. Frank-van-der-Merwe-growth, Stranski-Krastanov-growth or Volmer-Weber-growth) generates very many-body (particles) systems from a huge number of very small objects. A well known example for crystal growth is the growth of ice crystals.

The basic mechanisms as triggering events for interaction of these different types of self-organization are van-der-Waals-forces, Hydrogen-bonds, electrostatic-forces and the steric-effects. They form a complex balance between forces, figures, distances and orientations. This leads to the process of crystallization of solid state bodies. Properties of surfaces are also decision-making factors, which can be used systematical in the task of "Crystal Engineering". Such a controlled crystal growth leads in a first step into the composition of nanocrystals in a microemulsion, ending up in a 3D crystal cobweb forming up and structuring the cocoon material.

The aimed doping of guest-atoms into grain boundary voids and imperfections in the laminate of the presented cocoon leads into a macroscopic dispersion measurable differences of quality characteristics.

Another exemplary implementation for the crystallization of polymers caused by the spaghetti syndrome, where form and size constrain the regular alignment of crystal structures resulting in crystal errors, is the use of nano-structure materials consisting of block-co-polymer of different—immiscible—single components results into microphase separation, where a combination of multiple different blocks build up more and more complex macro-structures. This results into an individual cocoon. In another exemplary implementation, nano-structure materials can be combined with "hard-" and "soft-matter" components of hybrid materials in sandwich layers, where in each case an organic polymer film serves as molecular adhesive in a combination with an anorganic layer as barrier and amplifier stacked one upon the other as another way to generate a cocoon suitable in the sense of this use-case.

Cocoon Design Method: Mechanical States of Stress/Tenseness

Another exemplary solution to create a cocoon is the building-up of very high stress latency during the state change (from the liquid) into the setting phase of the cocoon material. This could be shaped as strong bonding of the molecules. If a cocoon constructed like this is injured by trying an invasive penetration (e.g. by applying a hole drilling instrument (see also chapter "Reverse Engineering of a Cocoon PUF")), the cocoon will be teared apart into fragments.

The cocoon may be thermally pre-tensioned. This may be achieved for example by a quick cooling down (chilling) procedure for the outer surface of the cocoon after the heat build-up.

Such a treatment creates a compressional stress on one surface of the cocoon material (due to quick cooling). Further, the in the core up to the other inside surface of the cocoon there may be a compensational tensile stress profile (due to slow cooling). This stabilizes on the one hand the nominal bending strength, but affected on the other hand a more or less completely torn down cocoon smashed to smithereens in case of mechanical interferences.

Cocoon Design Method: Small Spherules

Colloid polymer dispersions of particles (exempli gratia latex) create superior structures during the state transfer from the solvent phase into the setting phase of a pre-productional cocoon material component part. In a process of further complexation of polyelectrolytes (symplex) microcapsules are emerging from it. This process is then steered up to a moment in time, where these microcapsules (filled with liquid electrolytes) are big enough to fulfill their duty: as part of the cocoon potting material an injury of their diaphragm allows for a leakage of their liquid into the embedding and surrounding area. In another exemplary implementation of the invention, the diversity of microcapsules will be extended to allow different electrolytes and/or different capsule sizes. The emergence of the liquid causes a significant change of measurable parameters building the cocoon fingerprint.

Cocoon Design Method: Under- or Overpressure

As already noted, the cocoon may have an air gap or cavity between the protected core part in its center (mostly referenced as tamper-protected hardware module) and the inside delimiter of the cocoon itself. This air gap or cavity may be for example filled with a sort of pressure-sensitive (semi-rigid) foam, e.g. using foam of fullerenes and/or of polyurethane elastomers. This foam is endowed by using substances influencing the physical effect sensing the (back-) scatter of the excitation in a form that the measured fingerprint depends on the pressure. The filling could be for example done in an environment working in under- or overpressure conditions, both suitable for this design method. The exact pressure may be randomly chosen within a window of allowed minimum and maximum over- or underpressure in comparison to the "normal pressure" at production time.

After the manufacturing of the cocoon, the protected device will be pressure-sealed closed, before leaving the production facility with the atmospheric under- or overpressure.

The foam is not changing its constitution (of granularity) as long as the pressure is not changes. This applies also to the fingerprint of the protected device: it will not change (up from the time of birth of the device) as long as the pressure is stable.

In case of any significant pressure change (as for example introduced by a hull breach of the cocoon), the foam structure (collapses and) changes irreversible too. As a result, the fingerprint of the device can nevermore be reconstructed, the secret is gone.

Exemplary Application of the Cocoon PUF: CASTOR/Nano-Safe

One exemplary use for the electromagnetic (radio) fingerprinting type of the cocoon PUF is the CASTOR, as exemplarily shown in FIG. 21 as a block diagram. The block "Cocoon-PUF" covers the disclosed cocoon in a logical formal functional way. The cocoon PUF is exemplified as a "box" because the cocoon itself is not part of the structure of the one or more semiconductor module(s). The box indicated as "Third 'IP' Party's Circuitry using the Secret" comprises the user-based tamper-protected semiconductor module(s) itself. The Helper-Data is the content of a non-volatile memory, which is insensible under security aspects and insofar not in the need of being protected. It can be situated in- or outside of the security perimeter of the CASTOR. The remaining functional "blocks" are explained in the following.

The Emitter-/Sensor Phalanx

Due to the electromagnetic nature of the coupling principle between the PUF circuitry on the die and the physical cocoon an emitter/sensor phalanx is used to emanate and receive the electromagnetic waves. Due to mechanical space restrictions on the die, one exemplary possible way is the usage of a plurality of electrodes forming a matrix located on the surface of the die. Another exemplary implementation—with can be combined with the before-mentioned matrix of electrodes—is the (partly) use of the connection terminals of the chip (as shown under FIG. 11 and FIG. 22).

One potential obstacle may be the geometric small semiconductor structures compared to the wavelength: Using an exemplarily excitation frequency range of 1 up to 10 GHz, this corresponds to a wavelength of 30 cm to 3 cm. Another higher range of 10 to 100 GHz corresponds to 3 cm down to 3 mm and even in a very high range between 100 GHz and several THz the wavelength is less than 3 mm One effect of this is that the smaller the electrodes are compared to the wavelength, the smaller the radiation resistance. The problem is that since energy losses increase with decreasing radiation resistance, the energy radiated by the electrodes will drop with reduction of their size. Electric field lines hardly emanate from (extremely) small antennas or aerial points. They only slightly detach and travel into space and thus contribute only little to the radiation of energy. They do not tear up, but migrate back to the generator, i.e. the respective electrode. Consequently they merely represent reactive power with a net flux of zero. Due to this near-field measuring, electrodes are an exemplary choice to emanate and measure the excitation for media different from free space (usually air or vacuity).

The Fuzzy Extractor

The main task of the Fuzzy Extractor in FIG. 21 is to extract the fingerprint information out of the cocoon PUF. This is not a simple quantifier task like an analog to digital converter scheme. The information of a PUF is blurred in the ideal case all over the medium. The Fuzzy Extractor is therefore able to get the specific weasel average information content of the cocoon and have to convert it to sharp data. This is why such a behavior is called fuzzy logic.

For the extraction of the fingerprint from the cocoon PUF, methods for quantifying (spatial) pattern into digital data can be used. One exemplary implementation for the digital signal processing can be the Fast Fourier Transformation (FFT) as stand-alone method or in combination with the Generic Deterministic Model (GDM) using the Volterra equations or as another exemplary implementation the Generic Statistical Model (GSM) applying the Hidden Markov Model (HMM).

The Fuzzy Extractor may be a combination of an error correction unit (for example by using BCH codes) disposing off the noise and a hash function to guarantee a uniform distribution of the bits. The definition of noise includes environmental influences like heat, dampness, signs of wear and other influences changing the cocoon PUF's material properties.

The Key Control

The Key Control unit as shown in FIG. 21 can be considered a controller of the cocoon PUF circuitry, particularly with regards to handling its functionality. The Key Control unit contains intelligence to handle the algorithms and local intelligence for the other (sub) functionality, such as for example the signal extraction and processing. The central tasks of the Key Control unit may be one or more of the following:

the control of the cocoon PUF-based security subsystem,
enrolling an external offered secret into the system as last action of production,
internal reconstruction of the secret and its delivering over a simple interface,
management of the Helper-Data stored in internal or external non-volatile memory.

Helper-Data Non-Volatile Memory Entries

During the very first time of a cocoon PUF initialization for the enrollment of the secret, the cocoon PUF makes a characteristic determination of the physical cocoon structure. This is called Compartment Management (CM) and can take several minutes of processing (formatting) time. The respective produced data is stored within the Helper-Data memory.

For instance, a checksum algorithm or hash could be used to produce a fingerprint of the secret computed during the enrollment process. The same checksum algorithm or hash is then also used for the purpose of detecting reconstruction "read" errors that may have been introduced during the PUF access. The integrity of the reconstructed secret can be checked at any later time by recalculating the checksum and comparing it with the stored one. If the checksums match, the secret is valid.

The following items may be to be stored within the Helper-Data memory:

a-priori knowledge for the Fuzzy Extractor (optional),
cocoon Compartment Management data (CM) (optional),
cocoon nominal value fixpoints for cover breach detection (optional), selected bit cell positions or used model function with parameters (optional),
  the public part of the secret, i.e. the Helper-Data,
  a crypto fingerprint of the reconstructed secret (optional),
  a checksum of Helper-Data content (optional).

Perspective of an ASIC Designer

The CASTOR works from the perspective of an application chip designer in the following way: Assuming that the protected application needs for example a cryptographic key to decrypt data or an embedded firmware. The required secret (i.e. the key) is not stored in any non-volatile digital memory or storage; it is part of the analog PUF information mechanism of the cocoon. The key can be requested by "ringing the bell" using an internal—very simple—interface of the cocoon PUF and will be delivered within short time. The easiest usage model is to request the secret just after power-on of the chip and store it in a register-based buffer. More elaborated utilization will minimize the time the unencrypted secret will stay in any volatile digital registers or memory-cells.

Detecting of and Responding to Attacks

A further aspect of the invention is to provide a method for detecting an attempt to tamper a tamper-protected semiconductor module equipped with a cocoon PUF. The hardware module of the tamper-protected semiconductor module with the cocoon PUF a) causes the one or more emitters of the hardware module to emit predetermined excitation, and further
b) caused the one or more sensors of the hardware module to sense the (back-) scatter of the predetermined excitation reflected by the cocoon of the tamper-protected semiconductor module.

Further, the hardware module then c) generates a digital "measured fingerprint" from (back-) scatter of the predetermined excitation sensed by the one or more sensors, and
d) verifies the integrity of the cocoon by using the measured digital fingerprint recorded.

The "measured fingerprint" is denoting the fingerprint derived from the most recently measured values of the (back-) scatter of the predetermined excitation sensed by the one or more sensors.

The hardware module may perform steps a) to d) not only once, but also repeatedly. Hence, an ongoing verification of the integrity of the tamper-protected semiconductor module is possible. Steps a) to d) may be for example repeatedly performed in irregular intervals or on a random basis.

e) In this further step of the measurement process, an interrupt is produced, in case integrity could not be verified in step d). This interrupt may cause the hardware module to permanently or temporarily make itself unusable. In a further embodiment of the invention, the measurement process further comprises another step
f) of deactivating integrated circuit parts of the hardware module during a measurement cycle in which the one or more sensors sense the (back-) scatter of the predetermined excitation. This may be helpful to produce the same predetermined excitation in all measurements.

In a further exemplary embodiment, the method for checking the integrity of the cocoon may further comprise the following steps of g) initializing the hardware module by creating and recording a fingerprint of the un-tampered semiconductor module,
h) securing this fingerprint of step g) using a certificate signed by an Certification Authority, and
i) storing the certified fingerprint in a semiconductor non-volatile memory. In one exemplary embodiment, this certificate may be signed by the Root Certification Authority (RCA) or another Certification Authority that can be validated against the RCA's certificate containing the public key part of the RCA's public key-pair.

Another possibility for verifying the integrity of the cocoon is the use of the cocoon PUF as part of a key restoration process (two-factor secret, also referenced as "Vernam-Chiffre"). This key restoration process is used to recreate the key (also referred to as "recombined secret") from Helper-Data using the cocoon PUF fingerprint. The Helper-Data is generated based on the key using the cocoon PUF of the un-tampered cocoon, respectively, un-tampered (tamper-protected) semiconductor module, which binds the recreation of the key to this specific cocoon PUF. If the cocoon PUF is altered due to a tampering attempt, the key may be temporarily or permanently destroyed, as the cocoon PUF will be temporarily or permanently changed as a result of the tampering attempt, so that the key generation function is unable to reconstruct the correct key (again). Hence, in this exemplary embodiment, the verification of the integrity of the cocoon is realized by means of a key restoration process generating a key based on Helper-Data and the sensed (back-) scatter of the predetermined excitation.

The generation of the Helper-Data may be, for example, part of an initialization procedure of the semiconductor module in an un-tampered case (e.g. by performing the initialization at a trusted party; a trusted party could be for example a Root Certification Authority, the manufacturer of the tamper-protected semiconductor module, the manufacturer of a device comprising the tamper-protected semiconductor module, the customer/user, etc.). Therefore, in another embodiment of the invention, the method further comprises the steps of g) initializing the hardware module by creating and recording a fingerprint of the un-tampered semiconductor module, and generating the Helper-Data based on the key and the sensed (back-) scatter of the predetermined excitation. This Helper-Data may then be stored in a non-volatile memory.

Please note that the Helper-Data may not need to be protected, since it is impossible to recreate the secret from the Helper-Data without the correct hardware PUF. Hence, the Helper-Data may be stored either in the hardware module or in an external storage of a device or another hardware structure that contains the tamper-protected semiconductor module.

Reverse Engineering of a Cocoon PUF

Cryptographic solutions are more or less sensitive to attacks that are primarily exploiting 'physical' rather than mathematical weaknesses. Hence, these attacks could rely on implementation-mistakes or exploitable environmental properties. Since the existence of the need to secure a secret, a lot of physical and side-channel attack methods have been "invented and launched".

Indeed, it is a fair assumption that it is impossible to harden integrated circuits totally against all forms of attacks; this might also prove true for the CASTOR. It is assumed, that—with enough "criminal energy"—it will always be possible to analyze the functional logic out of any design. The only and single item what can be defended up to a sensible limit (determined by the mechanisms of economics: The costs in money and time for breaking a system must be reasonable higher than the value of the protected assets and the outlay to protect it) is the secret protected by the cocoon PUF. The challenge is to destroy this secret before the attacker can get it.

The attacker has to surmount the cocoon in a way that the secret is still extractable. If this can be done, the rest is easy: Tapping the internal interface to the Key Control unit and initiating a "Secret Reconstruction" is enough. To prevent such a scenario, the potentially most important feature of the cocoon PUF may be its fundamental ability to protect even in a passive "out of service" de-energized (no supply voltage) state: The fact of a cocoon cover fracture is a sufficient condition for the secret to vanish into thin air.

To make it more difficult for an attacker, according to another embodiment of the invention, essential design parts of the semiconductor module (e.g. one or more selected from the circuitry of the cocoon PUF responsible to the weighting of the cocoon fingerprint, the conducting paths/wires between the cocoon PUF circuitry, and the critical "secret using" parts of the "Third 'IP' Party's circuitry using the Secret") are not be placed on the surface of the die. For example, the essential design parts may be situated under a metal layer.

Maze of Knossos—Configuration of the FPGA

Another aspect of the invention is the use of a unique configuration of FPGAs (Field Programmable Gate Arrays) on a chip (after programming the FPGA to fulfill the desired functionality), which allows integrity checking based on the uniqueness of their configuration. FPGAs may be used on chips to provide various customized functionality. The unique configuration of the FPGA after its programming can be considered a fingerprint of the FPGA itself. For example, a FPGA may be used to implement a crypto-coprocessor though this aspect of the invention is not limited to this use.

The Maze of Knossos introduces another element of chip individualization through randomness. It allows a limited change of the soft-core functionality even during runtime on a small scale similar to the FPGA fundamental basic approach. The programming is done through six non-volatile configuration memory cells in every interconnection point, which are distributed all over the maze array.

The FPGA inspired maze structure consists of many functional Processing-Elements (PE) inter-connected by Switch-Boxes (SB) as shown in FIG. 8. The PE elements are scaled on their function and not on the gate level. A type code indicates their functionality. Different values mean the PEs provide different functionality. Thousands of different PE types could be designed. The distribution of the PEs (with their intended functionality) on the die changes with every mask revision.

FIG. 9 exemplarily shows the more detailed structure of the PEs. In FIG. 9 a PE of type '6789' is exemplified, however this hasn't any implications on the PEs' structures. The PEs are optimized and fixed (not programmable) hard macros consisting of a simple control (sequencer) logic, two different logic functions, a small register bank, and a SRAM based distributed memory.

FIG. 10 exemplarily shows the logical design-principle of a Switch-Box (SB). In this example, every SB consists of four inter-connection-points acting as routing element with 4×4 rows and columns. Every interconnection may for example consist of six pass transistors, like programmable switches (shown in the middle). The gates of the pass transistors are driven by non-volatile configuration memory cells. SBs behave like inverse fuse based connections: non-programmed interconnection points represent an open connection (shown on the left hand side of FIG. 10). After programming the SB connects its neighbors as shown on the right hand side of FIG. 10.

The Maze of Knossos can be used to realize a programmable limited cryptographic functionality. Due to its structure, there are multiple ways to create identical functionality using different configurations of the PEs and SBs, comparable to a maze in which more than a single direction is pointing the way out. This translates to the possibility of different sets of different programmed PEs and switch-boxes in fact leading to the same overall functionality being provided by the FPGA. This means, though they provide the same functionality, each FPGA within a chip can be implemented in a unique way.

The unique selected set of configuration memory cells within a FPGA in combination with uniqueness (introduced by the PUF) thus builds a fragile well-balanced system which allows testing the chip-identity. Any cloning of the chip can be detected, if either one of the configurations of the PEs or SBs is altered, due to the change of its FPGA configuration.

For integrity checking of the chip, the unique configuration of its FPGA can be used in different fashions, similar to the use of a PUF.

In one exemplary implementation, the integrity check based on the FPGA configuration ("FPGA fingerprint") could be chip internal. In this case the FPGA configuration of the chip is recorded by a trusted party (e.g. RCA) in form of a certificate which is stored in memory inside the chip. By validating the certificate of the original FPGA configuration the chip can assure the FPGA's configuration hasn't been changed.

In this exemplary implementation, the chip could provide some integrity checking function (e.g. as part of the firmware) which checks the integrity of the chip during bootstrapping. The integrity checking function may read the chip's current FPGA configuration and compares it to the original FPGA's configuration provided in the certificate. A mismatch indicates that this chip is a clone.

The FPGA configuration may also be used to allow an authority to check the integrity of a chip. In this case the authority (e.g. host device, the RCA, an institution manufacturing a product containing the chip with the PUF, etc.) has recorded the original and correct FPGA configuration for a chip. For integrity checking, the chip is queried by the authority to obtain its FPGA's configuration. If the FPGA configuration provided by the chip is correct, i.e. if it matches the previously stored original FPGA configuration, the authority may confirm the integrity of the chip, or the host device, respectively. Otherwise the authority might for example cause a disablement of the chip or its host device, respectively, which could be implemented via a CRL as well.

In one exemplary embodiment, a FPGA is used to implement a crypto-coprocessor in a tamper-protected chip for use in a transaction system as described herein. In this exemplary embodiment, the RCA may record the FPGA configuration as part of the CASTOR's crypto-initialization at the RCA (for more details, see section "Crypto-Initialization of the Tamper-Protected Hardware Module (CASTOR)"). The recorded original FPGA configuration may be used by the RCA to verify integrity of the CASTOR or may also be used by the CASTOR chip internally for verification of the integrity as described above.

Furthermore it should be apparent that using the uniqueness of a FPGA's configuration for integrity checking may be readily combined with other security measures for integrity checking, e.g. the use of a PUF on a chip. If the RCA's certificates were used for the integrity check, the RCA might provide all relevant information needed to confirm integrity in one certificate.

On-Chip Trusted Time Source

An option for the CASTOR-internal provision of a trusted time could be the integration of an energy-buffered and trusted real-time source on the CASTOR chip with a battery. However, as the battery may be difficult to integrate in the chip (even enlarging the waste disposal procedures), in one embodiment of the invention the CASTOR chip is provided with a strong monotonic counter. This counter always reflects the CASTOR's latest date and time. If date and time information provided by the counter becomes invalid (e.g. due to a power-loss), a trusted resynchronization with a reliable source is performed (e.g. by contacting the RCA or other authority able to provide a signed, new, and up-to-date date and time). The resync may be for example performed in the following events:

- If the CASTOR discerns another CASTOR's date and time as 'more recent'. This can be detected e.g. in the Pairing Phase (as for example described in the priority application PCT/EP2011/001219 of the same applicant, but is not limited to such use), where the CASTORs include local timestamps into the messages. Please note, as a measure of security in CASTOR-to-CASTOR communications only a "move forward" in time is possible but not a move back into the past.
- If in CASTOR-to-authority communications an automated update triggers and resynchronizes the date and time or a push message with an updated date and time received from trusted authorities, the CASTOR is provided with a signed 'set-monotone-counter' message and takes over this certified date and time, even in case the system is brought 'back to the past'.

Crypto-Initialization of the Tamper-Protected Hardware Module (CASTOR)

Private keys (as private key parts of public-key-pairs or as secret symmetrical keys) of a CASTOR are managed internally inside the CASTOR and are never revealed or propagated to the outer world. Keys (if) stored externally are secured beneath the umbrella encryption (all data that is passed to the outside of the CASTOR via the CASTORs I/O-interface e.g. the PSSBI discussed above, is protected by using this method). All keys are managed by the CASTOR's firmware. They are created, used, replaced and destroyed based on a security policy (as for example described in the priority application PCT/EP2011/001219 of the same applicant, but the invention is not limited to such use), without any user intervention. After the production process of the CASTOR chip, a validation by the RCA takes place with the effect to generate a validated CASTOR chip. As part of the validation process:

- The CASTOR chip may itself generate its identifying descriptor item (e.g. serial number) based on cryptographic physical randomization effects.
- The CASTOR chip itself may generate a public key-pair used by the CASTOR for signing to thereby allow verification of the CASTOR's identity in the transaction system. The private key part of this signing key-pair is denoted SUDI (Secret Unique Device Identity), and the public key part ($K_{S:CASTOR:PUDI,pub}$) of the signing key-pair is denoted PUDI (Public Unique Device Identity).
- The CASTOR chip itself generates its CON (Consistency) public key-pair for internal hash signing and checking purposes.
- The RCA signs the PUDI key and provide a cryptographic hashed version of the signed PUDI key in the CASTOR root certificate (Type-VI) which is thus individual for each CASTOR (also referred as "Cert.LicenseID" within the CASTOR root certificate).

Some keys are truly random number based, self-generated on chip by the CASTOR (please refer also to section "Keys used in the Transaction System" as described in the priority application PCT/EP2011/001219 of the same applicant, but the invention is not limited to such use) never leaving the protected environment of the CASTOR and never being exposed to the outer unsafe world. This generation mechanism is also true for the CASTOR identifier (ID) and the individual en/decryption key for the umbrella protected access via the CASTOR chip's I/O-interface.

Each CASTOR undergoes a validation process at the RCA, as noted above. Without such validation, the CASTOR is useless. This validation at the RCA, also referred to as initialization procedure, may include the following steps:

- An on-chip key and identification generation process is initiated by an external command through the I/O-interface of the CASTOR chip. For example, this process can only be done once in a CASTOR's lifetime (the ID change of a CASTOR is impossible). During this on-chip key and identification generation process, the above mentioned keys and objects are generated—among other things (e.g. the setup of the security system).
- The PUDI and the public key part of CON are delivered to the external world, the RCA. The PUDI may be handed over to the outside of the CASTOR chip without any restriction in time or how often this could be done. The public key part of the consistency key-pair will be delivered to the outside of the CASTOR chip only once in a lifetime of the physical CASTOR.
- RCA will store the PUDI and the public key part of the consistency key-pair. RCA generates a CASTOR root certificate (Type-VI) for the CASTOR, comprising the "Cert.LicenseID". The public key part of the consistency key-pair is not listed in any public available certificate.
- The CASTOR root certificate (Type-VI) is then transferred into the CASTOR chip and is stored therein (in a safe manner) to prevent manipulation of same.
- Furthermore, the CASTOR chip generates its PIO (Private-I/O) key (also denoted I/O or umbrella key), which is a symmetric key (e.g. a 256 bit AES symmetric key) used for encrypted data read/write operations ("umbrella encryption") through the I/O-interface to CASTOR chip-external memory. The PIO key may be generated as part of the on-chip key and identification generation process but may also be generated (or destroyed) by the CASTOR chip later within a setup process (e.g. triggered by the user).

The user setup process may for example also allow the user to decide whether his/her CASTOR should be operated more secure or with more recovery options in case of a CASTOR chip defect. (Please note, this user setup process is not identical to the validation initialization procedure described above, which is only executed once in a CASTOR lifetime at the RCA site). If the user decides for a more secure operation, the PIO key will never be exposed outside the CASTOR. In case of a CASTOR defect it won't be possible to recover electronic tokes and all other encrypted data of the transaction system having been subject to the umbrella encryption and being stored outside the CASTOR.

In case the user has chosen the operation with more recovery options, an encrypted copy of the PIO key will be stored in the external storage. The storage of that specific PIO can be done without umbrella protection to allow a later recovery of same. This storage of the encrypted PIO key is the only exception to the "on-the-fly" umbrella protection, which isn't effective herein. The PIO key is encrypted by using the following scheme:

1. The CASTOR uses the RCA's public key for encryption purposes ($K_{D:RCA:TYPE-VI,pub}$) to encrypt the PIO key (even while breaking the naming convention as this key formally is marked to be of type decryption key). The RCA's public key used for the encryption is comprised in the CASTOR root certificate (Type-VI certificate) particularly for recovery purposes and is the same for all CASTORs. This encryption makes it impossible for any third party to recover the PIO key.
2. The CASTOR then uses the secret key part of its consistency key-pair ($K_{S:CASTOR:CON,prv}$) to encrypt the result of the previous encryption process (i.e. the encrypted PIO key). This encryption with the secret key part of its consistency key-pair essentially proves the PIO key to be the specific CASTOR's one. The public key part of the CASTORs consistency key-pair is known to the RCA from the on-chip key and identification generation process.
3. The CASTOR then uses another RCA's public key for signing purposes ($K_{S:RCA:TYPE-VI,pub}$) to sign the previously twice-encrypted PIO key (see steps 1 and 2). This RCA's public key for signing purposes is also comprised in the CASTOR root certificate (Type-VI) for recovery purposes, and is the same for all CASTORs. This fixes the previously done encryption process and makes it impossible to disturb the security process for any third party.

In case the CASTOR chip is defective while the external memory remains intact (which may be highly probable if using a RAID-1 storage concept) the electronic tokens and the other transaction related data are stored encrypted by the PIO key in the memory ("the umbrella protection") together with the PIO key encrypted using the above procedure. The RCA may recover the electronic tokens and the transaction system related data for a user by recovering the PIO key from the memory and decrypting same (in case the signature can be validated) and then decrypt the electronic tokens and transaction system related data using the recovered PIO key—however, only if the user agreed to choose the operation mode with a recovery operation prior the failure incident.

Digital Wallet (eWallet) Design System Considerations and Annotations

As shown within FIG. 18, the security design strategy of the exemplary eWallet can be strengthens using the principle of logical isolation for potential points of interests for an attacker. The System-on-Chip (SoC) functionality can be split into two sections, a secured section and an unsecured section. Hard wired circuitry not based on reprogrammable implementations has to be rewired or tapped instead of changing the functionality by reprogramming by the attacker. That makes the application of logical attacks e.g. issued through software based measures little useful.

Such a functional splitting makes it extremely difficult to compromise the secured section even in case that the unsecured section is already conquered (which is expected to be also very difficult, because of the need to gain access by running own—not correctly signed—code on the processor core 2 (CPU, DMA and/or other processing elements) designated as "ARM Cortex MPCore 2" in FIG. 18).

The processing core 1 ("ARM Cortex MPCore 1" in FIG. 18) of the secured section is able to access all SoC areas, including the local memories of its own and the unsecured section. In the reverse direction, this may not be true: processing core 2 is not able to access resources at the secured section. This may be prohibited for example by a hardware design done in the above mentioned way, so that logical and physical restrictions cannot be changed during the whole lifetime of the eWallet.

In one embodiment of the invention, after a (power-on) RESET of the eWallet the processing core 1 within the secured area should be started first, while in the meantime the processing core 2 within the unsecured area has to be captured in a RESET condition. After completing the boot-phase of the secured area processing core 1, the other processing core 2 will be bootstrapped too (i.e. the RESET condition will be released by the processing core 1).

IPL- and Boot-Loader Programming

The question of eWallet platform programming is of important meaning with respect to the production and/or to repairs and from a general security setup point. The two following aspects of the programming of the eWallet are considered exemplarily:

The ASIC product serialization and authentication process through certification.

The ASIC's equipment with firmware (embedded operation system, application, other code, etc.).

Both steps are based on digital certificates (also referred to as digital signed data objects), which are injected into the internal eWallet's non-volatile memory cells of the ASIC. The usage of a digital signature inhibits any unwanted platform utilization of the eWallet for any third party.

As part of the production process of the eWallet ASIC at the fab, the certificates required for proper functioning and the firmware will be transferred into the ASIC by using the [c]JTAG port. Both may be supplied by the copyright owner of the eWallet ASIC. This may occur not necessarily in a secured environment. A first time programming of the eWallet would be useful with a quality assurance (QA) process required for testability and design for manufacturing goals. Another feature is the safeguarding of quality and transportation of the chips into their safe IP protection harbor. Only inside this secured area (a controlled environment) the activation of the ASIC internals security subsystems should take place. This strategy forecloses the possibility of a midnight shadow production and just in the case it happens it makes it senseless, because these ASICS are non-functional for their intended usage (due to the provided certificates and firmware code just for testing).

The firmware content of the ASIC internal non-volatile memories may be protected through the existence of a prefix-certificate (and possible other trailing ones) in the binary images. After the event of a chip RESET, the CPU within the unsecured section may be held in that state, while the processing core within the secured section starts executing a hardwired program called IPL-Bootstrap-Routine. The IPL-Bootstrap Routine is no ROM-code, no non-volatile RAM-based code but a hardwired gate-based and thus unalterable code being set in stone (e.g. as microcode). A constituent part of this (microcode) is inter alia one or more testing signatures used within an unalterable step of recalculation before starting any code execution (e.g. boot code). The signatures may be constructed in a way that one of them is enough to "open the door" for the boot process. If after a RESET the result of such a calculation does not match with the certificates as mentioned above, the processing unit will not jump into the boot code (no boot). Only in case of success the bootstrap loader from the ASIC internal non-volatile memory will be started.

The content of all non-volatile memories (in the case there are more than one) of the eWallet chip may be readable and writeable from the ASICs outside. This is no security problem, because of the use of certificates. Any cloning attack will be a very difficult task, since all firmware images may be encrypted using the specific individual (cocoon PUF-based) fingerprint of the chip constituting, influencing and interwoven with the digital signature used for safeguarding the certificates.

In some embodiments, the user may be enabled to update the firmware of the eWallet ASIC using any external host (e.g. a PC, Smartphone are anything else able to realize host operations) using available communication interfaces within the local firmware. Of course, the ASIC firmware allows only correctly signed and optionally only newer firmware images to be installed on the eWallet. The up-to-dateness of the firmware could be for example tested by checking date & time and/or version & revision tags of the firmware. In case of a signature mismatch or rollback due to the detecting a "newer" firmware being installed on the eWallet, the eWallet ASIC simply refused the update. In case of success, the updated firmware is loaded into a RAM portion of the eWallet ASIC and may be transliterated (the firmware will be transcoded from the transport protection code to the eWallet security system, e.g. a cocoon PUF fingerprint-based security based one—if necessary), and may then be transferred to an internal non-volatile memory as functional (new) updated replacement of the (old and outdated) former firmware. The update of the firmware may be done in a safe way to survive any power interruption within the procedure.

The IPL Boot offers a minimized loading of the operation system and diagnosing functionality, which is able to test the local chip (hard- and software) functionality within the ASIC concerning all important features in an automatic way (Build-In-System-Test, BIST).

What is claimed is:

1. A tamper-protected hardware module, comprising:
a hardware structure providing a Physical Unclonable Function (PUF), the hardware structure being adapted to provide a response to challenges input to the PUF implemented in the hardware structure,
storage memory to store a set of challenges and a set of correct PUF responses for each of said challenges,
processor circuitry to provide at least one challenge from said set of challenges to the hardware structure implementing the PUF, and to receive a PUF response for each challenge provided to the hardware structure implementing the PUF,
the processor circuitry to verify integrity of the tamper-protected hardware module by checking, for each PUF response received for a challenge provided to the hardware structure implementing the PUF, whether the respective PUF response received from the hardware structure implementing the PUF matches the correct PUF response of said challenge stored in the storage memory, and
wherein the processor circuitry makes the tamper-protected hardware module temporarily or permanently unusable if integrity of the tamper-protected hardware module is not verified by the processor circuitry, and wherein the tamper-protected hardware module is a chip or a die.

2. The tamper-protected hardware module according to claim 1, wherein the tamper-protected hardware module comprises an input/output (I/O)-interface to receive said at least one challenge, for which the correct PUF response by hardware structure implementing the PUF is known, and to make the respective PUF response for each challenge provided to the hardware structure implementing the PUF available to the outside of the tamper-protected hardware module.

3. The tamper-protected hardware module according to claim 1, wherein the challenges and their corresponding PUF responses are signed by a root certification authority and wherein the tamper-protected hardware module is further to verify the integrity of said at least one challenge and a PUF response for the at least one challenge based on a signature.

4. The tamper-protected hardware module according to claim 1, further comprising a cryptographic processor having a configuration of an array of processing elements to provide a given functionality,
wherein the storage memory is further storing a signed configuration information indicating the initial configuration of the array of processing elements of the cryptographic processor of the hardware module,
wherein the processor circuitry is to verify integrity of the hardware module by verifying integrity of the initial configuration information based on a signature and comparing the verified initial configuration information with the configuration information of the processing elements of the cryptographic processor obtained from the cryptographic processor.

5. A tamper-protected hardware module, comprising:
a hardware structure providing a Physical Unclonable Function (PUF), the hardware structure being adapted to provide a response to challenges input to the PUF implemented in the hardware structure,
a key generation circuitry to autonomously generate, only once in response to an initialization request a predetermined set of one or more symmetric keys and one or more asymmetric key pairs, one of the generated keys of said set of one or more symmetric keys and one or more asymmetric key pairs is used for identification of the tamper-protected hardware module, and
an input/output (I/O)-interface to provide, in response to the initialization request, the key used for identification of the tamper-protected hardware module to the outside of the tamper-protected hardware module and to receive a certificate from a root certification authority comprising the key used for identification of the tamper-protected hardware module,
storage memory to store the certificate comprising the key used for identification of the tamper-protected hardware module and the generated predetermined set of symmetric keys and asymmetric key pairs, and wherein the tamper-protected hardware module is a chip or a die, and wherein the tamper-protected hardware module further comprises an on-chip trusted time source for providing the current date and time, wherein the current date and time is used by the tamper-protected hardware module to verify validity of certificates.

6. The tamper-protected hardware module according to claim 5, wherein the key generation circuitry is to generate a symmetric key for on-the-fly encryption/decryption of data to be maintained and/or stored inside or outside the tamper-protected hardware module in a host device including the tamper-protected hardware module prior to an exchange of the encrypted data through the I/O-interface.

7. The tamper-protected hardware module according to claim 6, further to encrypt the symmetric key for on-the-fly encryption/decryption of data by
a) encrypting the symmetric key using a public key of an asymmetric key pair of the root certification authority, b) encrypting the encrypted symmetric key of step a) using a private key of a key pair used for internal encryption and hashing purposes being generated by the tamper-protected hardware module in response to an initialization request, and
c) signing the double-encrypted symmetric key of step b) using a public key of an asymmetric key pair of the root certification authority, and
to store the signed and double-encrypted symmetric key of step c) in a storage of a host device comprising the tamper-protected hardware module, the storage being outside the tamper-protected hardware module.

8. The tamper-protected hardware module according to claim 5, wherein the certificate of the root certification authority further comprises public keys of the root certification authority for encryption and verifying signatures of the root certification authority.

9. The tamper-protected hardware module according to claim 1, further comprising an on-chip trusted time source implemented as a monotone timer, which is erased after a predetermined time span upon disconnection from a power supply, and wherein in case the trusted time source is to be reinitialized after erasure, the tamper-protected hardware module receives on-line from a root certification authority the current date and time signed by a root certification authority and initializes the trusted time source with the current date and time only if the signature of the root certification authority can be verified successfully.

10. The tamper-protected hardware module according to claim 5 further comprising an on-chip trusted time source implemented as a monotone timer, which is erased after a predetermined time span upon disconnection from a power supply, and
wherein in case the trusted time source is to be reinitialized after erasure, the tamper-protected hardware module receives on-line from a root certification authority the current date and time signed by a root certification authority and initializes the trusted time source with the current date and time only if the signature of the root certification authority can be verified successfully.

11. A method comprising:
autonomously generating by a tamper-protected hardware module, the hardware module being a chip or die, and only once in response to an initialization request, a predetermined set of one or more symmetric keys and one or more asymmetric key pairs, one of the generated keys is used for identification of the tamper-protected hardware module, and
providing, in response to the initialization request, the key used for identification of the tamper-protected hardware module to the outside of the tamper-protected hardware module via an input/output (I/O)-interface of the tamper-protected hardware module,
receiving via the I/O-interface, a certificate from a root certification authority comprising the key used for identification of the tamper-protected hardware module,
storing the certificate comprising the key used for identification of the tamper-protected hardware module and the generated predetermined set of symmetric keys and asymmetric key pairs in the tamper-protected hardware module, and wherein the tamper-protected hardware module comprises an on-chip trusted time source for providing the current date and time, wherein the current date and time is used by the tamper-protected hardware module to verify validity of certificates, and wherein the tamper-protected hardware module comprises a hardware structure providing a Physical Unclonable Function (PUF), the hardware structure being adapted to provide a response to challenges input to the PUF implemented in the hardware structure.

12. The method according to claim 11, wherein the generation of the predetermined set of one or more symmetric keys and one or more asymmetric key pairs comprises generating a symmetric key for on-the-fly encryption/decryption of data to be maintained and/or stored inside or outside the tamper-protected hardware module in a host device including the tamper-protected hardware module prior to an exchange through the I/O-interface.

13. The method according to claim 12, further comprising encrypting the symmetric key for on-the-fly encryption/decryption of data by
a) encrypting the public key using a public key of an asymmetric key pair of the root certification authority,
b) encrypting the encrypted public key of step a) using a private key of a key pair used for internal encryption and hashing purposes being generated by the tamper-protected hardware module in response to an initialization request, and
c) signing the double-encrypted public key of step b) using public key of an asymmetric key pair of the root certification authority, and
storing the signed and double-encrypted public key of step c) in a storage of a host device comprising the tamper-protected hardware module, the storage being outside the tamper-protected hardware module.

14. The method according to claim 11, further comprising providing, on demand, a public key of a public key pair generated by the tamper-protected hardware module for internal encryption and hashing purposes to the outside of the tamper-protected hardware module via the I/O-interface.

* * * * *